(12) United States Patent
Ogawa

(10) Patent No.: US 9,949,351 B2
(45) Date of Patent: Apr. 17, 2018

(54) METHOD FOR CONTROLLING MOBILE TERMINAL AND PROGRAM FOR CONTROLLING MOBILE TERMINAL

(71) Applicant: PANASONIC INTELLECTUAL PROPERTY CORPORATION OF AMERICA, Torrance, CA (US)

(72) Inventor: Kento Ogawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/380,370

(22) Filed: Dec. 15, 2016

(65) Prior Publication Data

US 2017/0099720 A1 Apr. 6, 2017

Related U.S. Application Data

(62) Division of application No. 14/563,039, filed on Dec. 8, 2014, now Pat. No. 9,572,235.

(30) Foreign Application Priority Data

Dec. 27, 2013 (JP) .................................. 2013-273345

(51) Int. Cl.
G05B 15/00 (2006.01)
H05B 37/02 (2006.01)
(Continued)

(52) U.S. Cl.
CPC ....... H05B 37/0272 (2013.01); G06F 3/0482 (2013.01); G06F 3/04817 (2013.01);
(Continued)

(58) Field of Classification Search
CPC . G05B 15/02; H05B 37/0272; H05B 37/0281
(Continued)

(56) References Cited

U.S. PATENT DOCUMENTS 5,187,655 A * 2/1993 Post .................. G05B 19/0426
315/292
9,235,701 B2 * 1/2016 Wu ......................... G06F 21/44
(Continued)

FOREIGN PATENT DOCUMENTS

EP 2515610 10/2012
EP 2651190 10/2013
(Continued)

OTHER PUBLICATIONS

The Extended European Search Report dated May 20, 2015 for the related European Patent Application No. 14195085.7.

*Primary Examiner* — Thuy Vinh Tran
(74) *Attorney, Agent, or Firm* — Greenblum & Bernstein, P.L.C.

(57) ABSTRACT

A method for controlling a mobile terminal that controls lighting devices that illuminate spaces, the terminal including a display and a memory. The method causes a computer of the terminal to obtain current time information, rearrange scene icons, using the memory that stores scenes indicating illumination states established by the lighting devices and scene time information indicating times of the scenes, while associating the scenes and the scene time information with each other. The scene icons correspond to the scenes based on the current time information and the scene time information. The rearranged scene icons are displayed on the display, and, when a scene icon is selected, a control signal for controlling the lighting devices is transmitted to the lighting devices, so that the spaces are illuminated in an illumination state indicated by a scene corresponding to the selected scene icon.

7 Claims, 52 Drawing Sheets

(51) Int. Cl.
*G06F 3/0481* (2013.01)
*G06F 3/0482* (2013.01)
*G08C 17/02* (2006.01)
*G05B 15/02* (2006.01)

(52) U.S. Cl.
CPC ......... *G08C 17/02* (2013.01); *H05B 37/0218* (2013.01); *H05B 37/0281* (2013.01); *G05B 15/02* (2013.01)

(58) Field of Classification Search
USPC .................. 700/17, 83, 86; 315/292, 307
See application file for complete search history.

(56) References Cited

U.S. PATENT DOCUMENTS

2008/0140231 A1\* 6/2008 Blackwell ............ H05B 37/029
700/90
2011/0035029 A1 2/2011 Yianni et al.

FOREIGN PATENT DOCUMENTS

| JP | 2011-519128 | 6/2011 |
| WO | 2010/140107 | 12/2010 |
| WO | 2012/166369 | 12/2012 |
| WO | 2013/121311 | 8/2013 |
| WO | 2013/132416 | 9/2013 |

\* cited by examiner

FIG. 2

| | SCENE NAME | SCENE ICON | SCENE LOCATION | LIGHTING DEVICE SETTING INFORMATION | | | | | | | | | |
|---|---|---|---|---|---|---|---|---|---|---|---|---|---|
| | | | | A | | B | C | D | E | | | | |
| | | | | INTENSITY | COLOR | INTENSITY | INTENSITY | INTENSITY | INTENSITY | COLOR | ... | | |
| 1 | PARTY | 00001.jpg | LIVING ROOM | 100 | 5000K | 100 | 100 | 80 | 0 | 3500K | ... |
| 2 | MEAL | 00002.jpg | LIVING ROOM | 30 | 3500K | 100 | 100 | 10 | 0 | 3500K | ... |
| 3 | RELAX | 00003.jpg | LIVING ROOM | 50 | 2800K | 10 | 10 | 0 | 0 | 3500K | ... |
| 4 | HAPPY HOME | 00004.jpg | LIVING ROOM | 100 | 5000K | 0 | 0 | 0 | 0 | 3500K | ... |
| 5 | CALMING DOWN | 00005.jpg | BEDROOM | 0 | 3500K | 0 | 0 | 10 | 30 | 4000K | ... |
| 6 | RELAXING IN HOTEL | 00006.jpg | BEDROOM | 0 | 3500K | 0 | 0 | 10 | 10 | 3500K | ... |
| 7 | POWER SAVING | 00007.jpg | LIVING ROOM | 50 | 4500K | 50 | 30 | 30 | 0 | 3500K | ... |
| 8 | GOODNIGHT | 00008.jpg | LIVING ROOM | 0 | 3500K | 10 | 10 | 10 | 10 | 2800K | ... |
| 9 | READING BEFORE SLEEP | 00009.jpg | BEDROOM | 0 | 3500K | 0 | 0 | 10 | 40 | 4500K | ... |
| 10 | DEEP SLEEP | 00010.jpg | BEDROOM | 0 | 3500K | 0 | 0 | 0 | 0 | 3500K | ... |
| ... | ... | ... | ... | ... | ... | ... | ... | ... | ... | ... | ... |

FIG. 4

|   | ITEM NO. | LIGHTING DEVICE NAME | SETTING PARAMETER | |
|---|---|---|---|---|
| A | P00001 | LIVING CEILING LIGHT | INTENSITY ADJUSTMENT | COLOR ADJUSTMENT |
| B | P00002 | DINING LIGHT | INTENSITY ADJUSTMENT | — |
| C | P00003 | KITCHEN DOWNLIGHT | INTENSITY ADJUSTMENT | — |
| D | P00004 | CORRIDOR DOWNLIGHT | INTENSITY ADJUSTMENT | — |
| E | P00005 | BEDROOM CEILING LIGHT | INTENSITY ADJUSTMENT | COLOR ADJUSTMENT |
| ⋮ | ⋮ | ⋮ | ⋮ | ⋮ |

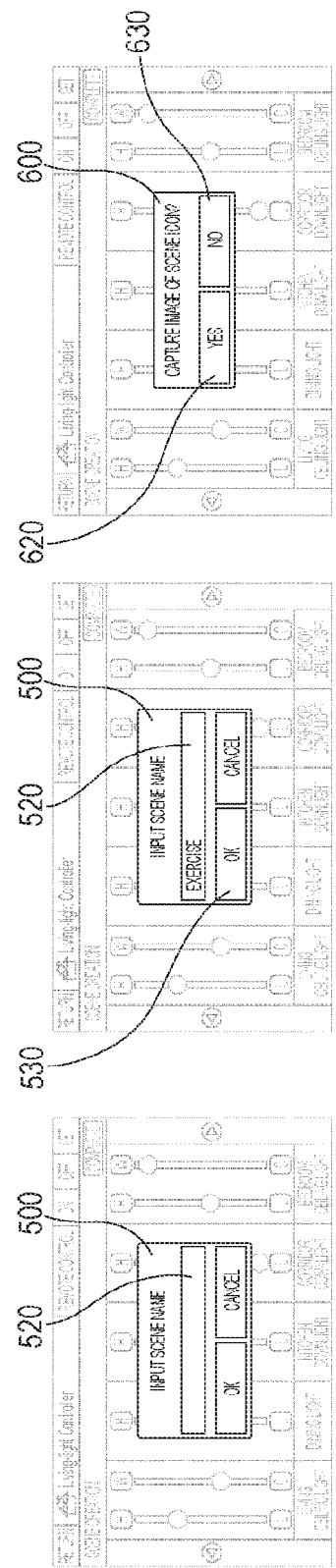

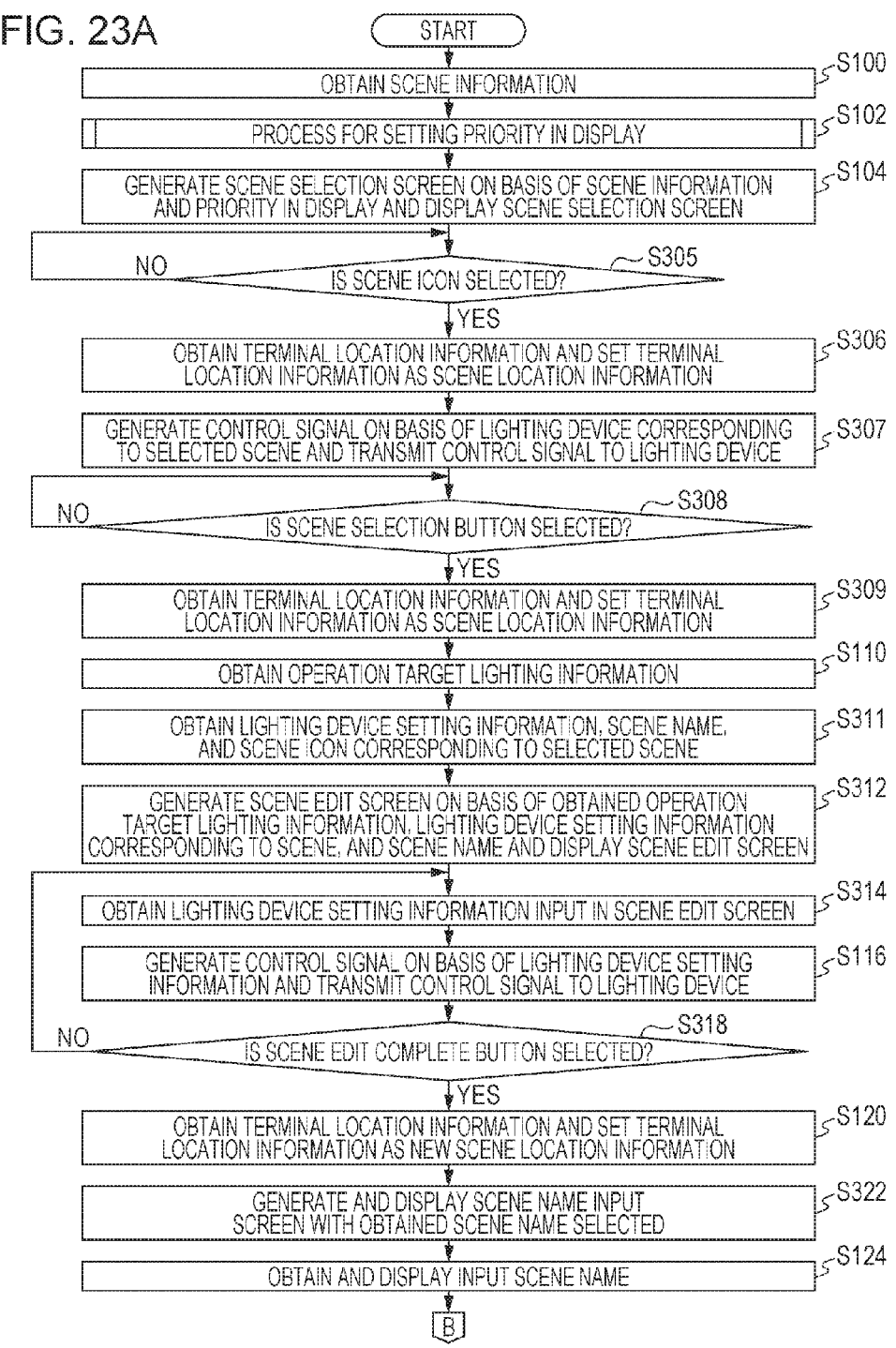

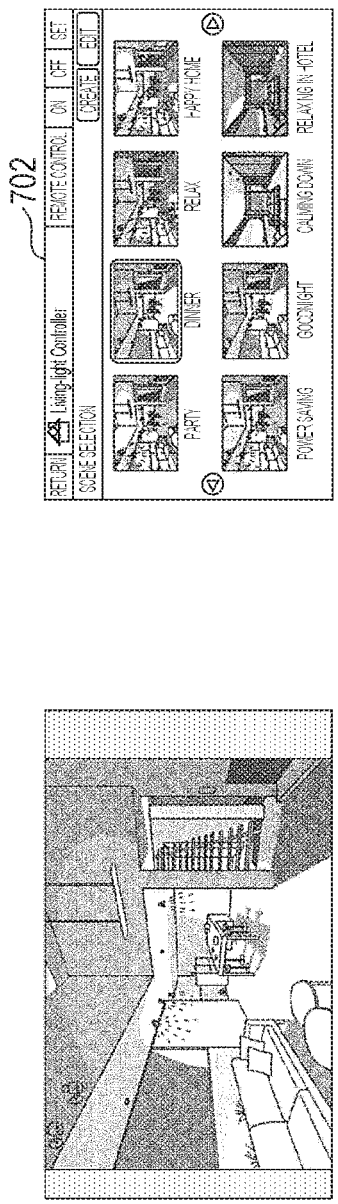

FIG. 28

| | SCENE NAME | SCENE ICON | SCENE TIME | LIGHTING DEVICE SETTING INFORMATION | | | | | | | | | |
|---|---|---|---|---|---|---|---|---|---|---|---|---|---|
| | | | | A | | | B | | C | | D | | E | |
| | | | | INTENSITY | COLOR | ... | INTENSITY | ... | INTENSITY | ... | INTENSITY | ... | INTENSITY | COLOR | ... |
| 1 | PARTY | 00001.jpg | 20:00 | 100 | 5000K | ... | 100 | ... | 100 | ... | 80 | ... | 0 | 3500K | ... |
| 2 | MEAL | 00002.jpg | 19:00 | 30 | 3500K | ... | 100 | ... | 100 | ... | 10 | ... | 0 | 3500K | ... |
| 3 | RELAX | 00003.jpg | 14:00 | 50 | 2800K | ... | 10 | ... | 10 | ... | 0 | ... | 0 | 3500K | ... |
| 4 | HAPPY HOME | 00004.jpg | 15:00 | 100 | 5000K | ... | 0 | ... | 0 | ... | 0 | ... | 0 | 3500K | ... |
| 5 | CALMING DOWN | 00005.jpg | 21:00 | 0 | 3500K | ... | 0 | ... | 0 | ... | 10 | ... | 30 | 4000K | ... |
| 6 | RELAXING IN HOTEL | 00006.jpg | 22:00 | 0 | 3500K | ... | 0 | ... | 0 | ... | 10 | ... | 10 | 3500K | ... |
| 7 | POWER SAVING | 00007.jpg | 10:00 | 50 | 4500K | ... | 50 | ... | 30 | ... | 30 | ... | 0 | 3500K | ... |
| 8 | GOODNIGHT | 00008.jpg | 23:00 | 0 | 3500K | ... | 10 | ... | 10 | ... | 10 | ... | 10 | 2800K | ... |
| 9 | READING BEFORE SLEEP | 00009.jpg | 22:30 | 0 | 3500K | ... | 0 | ... | 0 | ... | 10 | ... | 40 | 4500K | ... |
| 10 | DEEP SLEEP | 00010.jpg | 01:00 | 0 | 3500K | ... | 0 | ... | 0 | ... | 0 | ... | 0 | 3500K | ... |
| ... | ... | ... | ... | ... | ... | | ... | | ... | | ... | | ... | ... | |

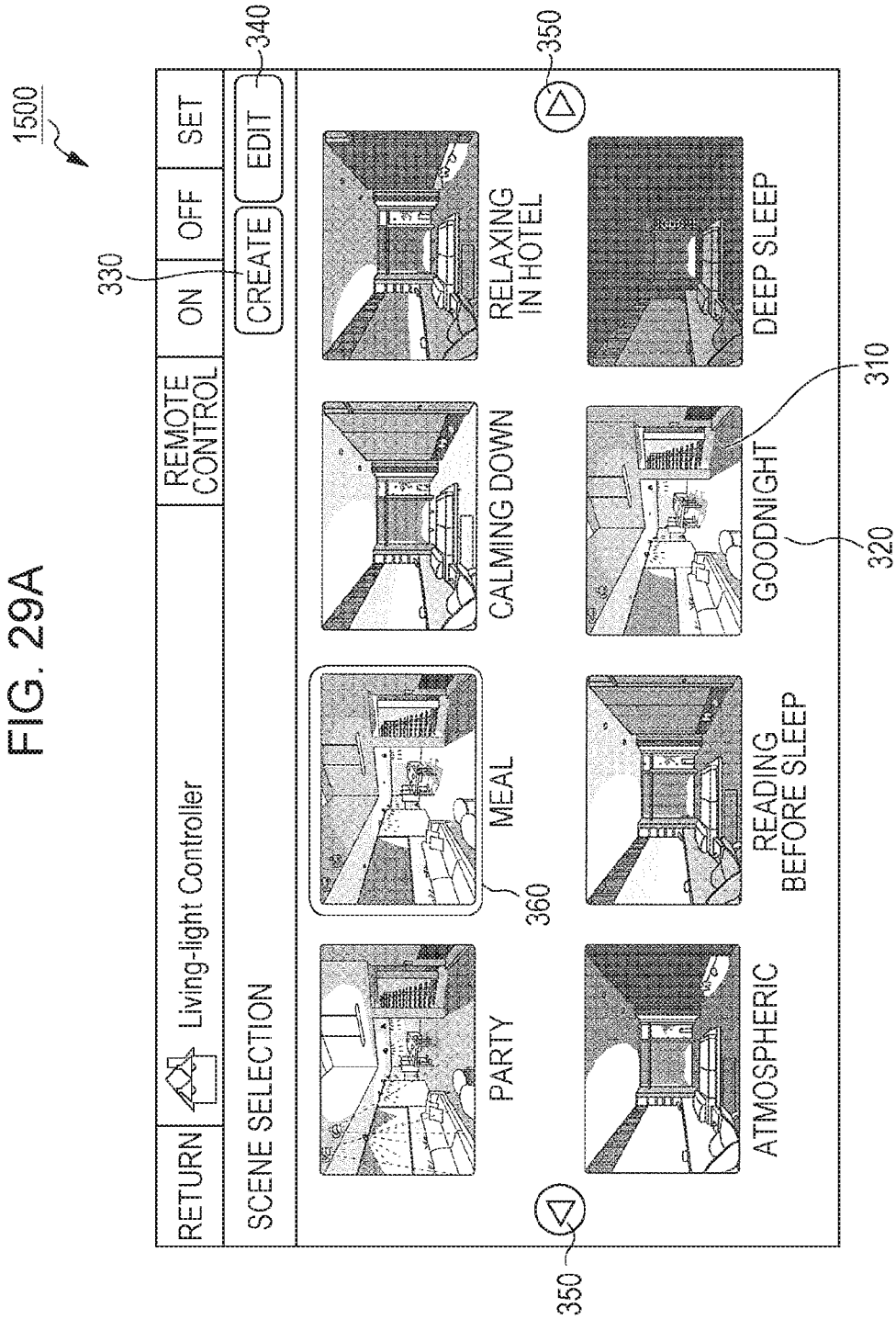

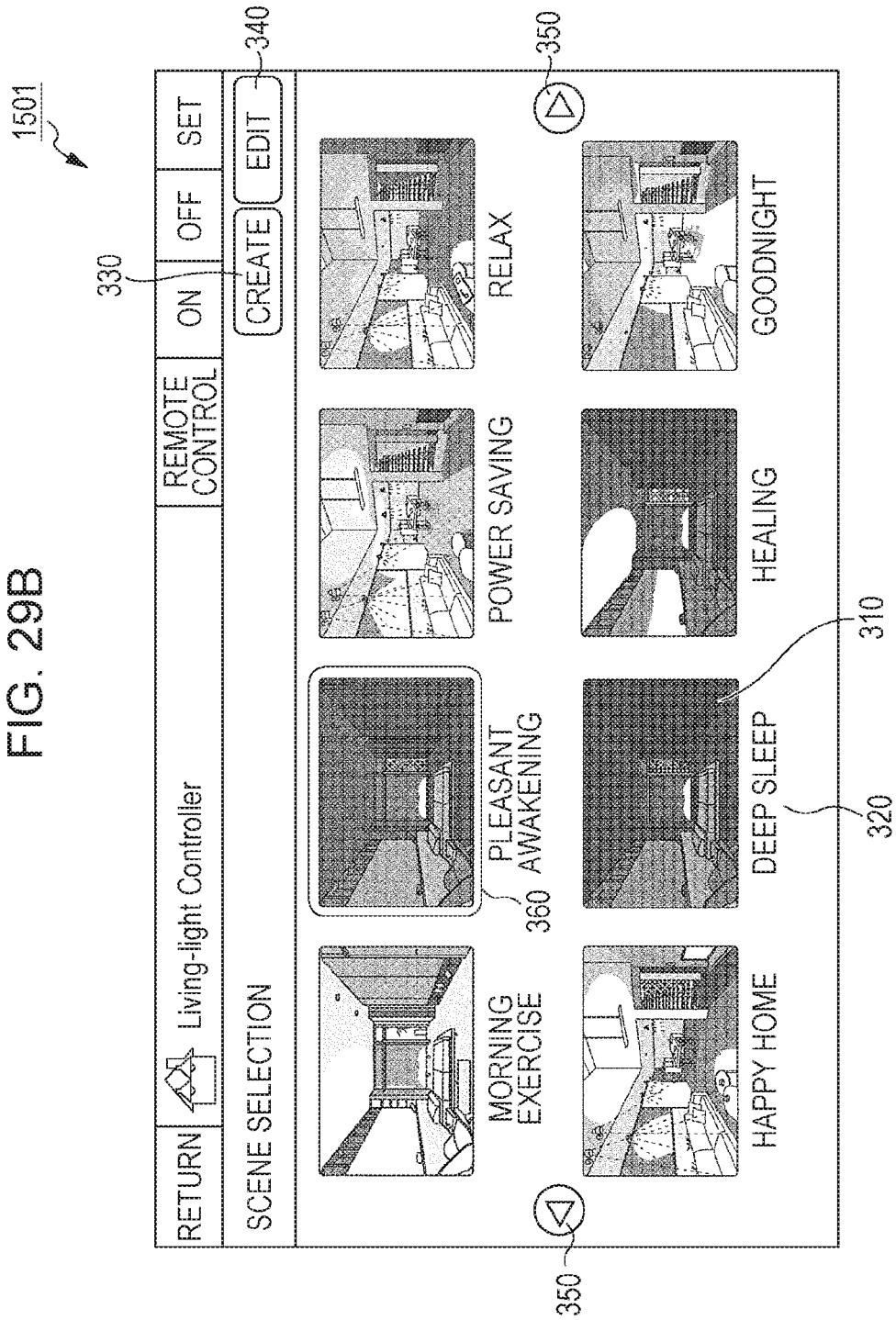

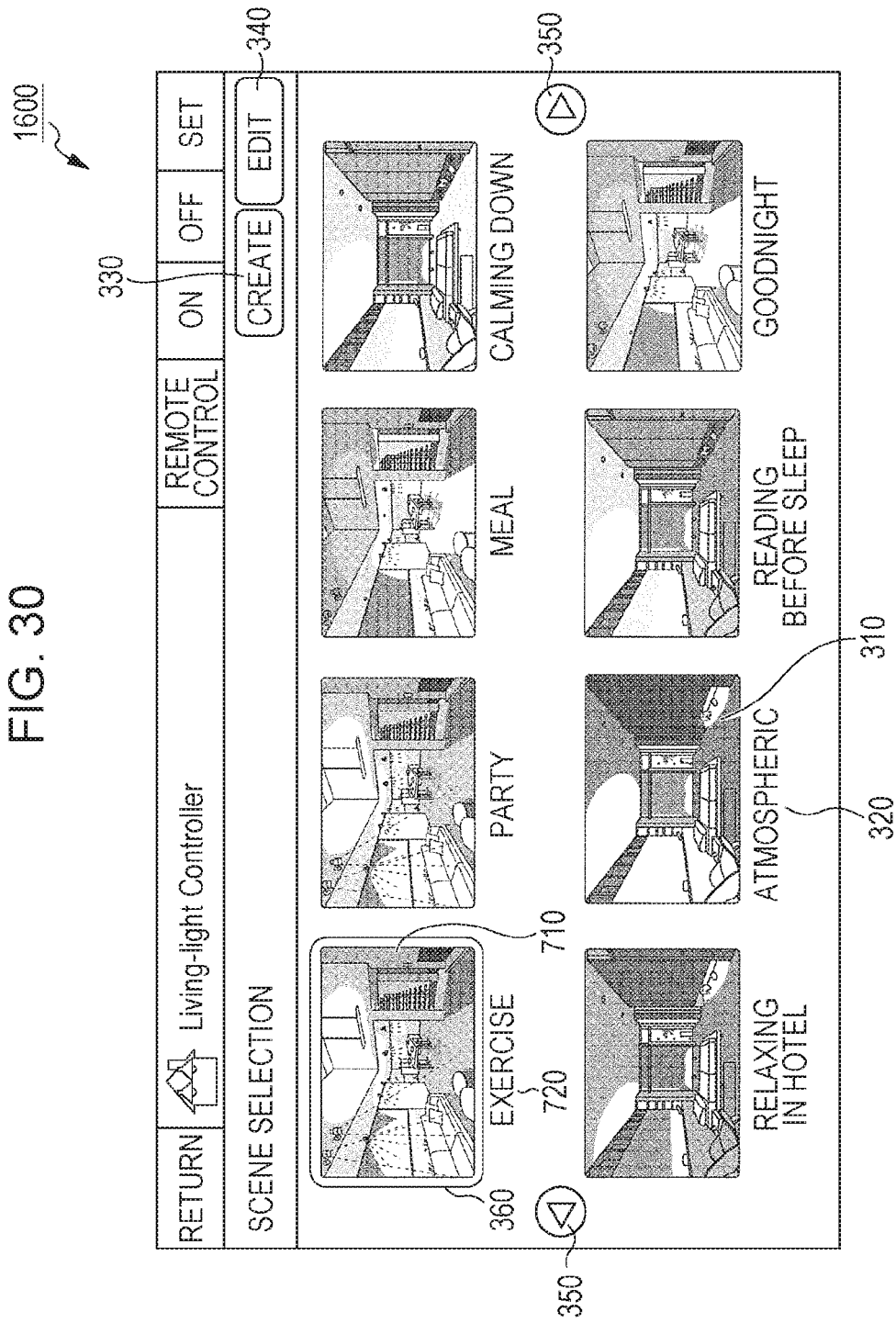

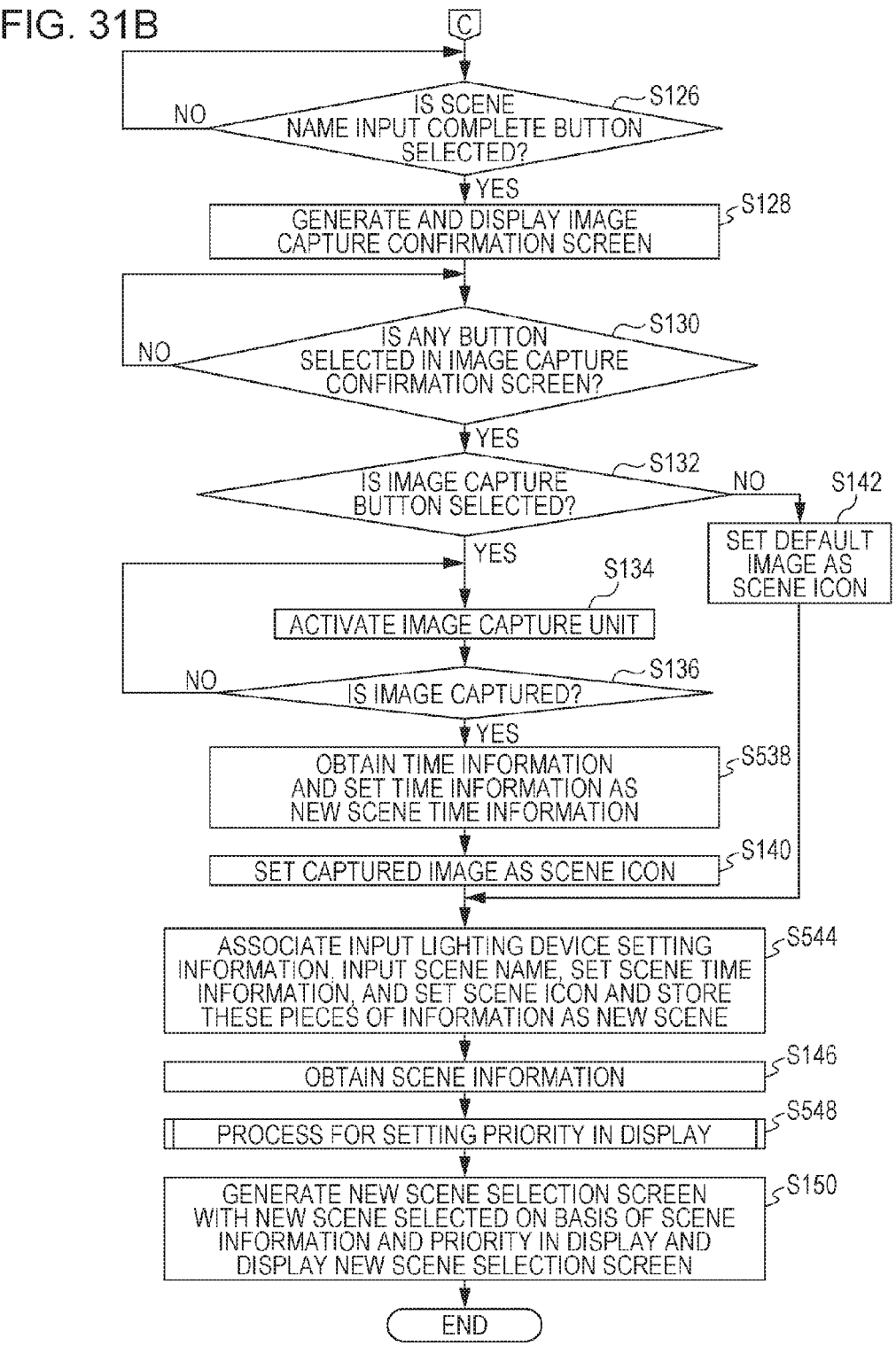

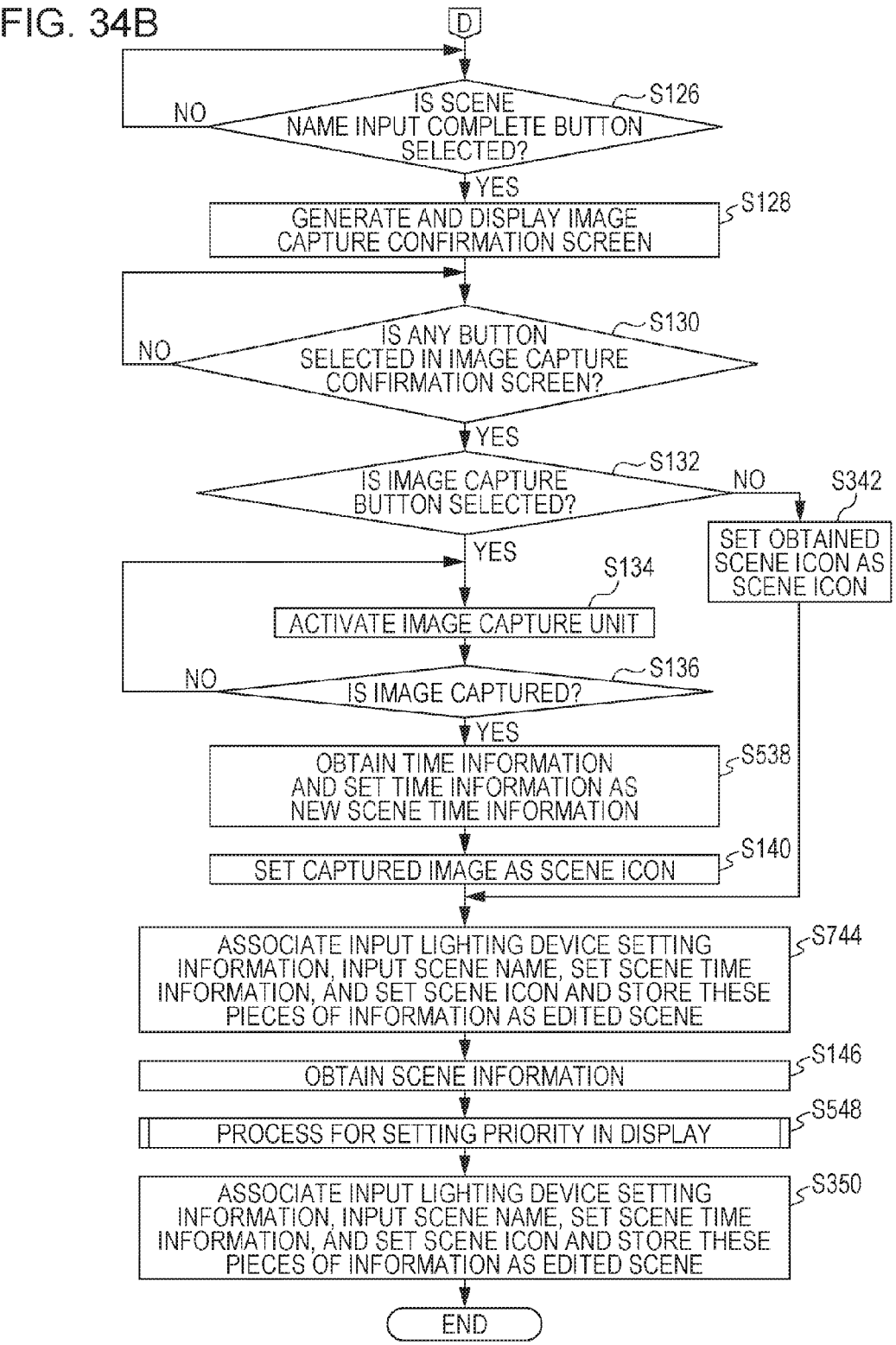

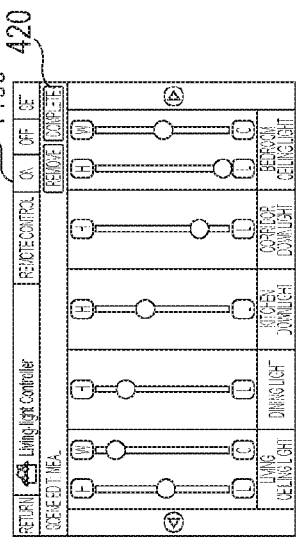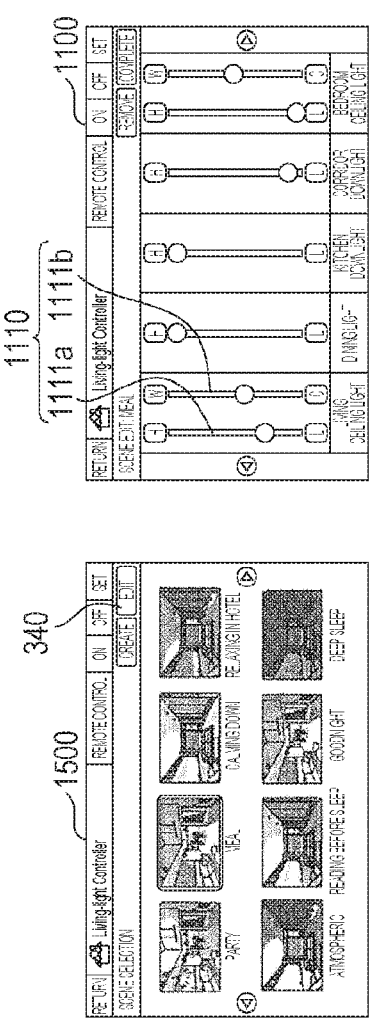
FIG. 35C   FIG. 35B   FIG. 35A

FIG. 36

| | SCENE NAME | SCENE TIME (AVERAGE TIME) | SELECTION TIME (HISTORY) |
|---|---|---|---|
| 1 | PARTY | 19:50 | 19:30, 20:00, 19:40, 20:10 |
| 2 | MEAL | 19:00 | 19:00, 18:30, 18:45, 19:00, 19:30, 19:15 |
| 3 | RELAX | 13:50 | 13:00, 14:00, 13:30, 14:50 |
| 4 | HAPPY HOME | 14:30 | 14:00, 14:30, 15:00 |
| ... | ... | ... | ... |

FIG. 37

| | SCENE NAME | SCENE ICON | SCENE TIME | SCENE TIME PERIOD | LIGHTING DEVICE SETTING INFORMATION | | | | | | | | | |
|---|---|---|---|---|---|---|---|---|---|---|---|---|---|---|
| | | | | | A | | B | C | D | | E | | | |
| | | | | | INTENSITY | COLOR | INTENSITY | INTENSITY | INTENSITY | | INTENSITY | COLOR | | |
| 1 | PARTY | 00001.jpg | 20:00 | 18:00–5:00 | 100 | 5000K | 100 | 100 | 80 | | 0 | 3500K | ... |
| 2 | MEAL | 00002.jpg | 19:00 | 18:00–5:00 | 30 | 3500K | 100 | 100 | 10 | | 0 | 3500K | ... |
| 3 | RELAX | 00003.jpg | 14:00 | 11:00–18:00 | 50 | 2800K | 10 | 10 | 0 | | 0 | 3500K | ... |
| 4 | HAPPY HOME | 00004.jpg | 15:00 | 11:00–18:00 | 100 | 5000K | 0 | 0 | 0 | | 0 | 3500K | ... |
| 5 | CALMING DOWN | 00005.jpg | 21:00 | 18:00–5:00 | 0 | 3500K | 0 | 0 | 10 | | 30 | 4000K | ... |
| 6 | RELAXING IN HOTEL | 00006.jpg | 22:00 | 18:00–5:00 | 0 | 3500K | 0 | 0 | 10 | | 10 | 3500K | ... |
| 7 | POWER SAVING | 00007.jpg | 10:00 | 5:00–11:00 | 50 | 4500K | 50 | 30 | 30 | | 0 | 3500K | ... |
| 8 | GOODNIGHT | 00008.jpg | 23:00 | 18:00–5:00 | 0 | 3500K | 10 | 10 | 10 | | 10 | 2800K | ... |
| 9 | READING BEFORE SLEEP | 00009.jpg | 22:30 | 18:00–5:00 | 0 | 3500K | 0 | 0 | 10 | | 40 | 4500K | ... |
| 10 | DEEP SLEEP | 00010.jpg | 01:00 | 18:00–5:00 | 0 | 3500K | 0 | 0 | 0 | | 0 | 3500K | ... |
| ... | ... | ... | ... | ... | ... | ... | ... | ... | ... | | ... | ... | ... |

FIG. 41

| | SCENE NAME | SCENE ICON | SCENE USER | LIGHTING DEVICE SETTING INFORMATION | | | | | | | | | |
|---|---|---|---|---|---|---|---|---|---|---|---|---|---|
| | | | | A | | B | C | D | E | | |
| | | | | INTENSITY | COLOR | INTENSITY | INTENSITY | INTENSITY | INTENSITY | COLOR | ... |
| 1 | PARTY | 00001.jpg | USER A | 100 | 5000K | 100 | 100 | 80 | 0 | 3500K | ... |
| 2 | MEAL | 00002.jpg | USER A | 30 | 3500K | 100 | 100 | 10 | 0 | 3500K | ... |
| 3 | RELAX | 00003.jpg | USER A | 50 | 2800K | 10 | 10 | 0 | 0 | 3500K | ... |
| 4 | HAPPY HOME | 00004.jpg | USER B | 100 | 5000K | 0 | 0 | 0 | 0 | 3500K | ... |
| 5 | CALMING DOWN | 00005.jpg | USER B | 0 | 3500K | 0 | 0 | 10 | 30 | 4000K | ... |
| 6 | RELAXING IN HOTEL | 00006.jpg | USER A | 0 | 3500K | 0 | 0 | 10 | 10 | 3500K | ... |
| 7 | POWER SAVING | 00007.jpg | USER B | 50 | 4500K | 50 | 30 | 30 | 0 | 3500K | ... |
| 8 | GOODNIGHT | 00008.jpg | USER B | 0 | 3500K | 10 | 10 | 10 | 10 | 2800K | ... |
| ... | ... | ... | ... | ... | ... | ... | ... | ... | ... | ... | ... |

METHOD FOR CONTROLLING MOBILE TERMINAL AND PROGRAM FOR CONTROLLING MOBILE TERMINAL

CROSS REFERENCE TO RELATED APPLICATIONS

This is a divisional application of U.S. patent application Ser. No. 14/563,039, filed Dec. 8, 2014, which is now U.S. Pat. No. 9,572,235 issued on Feb. 14, 2017, and which claims the benefit of Japanese Patent Application No. 2013-273345, filed on Dec. 27, 2013. The entire disclosure of each of the above-identified applications, including the specification, drawings, and claims, is incorporated herein by reference in its entirety.

BACKGROUND

1. Technical Field

The present disclosure relates to a method for controlling a mobile terminal that controls a lighting device that illuminates a space and the like.

2. Description of the Related Art

Currently, a lighting system controller that creates lighting scenes by adjusting the intensity and color of light emitted by a lighting device and that controls the lighting device on the basis of the created scenes has been disclosed (refer to Japanese Unexamined Patent Application Publication (Translation of PCT Application) No. 2011-519128).

SUMMARY

With the lighting system controller in the related art, however, it is difficult for a user to easily select a scene, which is undesirable.

In the lighting system controller in the related art, a scene selection screen remains the same regardless of a situation in which the selects a scene. Therefore, each time the situation in which the user selects a scene changes, the user needs to find and select a scene according to the new situation, which is cumbersome.

Therefore, the present disclosure provides a method for controlling a mobile terminal in which the user can easily select a scene.

In one general aspect, the techniques disclosed herein feature a method for controlling a mobile terminal that includes a display unit and that controls one or more lighting devices that illuminate one or more spaces. The method is used by a computer of the mobile terminal and includes obtaining terminal location information indicating a location of the mobile terminal, rearranging, using a memory storing one or more scenes indicating one or more illumination states established by the one or more lighting devices and one or more pieces of scene location information indicating locations of the one or more scenes while associating the one or more scenes and the one or more pieces of scene location information with each other, one or more scene icons corresponding to the one or more scenes on the basis of the terminal location information and the one or more pieces of scene location information and displaying the rearranged scene icons on the display unit, and transmitting, if one of the one or more scene icons is selected, a control signal for controlling the one or more lighting devices to the one or more lighting devices, so that the one or more spaces are illuminated in an illumination state indicated by a scene corresponding to the selected scene icon.

These general and specific aspects may be implemented using a system, a method, and a computer program, and any combination of systems, methods, and computer programs.

According to the method for controlling a mobile terminal in the present disclosure, the user can easily select a scene.

BRIEF DESCRIPTION OF THE DRAWINGS

FIG. 2 is a diagram illustrating an example of scene information according to the first embodiment.

FIG. 4 is a diagram illustrating an example of operation target lighting information according to the first embodiment.

FIGS. 12A to 12I are diagrams illustrating an example of switching of a screen displayed in the method for creating a scene according to the first embodiment.

FIG. 23A is a flowchart illustrating an example of a method for editing a scene according to the second embodiment.

FIGS. 24A to 24H are diagrams illustrating an example of switching of a screen displayed in the method for editing a scene according to the second embodiment.

FIG. 28 is a diagram illustrating an example of scene information according to the third embodiment.

FIG. 29A is a diagram illustrating an example of a scene selection screen according to the third embodiment.

FIG. 29B is a diagram illustrating another example of the scene selection screen according to the third embodiment.

FIG. 30 is a diagram illustrating an example of a new scene selection screen according to the third embodiment.

FIG. 31B is a flowchart illustrating the example of the method for creating a scene according to the third embodiment.

FIG. 34B is a flowchart illustrating the example of the method for editing a scene according to the fourth embodiment.

FIGS. 35A to 35H are diagrams illustrating an example of switching of a screen displayed in the method for editing a scene according to the fourth embodiment.

FIG. 36 is a diagram illustrating selection history information according to the fourth embodiment.

FIG. 37 is a diagram illustrating an example of scene information according to a modification of the third and fourth embodiments.

FIG. 41 is a diagram illustrating an example of scene information according to a modification of the embodiments.

DETAILED DESCRIPTION

Figure 1:
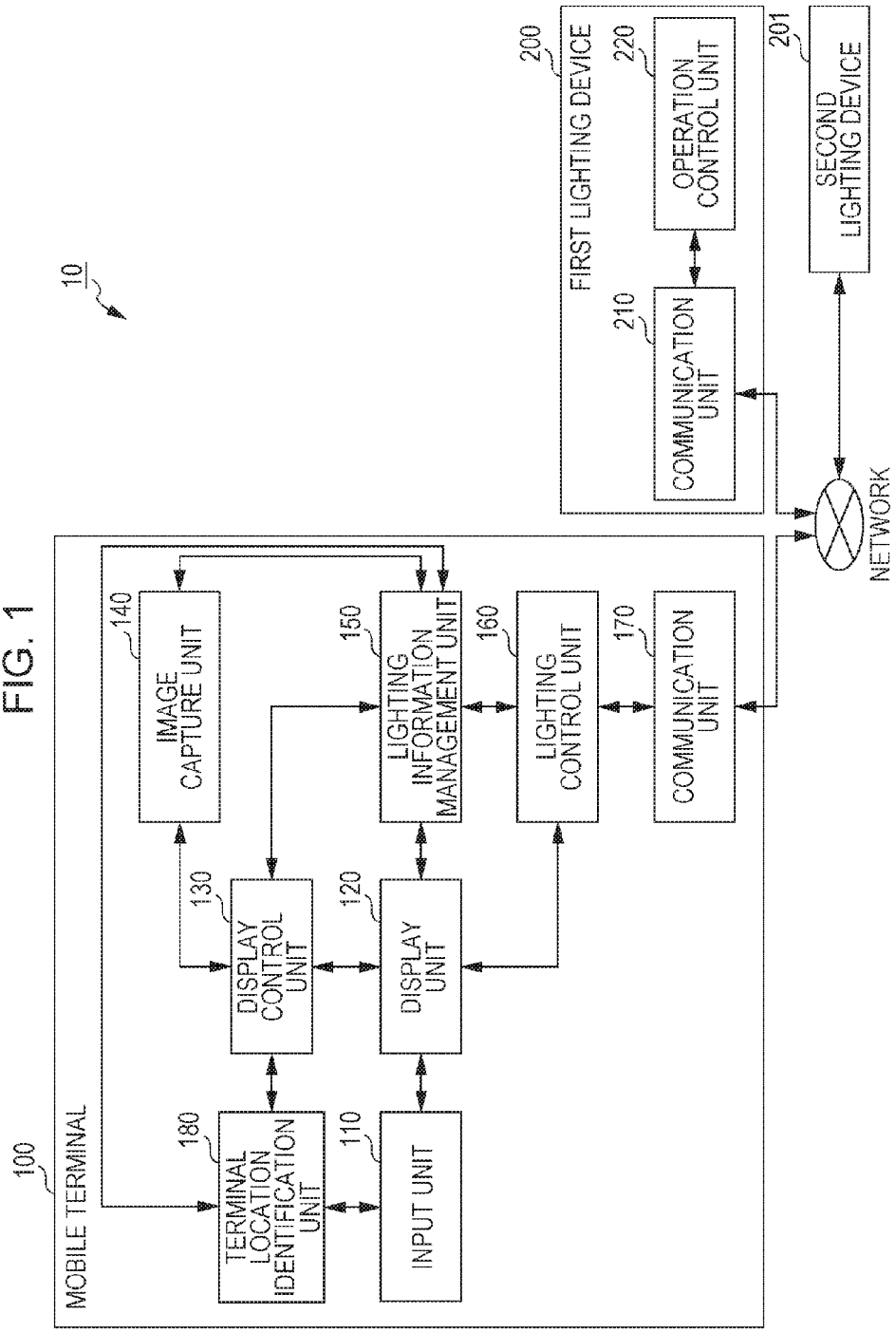
FIG. 1 is a block diagram illustrating an example of a lighting system according to a first embodiment.

Underlying Knowledge Forming Basis of the Present Disclosure

The inventor has found that the following problems arise in a lighting system controller described in the "BACKGROUND".

In the lighting system controller in the related art, created scenes and scene names are associated with each other and recorded. When a user selects a scene, a display displays the scene names. Therefore, the user can control a lighting device on the basis of the scenes created in advance by selecting one of the scene names displayed on the display.

As the number of scenes registered increases, however, it becomes difficult for the user to find a desired scene, which is troublesome. For example, if the number of scenes that can be displayed in one screen is limited, the user needs to perform an operation for switching the screen to find the desired scene.

In addition, it is difficult for the user to understand what a scene is like only by reading the scene name. For example, if a scene was created a long time ago, the user might not remember what kind of scene he/she created. In this case, not only a scene name but also an image indicating the atmosphere of the scene may be displayed.

Even in this case, however, as the number of scenes registered increases, it becomes difficult for the user to find a desired scene, which is troublesome. For example, if all scene names and images are displayed in one screen, the sizes of the scene names and the images become small, thereby making it difficult for the user to find the desired scene.

Therefore, a technique for making easier for the user to select a scene in accordance with a situation in which the user selects a scene is expected.

In order to solve such problems, a method for controlling a mobile terminal according to an aspect of the present disclosure is a method for controlling a mobile terminal that includes a display and a memory, and that controls one or more lighting devices that illuminate one or more spaces. The method causes a computer of the mobile terminal to execute obtaining terminal location information indicating a location of the mobile terminal, rearranging, using the memory storing one or more scenes indicating one or more illumination states established by the one or more lighting devices and one or more pieces of scene location information indicating locations of the one or more scenes while associating the one or more scenes and the one or more pieces of scene location information with each other, one or more scene icons corresponding to the one or more scenes on the basis of the terminal location information and the one or more pieces of scene location information and displaying the rearranged one or more scene icons on the display, and transmitting, if one of the one or more scene icons is selected by the user, a control signal for controlling the one or more lighting devices to the one or more lighting devices, so that the one or more spaces are illuminated in an illumination state indicated by a scene corresponding to the selected scene icon.

Thus, since the one or more scene icons are rearranged on the basis of the terminal location information and the one or more pieces of scene location information and displayed, a scene selection screen according to the location of the mobile terminal can be generated. Therefore, the user can easily select a scene.

In addition, for example, the terminal location information may be information identifying a room or an area in which the mobile terminal is located. Each of the one or more pieces of scene location information may be information identifying a room or an area of each of the one or more scenes.

Thus, a scene selection screen according to a room or an area in which the mobile terminal is located can be generated. Therefore, for example, the method is effective especially at home or in a commercial facility, and the user can easily select a scene.

In addition, for example, in the displaying the one or more scene icons, the one or more scene icons may be rearranged and displayed such that a scene icon corresponding to one of the one or more pieces of scene location information that matches the room or the area identified by the terminal location information is displayed on an area having first priority on the display.

Thus, for example, since scene icons corresponding to a "living room" can be displayed if the user having the mobile terminal is in the "living room" and icons corresponding to a "bedroom" can be displayed if the user is in the "bedroom", the user can easily select a scene.

In addition, for example, the method for controlling a mobile terminal may further include displaying a location input button on the display along with the one or more scene icons, and displaying, if the location input button is selected by the user, a first input request screen for enabling the user to input the terminal location information on the display.

Thus, since the user can input the terminal location information, the user can display a desired screen at a desired timing. For example, a user in a certain room can check a scene corresponding to another room. Therefore, usability can be further enhanced.

In addition, for example, the method for controlling a mobile terminal may further include displaying a second input request screen for enabling the user to input the one or more pieces of scene location information on the display.

Thus, since the user can input the scene location information, the user can set a desired scene in a desired place. For example, a user in a certain room can set a scene corresponding to another room. Therefore, usability can be further enhanced.

In addition, for example, the terminal location information may be information identifying a latitude, a longitude, and a floor of the location of the mobile terminal. Each of the one or more pieces of scene location information may be information identifying a latitude, a longitude, and a floor of a location of each of the one or more scenes.

Thus, since the location of the mobile terminal can be identified with values, the scene icons can be accurately rearranged. Therefore, the user can select a scene more easily.

In addition, for example, in the displaying the one or more scene icons, the one or more scene icons corresponding to the one or more pieces of scene location information may be rearranged in order of increasing distance from the location determined by the latitude, the longitude, and the floor identified by the terminal location information and displayed on the display.

Thus, for example, since scenes closer to the location of the mobile station can be displayed first, the user can select a scene more easily.

In addition, for example, the method for controlling a mobile terminal may further include displaying a scene selection screen including the one or more scene icons and a scene setting button on the display, displaying, if the scene setting button is selected by the user, a scene setting screen including a setting screen for setting a new scene indicating a new illumination state established by the one or more lighting devices and a setting complete button on the display, transmitting, to the one or more lighting devices, a control signal for controlling the one or more lighting devices on the basis of setting information indicating the new illumination state set by an operation performed by the user in the setting screen, storing the setting information at a time when the setting complete button is selected by the user in the memory as setting information regarding the new scene, obtaining location information indicating a location of the mobile terminal at a time when the scene setting button or the setting complete button is selected by the user, and storing the obtained location information in the memory as new scene location information indicating a location of the new scene while associating the obtained location information with the new scene.

Thus, since the location of the mobile terminal when the setting of a scene begins or ends can be set as the location of the scene, the location of the scene can be accurately set.

In addition, for example, the mobile terminal further may include an imaging device. The method may further include displaying a scene selection screen including the one or more scene icons and a scene setting button on the display, displaying, if the scene setting button is selected by the user, a scene setting screen including a setting screen for setting a new scene indicating a new illumination state established by the one or more lighting devices and a setting complete button on the display, transmitting, to the one or more lighting devices, a control signal for controlling the one or more lighting devices on the basis of setting information indicating the new illumination state set by an operation performed by the user in the setting screen, activating the imaging device after the setting complete button is selected by the user, storing the setting information at a time when the setting complete button is selected in the memory as setting information regarding the new scene and, if the imaging device captures an image, storing the image in the memory as a scene icon of the new scene, obtaining location information indicating a location of the mobile terminal at a time when the imaging device has captured the image, storing the obtained location information in the memory as new scene location information indicating a location of the new scene while associating the obtained location information with the new scene, and displaying a new scene selection screen including the scene icon of the new scene on the display.

Thus, since the location of the mobile terminal when an image to be set as a scene icon is obtained can be set as the location of a scene, the location of the scene can be set more accurately.

In addition, for example, the method for controlling a mobile terminal may further include obtaining location information indicating a location of the mobile terminal at a time when one of the one or more scene icons is selected by the user, and storing the obtained location information in the memory as scene location information indicating a location of a selected scene, which is a scene corresponding to the selected scene icon, while associating the obtained location information with the selected scene.

Thus, since the location of the mobile terminal when a scene icon is selected can be set as the location of a scene, the location of the scene can be accurately set. That is, since the user sets a location in which the user has actually used the scene as the location of the scene, the location can be set in accordance with the action of the user, thereby making it easier for the user to select the scene in the future.

In addition, for example, the mobile terminal may be capable of communicating with a wireless local area network (LAN) device. In the obtaining the terminal location information, the terminal location information may be obtained by identifying the location of the mobile terminal on the basis of an identifier unique to the wireless local area network device included in wireless signal information transmitted from the wireless local area network device.

Thus, since the terminal location information can be automatically obtained using a wireless LAN function, the amount of work performed by the user decreases, thereby enhancing usability.

In addition, for example, the mobile terminal may be capable of communicating with a BLUETOOTH communication device. In the obtaining the terminal location information, the terminal location information may be obtained by identifying the location of the mobile terminal on the basis of an identifier unique to the BLUETOOTH communication device included in wireless signal information transmitted from the BLUETOOTH communication device.

Thus, since the terminal location information can be automatically obtained using a BLUETOOTH communication function, the amount of work performed by the user decreases, thereby enhancing usability.

In addition, for example, the mobile terminal may include a sensor that receives an electromagnetic wave in a visible light range transmitted from a visible light communication device. In the obtaining the terminal location information, the terminal location information may be obtained by identifying the location of the mobile terminal on the basis of an identifier unique to the visible light communication device included in the electromagnetic wave.

Thus, since the terminal location information can be automatically obtained using visible light communication, the amount of work performed by the user decreases, thereby enhancing usability.

In addition, for example, the mobile terminal may include a microphone that receives an ultrasonic wave transmitted from a speaker. In the obtaining the terminal location information, the terminal location information may be obtained by identifying the location of the mobile terminal on the basis of an identifier unique to the speaker included in the ultrasonic wave.

Thus, since the terminal location information can be automatically obtained using an ultrasonic wave, the amount of work performed by the user decreases, thereby enhancing usability.

In addition, for example, the mobile terminal may include an indoor messaging system (IMES) receiver. In the obtaining the terminal location information, the terminal location information may be obtained by identifying the location of the mobile terminal on the basis of information indicating a latitude, a longitude, and a floor included in wireless signal information transmitted from an indoor messaging system transmitter that communicates with the mobile terminal.

Thus, since the terminal location information can be automatically and accurately obtained using the IMES, the amount of work performed by the user decreases, thereby enhancing usability.

In addition, for example, a method for controlling a mobile terminal that includes a display and a memory, and that controls one or more lighting devices that illuminate one or more spaces. The method causes a computer of the mobile terminal to execute obtaining current time information indicating a current time, rearranging, using the memory storing one or more scenes indicating one or more illumination states established by the one or more lighting devices and one or more pieces of scene time information indicating times of the one or more scenes while associating the one or more scenes and the one or more pieces of scene time information with each other, one or more scene icons corresponding to the one or more scenes on the basis of the current time information and the one or more pieces of scene time information and displaying the rearranged one or more scene icons on the display, and transmitting, if one of the one or more scene icons is selected by the user, a control signal for controlling the one or more lighting devices to the one or more lighting devices, so that the one or more spaces are illuminated in an illumination state indicated by a scene corresponding to the selected scene icon.

Thus, since the one or more scene icons are rearranged on the basis of the current time information and the one or more pieces of scene time information and displayed, a scene selection screen according to the current time can be generated. Therefore, the user can easily select a scene.

In addition, for example, in the displaying the one or more scene icons, the one or more scene icons corresponding to the one or more pieces of scene time information may be rearranged in a reverse chronological order and the rearranged one or more scene icons are displayed on the display.

Thus, for example, since newer scenes can be displayed first, the user can select a scene more easily.

In addition, for example, the method for controlling a mobile terminal may further include obtaining time information indicating a time at which one of the one or more scene icons is selected by the user, and storing the obtained time information in the memory as scene time information indicating the time of a selected scene, which is a scene corresponding to the selected scene icon, while associating the obtained time information with the selected scene.

Thus, since a time at which a scene icon is selected may be set as a time of a scene, the time of the scene can be accurately set. That is, since a time at which the user has actually used the scene can be set as the time of the scene, the time can be set in accordance with the action of the user, thereby making it easier for the user to select the scene in the future.

In addition, for example, the method for controlling a mobile terminal may further include storing, each time one of the one or more scene icons is selected by the user, obtained time information in the memory. In the storing the scene time information, an average time of a plurality of times indicated by a plurality of pieces of time information stored in the memory may be stored in the memory as the scene time information.

Thus, since, if the same scene icon is selected a plurality of times, an average time of a plurality of times at which the scene icon has been selected as a time of the scene, the time of the scene can be set more accurately. That is, since the plurality of times at which the user has actually used the scene are averaged, the time can be set in accordance with the action of the user, thereby making it easier for the user to select the scene in the future.

In addition, for example, the method for controlling a mobile terminal may further include displaying a scene selection screen including the one or more scene icons and a scene setting button on the display, displaying, if the scene setting button is selected by the user, a scene setting screen including a setting screen for setting a new scene indicating a new illumination state established by the one or more lighting devices and a setting complete button on the display, transmitting, to the one or more lighting devices, a control signal for controlling the one or more lighting devices on the basis of setting information indicating the new illumination state set by an operation performed by the user in the setting screen, storing the setting information at a time when the setting complete button is selected by the user in the memory as setting information regarding the new scene, obtaining time information indicating a time at which the scene setting button or the setting complete button has been selected by the user, and storing the obtained time information in the memory as new scene time information indicating a time of the new scene while associating the obtained time information with the new scene.

Thus, since a time at which the setting of a scene begins or ends as a time of the scene, the time of the scene can be accurately set.

In addition, for example, the mobile terminal may further include an imaging device. The method may further include displaying a scene selection screen including the one or more scene icons and a scene setting button on the display, displaying, if the scene setting button is selected by the user, a scene setting screen including a setting screen for setting a new scene indicating a new illumination state established by the one or more lighting devices and a setting complete button on the display, transmitting, to the one or more lighting devices, a control signal for controlling the one or more lighting devices on the basis of setting information indicating the new illumination state set by an operation performed by the user in the setting screen, activating the imaging device after the setting complete button is selected by the user, storing the setting information at a time when the setting complete button is selected by the user in the memory as setting information regarding the new scene and, if the imaging device captures an image, storing the image in the memory as a scene icon of the new scene, obtaining time information indicating a time at which the imaging device has captured the image, storing the obtained time information in the memory as new scene time information indicating a time of the new scene while associating the obtained time information with the new scene, and displaying a new scene selection screen including the scene icon of the new scene on the display.

Thus, since a time at which an image to be set as a scene icon is obtained as a time of a scene, the time of the scene can be set more accurately.

These comprehensive or specific aspects may be realized by a system, an apparatus, an integrated circuit, a computer program, or a recording medium such as a computer-readable compact disc read-only memory (CD-ROM), or may be realized by an arbitrary combination of a system, an apparatus, an integrated circuit, a computer program, and a recording medium.

Embodiments will be specifically described hereinafter with reference to the drawings.

The embodiment that will be described hereinafter indicate comprehensive or specific examples. Values, shapes, materials, components, positions at which the components are arranged, modes in which the components are connected, steps, order of steps, and the like mentioned in the embodiments are examples, and do not limit the present disclosure. In addition, among components described in the embodiments, those not mentioned in independent claims, which indicate broadest concepts, will be described as arbitrary components.

First Embodiment

First, the functional configuration of a lighting system according to a first embodiment will be described with reference to FIG. 1. FIG. 1 is a block diagram illustrating a lighting system 10 according to the first embodiment.

As illustrated in FIG. 1, the lighting system 10 includes a mobile terminal 100, a first lighting device 200, and a second lighting device 201. The mobile terminal 100 is connected to the first lighting device 200 and the second lighting device 201 through a network.

Next, the configuration of the mobile terminal 100 will be described.

The mobile terminal 100 is an example of a terminal that controls one or more lighting devices that illuminate one or more spaces. More specifically, the mobile terminal 100 controls one or more lighting devices (the first lighting device 200 and the second lighting device 201 in the example illustrated in FIG. 1) in such a way as to, for example, turn on or off the one or more lighting devices or adjust the intensity or color of the one or more lighting devices.

The mobile terminal 100 has display and camera functions. For example, the mobile terminal 100 is a mobile information terminal such as a smartphone, a mobile phone, a tablet terminal, or a personal digital assistant (PDA).

As illustrated in FIG. 1, the mobile terminal 100 includes an input unit 110, a display unit 120, a display control unit 130, an imaging device 140, a lighting information management unit 150, a lighting control unit 160, a communication unit 170, and a terminal location identification unit 180.

The input unit 110 receives an operation performed by a user. For example, the input unit 110 receives an operation for selecting or setting a scene performed by the user. More specifically, the input unit 110 receives an operation performed on a graphical user interface (GUI) component (widget) displayed on the display unit 120. The input unit 110 outputs information based on an operation performed by the user to the display control unit 130, the lighting information management unit 150, the lighting control unit 160, the terminal location identification unit 180, or the like.

For example, the input unit 110 detects pressing of a push button displayed on the display unit 120 by the user. In addition, the input unit 110 obtains a value set by the user by operating a slider displayed on the display unit 120. In addition, the input unit 110 obtains a text input by the user in a text box displayed on the display unit 120.

For example, the input unit 110 is one of various sensors in a touch screen (touch panel), such as a capacitive sensor. That is, the input unit 110 realizes an input function of the touch screen. More specifically, the input unit 110 receives an operation performed by the user on a GUI component displayed on the touch screen. More specifically, the input unit 110 detects pressing of a push button or an operation performed on a slider displayed on the touch screen or obtains a text or the like input through a software keyboard. Alternatively, the input unit 110 may be a physical button provided for the mobile terminal 100.

The display unit 120 displays screens (images) generated by the display control unit 130. For example, the display unit 120 displays a scene selection screen, a scene setting screen, a scene name input screen, an image capture confirmation screen, and the like. Each screen includes GUI components that can be operated by the user. Specific examples of the screens displayed on the display unit 120 will be described later.

For example, the display unit 120 is a liquid crystal display or an organic electroluminescent (OEL) display. More specifically, the display unit 120 realizes the display function of the touch screen (touch panel).

The display control unit 130 generates screens to be displayed on the display unit 120. More specifically, the display control unit 130 generates the scene selection screen, the scene setting screen, the scene name input screen, the image capture confirmation screen, and the like. The display control unit 130 displays each generated screen on the display unit 120.

More specifically, the display control unit 130 generates the scene selection screen on the basis of scene information managed by the lighting information management unit 150 and terminal location information obtained by the terminal location identification unit 180. In addition, the display control unit 130 generates the scene setting screen on the basis of operation target lighting information managed by the lighting information management unit 150.

For example, the display control unit 130 includes a central processing unit (CPU), a read-only memory (ROM), and a random-access memory (RAM).

The imaging device 140 realizes the camera function for capturing an image. More specifically, the imaging device 140 is activated after a setting complete button for a new scene is selected. An image captured by the imaging device 140 is managed by the lighting information management unit 150 as a scene icon.

For example, the imaging device 140 is a camera unit. More specifically, the imaging device 140 includes an optical lens and an image sensor. The imaging device 140 converts light incident on the optical lens into an image signal using the image sensor and outputs the image signal.

The activation of the imaging device 140 refers to establishing a state in which the imaging device 140 can capture an image. For example, the activation refers to establishing a state in which an image can be captured by pressing a shutter button. More specifically, the activation refers to activation of application software for capturing an image. For example, the activation refers to displaying a live view image and the shutter button on the display unit 120.

The lighting information management unit 150 manages the scene information and the operation target lighting information. The scene information is information including one or more scenes and one or more pieces of scene location information indicating locations of the corresponding scenes. The operation target light information is information indicating one or more lighting devices that can be controlled by the mobile terminal 100. The scene information and the operation target lighting information will be described later with reference to FIGS. 2 and 4, respectively.

For example, the lighting information management unit 150 is a memory such as a RAM or a nonvolatile memory. Alternatively, the lighting information management unit 150 may be a memory removably attached to the mobile terminal 100.

The lighting control unit 160 generates a control signal for controlling the one or more lighting devices (the first lighting device 200 and the second lighting device 201). The lighting control unit 160 transmits the generated control signal to the one or more lighting devices through the communication unit 170. For example, the lighting control unit 160 includes a CPU, a ROM, and a RAM.

The control signal is generated, for example, for each lighting device and includes a setting parameter according to the function of the corresponding lighting device and a set value. More specifically, the control signal includes information indicating a set value (intensity adjustment ratio) of an intensity adjustment function, a set value (color temperature) of a color adjustment function, or the like.

The communication unit 170 transmits the control signal generated by the lighting control unit 160 to the one or more lighting devices connected through the network.

For example, the communication unit 170 is a communication interface such as a wireless LAN module, a BLUETOOTH (registered trademark) module, or a near field communication (NFC) module. Alternatively, the communication unit 170 may be a wired LAN terminal.

The terminal location identification unit 180 obtains the terminal location information indicating the location of the mobile terminal 100. For example, the terminal location identification unit 180 obtains information indicating the current location of the mobile terminal 100 as the terminal location information. More specifically, the terminal location information is information for identifying a room in which the mobile terminal 100 is located. For example, the terminal location identification unit 180 includes a CPU, a ROM, and a RAM.

In addition, when setting a new scene, the terminal location identification unit 180 obtains location information indicating the location of the mobile terminal 100. The obtained location information is managed by the lighting information management unit 150 as new scene location information, which indicates the location of the new scene, associated with the set new scene.

Next, the one or more lighting devices controlled by the mobile terminal 100 will be described.

The first lighting device 200 and the second lighting device 201 are examples of the one or more lighting devices. The first lighting device 200 and the second lighting device 201 each have, for example, at least either the intensity adjustment function or the color adjustment function. The first lighting device 200 and the second lighting device 201 may be lighting devices of different types or may be lighting devices of the same type.

For example, the first lighting device 200 and the second lighting device 201 are arranged at different positions in one or more spaces. The first lighting device 200 and the second lighting device 201 are arranged in such a way as to illuminate the one or more spaces from different angles.

Here, the one or more spaces are, for example, spaces including a "living room", a "dining room", and a "corridor". That is, each space is a room or a plurality of rooms connected to one another by doors or the like. For example, the first lighting device 200 is a "living ceiling light" that mainly illuminates the "living room", and the second lighting device 201 is a "dining light" that mainly illuminates the "dining room".

The first lighting device 200 and the second lighting device 201 may be arranged in different spaces. That is, the one or more lighting devices may include lighting devices that illuminate different spaces. For example, the first lighting device 200 may be a "living ceiling light" arranged in the "living room", and the second lighting device 201 may be a "bedroom ceiling light" arranged in a "bedroom".

Although an example in which domestic lighting devices are controlled will be described hereinafter, the types of lighting devices to be controlled are not limited to these. For example, one or more lighting devices provided in a commercial facility such as a shopping center, an office building, or a supermarket or a public space may be controlled. At this time, the terminal location information is, for example, information identifying an area in which the mobile terminal 100 is located.

An area is a certain region and need not necessarily be a region defined by walls or partitions. More specifically, an area may be a "shop (tenant)", a "passage", an "elevator hall", or the like in the shopping center or an office building or a "checkout counter", a "fish section", a "vegetable section", or the like in a supermarket.

As illustrated in FIG. 1, the first lighting device 200 includes a communication unit 210 and an operation control unit 220. Although not illustrated, the second lighting device 201 includes the communication unit 210 and the operation control unit 220.

The communication unit 210 receives a control signal transmitted from the mobile terminal 100. The communication unit 210 may receive a control signal transmitted from the communication unit 170 of the mobile terminal 100 through a communication device such as a bridge or a router.

For example, the communication unit 210 is a communication interface such as a wireless LAN module, a BLUETOOTH (registered trademark) module, or an NFC module. Alternatively, the communication unit 210 may be a wired LAN terminal.

The operation control unit 220 adjusts the intensity and color of the first lighting device 200 on the basis of the control signal received by the communication unit 210. For example, the operation control unit 220 adjusts the intensity and color of the first lighting device 200 in accordance with set values included in the control signal.

As described above, in the lighting system 10 according to this embodiment, the intensity and color of each of the first lighting device 200 and the second lighting device 201 are adjusted on the basis of control signals transmitted from the mobile terminal 100. Thus, in this embodiment, the mobile terminal 100 controls the one or more lighting devices to adjust the illumination states of the one or more spaces.

Next, the screens generated by the display control unit 130 and displayed on the display unit 120 will be described with reference to FIGS. 2 to 9.

Figure 3A:
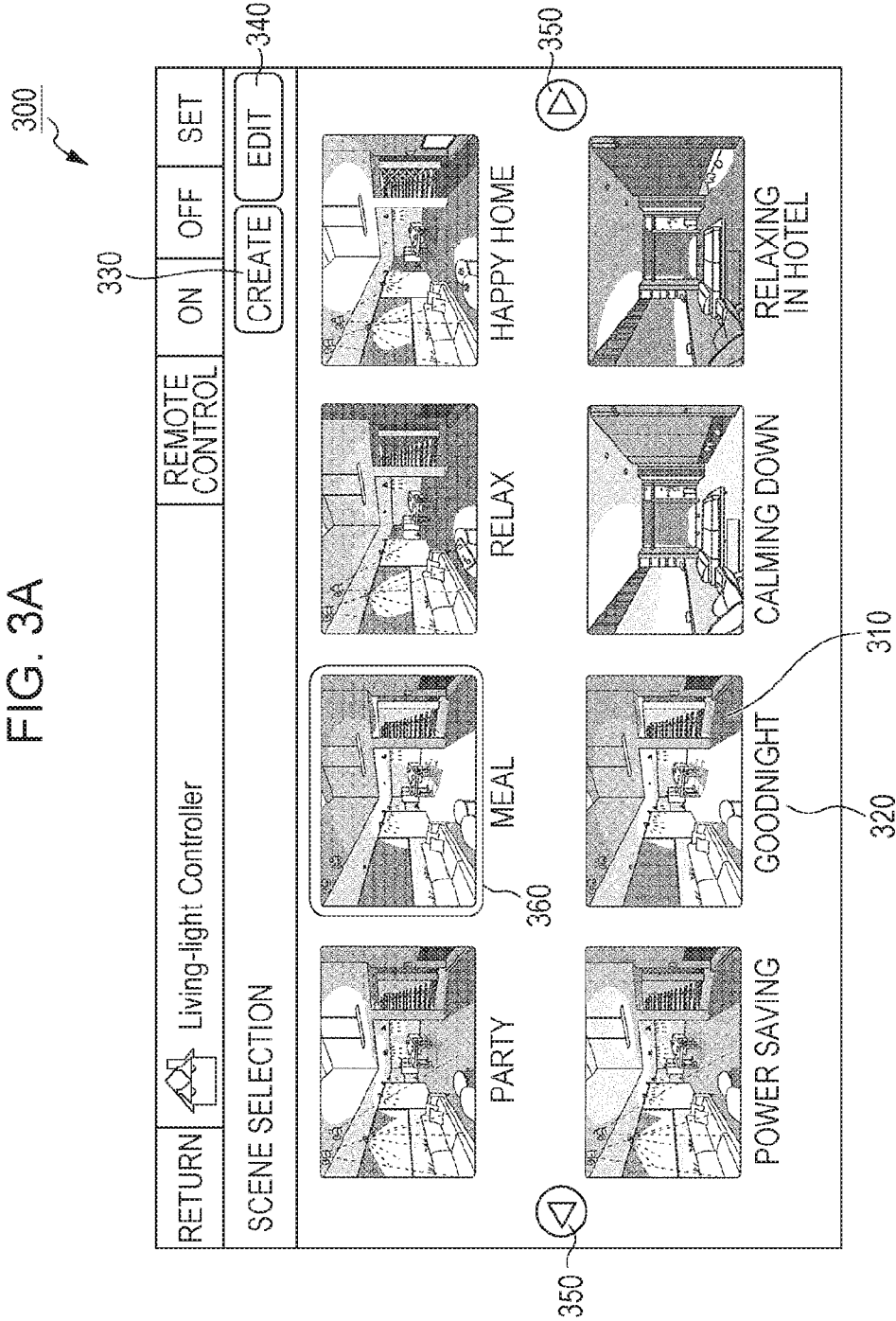
FIG. 3A is a diagram illustrating an example of a scene selection screen according to the first embodiment.
Figure 3B:
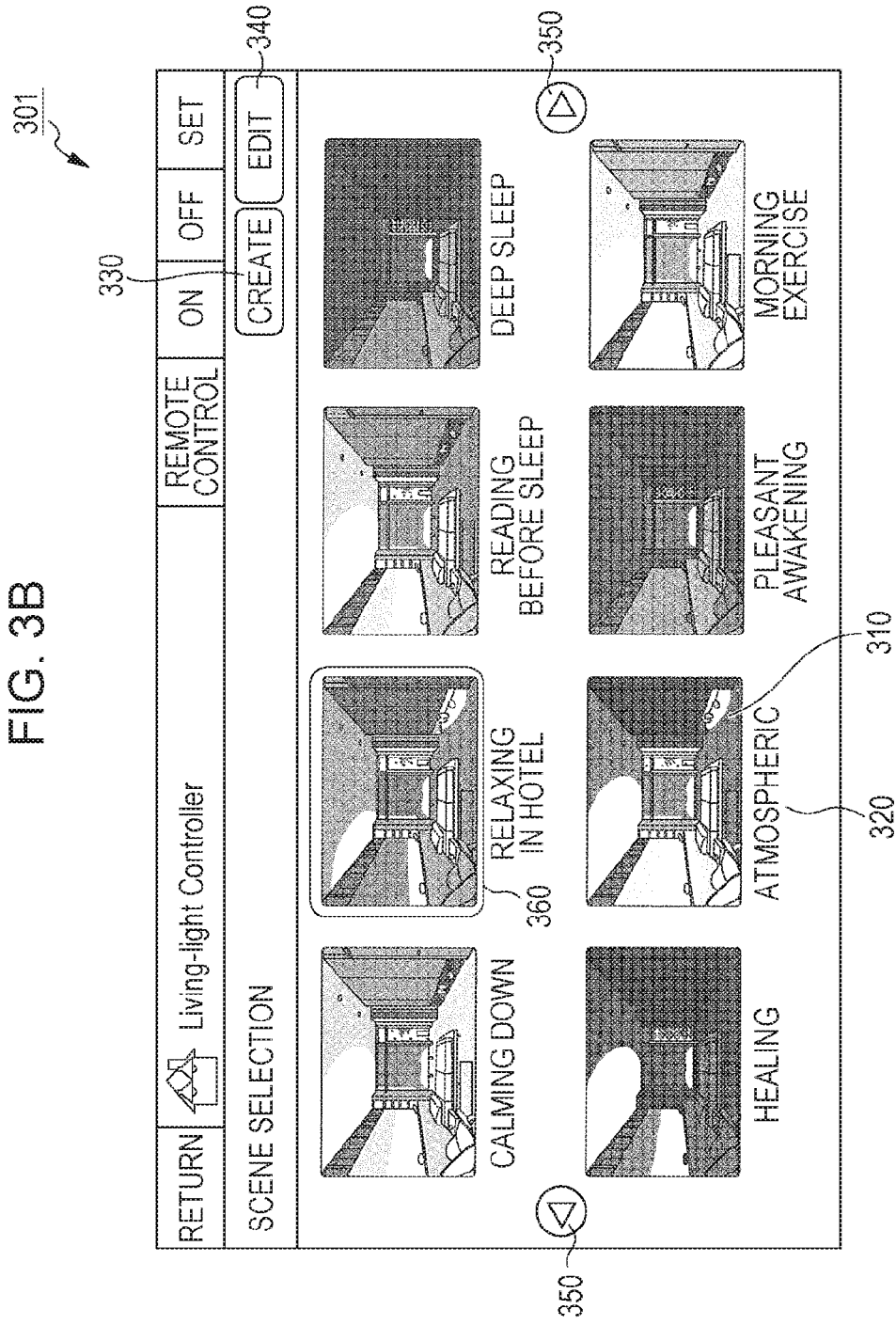
FIG. 3B is a diagram illustrating another example of the scene selection screen according to the first embodiment.

First, the scene information managed by the lighting information management unit 150 and the scene selection screen generated on the basis of the scene information will be described with reference to FIGS. 2, 3A, and 3B. FIG. 2 is a diagram illustrating an example of the scene information according to the first embodiment. FIGS. 3A and 3B are diagrams illustrating scene selection screens 300 and 301, respectively, according to the first embodiment.

The scene information is information indicating one or more scenes. The one or more scenes refer to one or more illumination states of the one or more spaces established by the one or more lighting devices. An illumination state is associated with each scene.

As illustrated in FIG. 2, the scene information includes scene names, scene icons, scene locations (scene location information), and lighting device setting information. A scene name, a scene icon, scene location information, and lighting device setting information are associated with one another for each scene. That is, the lighting information management unit 150 manages each scene by associating a scene name, a scene icon, scene location information, and lighting device setting information with one another.

The scene name is a name set by the user in order to identify a scene. More specifically, the scene name is a text input by the user through the scene name input screen, which will be described later. As illustrated in FIG. 2, the user can set a name with which the user can easily imagine the illumination state, such as "party" or "meal", as the scene name. Accordingly, the user can easily estimate the atmosphere of the scene.

The scene icon is an image captured by the imaging device 140. For example, the image is an image obtained by capturing an image of a space illuminated by the one or more lighting devices. In the example illustrated in FIG. 2, a scene and a scene icon are associated with each other. In some cases, a predetermined default image might be registered as the scene icon, instead of an image captured by the imaging device 140.

The scene location information is information indicating the location of the corresponding scene. For example, the scene location information is information indicating the location of a space illuminated in the illumination state indicated by the corresponding scene. More specifically, the scene location information is information indicating the location of the mobile terminal 100 at a time when the corresponding scene is set or selected. For example, the scene location information is information for identifying a room or an area such as the "living room" or the "bedroom".

The setting information is information indicating the illumination state set by the user in the scene setting screen, which will be described later. More specifically, the setting information is information indicating the setting parameter and the set value of each of the one or more lighting devices. For example, since each lighting device has at least either the intensity adjustment function or the color adjustment function, the setting information includes at least either intensity adjustment setting information or the color adjustment setting information regarding each of the one or more lighting devices.

The intensity adjustment function is a function of adjusting the intensity of light emitted by a lighting device. The set value (intensity adjustment ratio) of the intensity adjustment function is, for example, indicated by a value of 0 to 100. As the intensity adjustment ratio increases, the intensity of light emitted by a lighting device becomes higher. When the intensity adjustment ratio is 0, the lighting device is turned off, and when the intensity adjustment ratio is 100, the lighting device is turned on with maximum power.

The color adjustment function is a function of adjusting the color of light emitted by a lighting device. More specifically, the color adjustment function is a function of adjusting the color temperature of light. The set value (color temperature) of the color adjustment function is, for example, indicated by a value of 2,100 to 5,000 K. As the color temperature decreases, the color becomes warmer, and as the color temperature increases, the color becomes colder. For example, the color temperature of "incandescent" is about 2,800 K, the color temperature of "warm white" is about 3,500 K, and the color temperature of "daylight" is about 5,000 K.

The one or more lighting devices may include a lighting device having only a turn-on function and a turn-off function. In this case, the lighting device may be used as a lighting device whose intensity adjustment ratio can be set to either 0 or 100.

If a scene different from existing scenes is set, the scene is registered to the scene information as a new scene. At this time, if the new scene is newly created, the scene name, the scene icon, the scene location information, and the setting information of the new scene are added to the scene information. Details of the creation of a new scene will be described later.

On the other hand, if a new scene is set by editing an existing scene, the scene name, the scene icon, the scene location information, and the setting information of the new scene replace the scene name, the scene icon, the scene location information, and the setting information of the existing scene. Details of the editing of an existing scene will be described in a second embodiment.

The scene selection screen is generated on the basis of the above-described scene information. For example, the display control unit 130 rearranges one or more scene icons corresponding to one or more scenes on the basis of the terminal location information and one or more pieces of scene location information and displays the scene selection screen on the display unit 120. More specifically, the display control unit 130 rearranges the one or more scene icons such that scene icons corresponding to, among the one or more pieces of scene location information, a piece of scene location information that matches a room or an area identified by the terminal location information are displayed first on the display unit 120.

For example, the display control unit 130 generates the scene selection screen 300 illustrated in FIG. 3A or the scene selection screen 301 illustrated in FIG. 3B on the basis of the scene information illustrated in FIG. 2 and the terminal location information obtained by the terminal location identification unit 180 and displays the scene selection screen 300 or 301 on the display unit 120.

The scene selection screens 300 and 301 are screens for enabling the user to select one of the one or more scenes. In addition, the scene selection screens 300 and 301 each include scene setting buttons for setting a new scene.

As illustrated in FIGS. 3A and 3B, the scene selection screens 300 and 301 each include one or more scene icons 310, scene names 320, a create button 330, an edit button 340, and scroll buttons 350.

Each of the one or more scene icons 310 corresponds to each of the one or more scenes. The scene icons 310 are images captured by the imaging device 140. More specifically, the scene icons 310 are images obtained by capturing images of spaces illuminated in the illumination states indicated by the corresponding scenes.

The user may select one of the scene icons 310. That is, the user selects one of the scene icons 310 by touching the touch screen with his/her finger or the like. Upon detecting selection of one of the scene icons 310, the input unit 110 transmits information indicating the selected scene icon 310 to the display control unit 130 and the lighting control unit 160.

For example, as illustrated in FIG. 3A, the scene icon 310 with the scene name "meal" is surrounded by a certain frame 360. This means that the scene icon 310 with the scene name "meal" is currently selected and the space is illuminated in the illumination state corresponding to the scene icon 310 with the scene name "meal".

The method for indicating that one of the scene icons 310 is selected is not limited to this. For example, the selected scene icon 310 may be highlighted or flash. Alternatively, the scene name 320 corresponding to the selected scene icon 310 may be displayed in bold.

The scene icons 310 are rearranged on the basis of the scene location information and the terminal location information and displayed. More specifically, the scene icons 310 are rearranged and displayed such that scene icons 310 corresponding to, among the plurality of pieces of scene location information included in the scene information, a piece of scene location information that matches the terminal location information are displayed first.

The scene names 320 are displayed under the corresponding scene icons 310. The scene names 320 may be displayed anywhere near the corresponding scene icons 310. For example, the scene names 320 may be displayed to the left or right of the corresponding scene icons 310 or may be displayed above the corresponding scene icons 310. Alternatively, the scene names 320 may be superimposed upon the corresponding scene icons 310.

Alternatively, the scene names 320 need not be displayed. If the scene names 320 are displayed, not only the scene icons 310 but also the scene names 320 may be selectable.

The create button 330 and the edit button 340 are examples of the scene setting buttons. The create button 330 is a button for newly create a scene, and the edit button 340 is a button for editing an existing scene.

The create button 330 and the edit button 340 are examples of the GUI components and may be, for example, push buttons. If the user selects the create button 330 or the edit button 340, a scene creation screen or a scene edit screen, which will be described later, is displayed on the display unit 120. More specifically, when the input unit 110 detects pressing of the create button 330 or the edit button 340, the display control unit 130 generates the scene creation screen or the scene edit screen and displays the scene creation screen or the scene edit screen on the display unit 120.

In the first embodiment, a case in which the create button 330 is selected will be described. A case in which the edit button 340 is selected will be described in the second embodiment.

The scroll buttons 350 are buttons for changing the scene icons 310 to be displayed. That is, the scroll buttons 350 are buttons for switching the display of the scene icons 310. For example, if scenes more than the maximum number of scenes that can be displayed in the scene selection screen 300 have been set, the user can display scene icons 310 corresponding to other scenes in the scene selection screen 300 by selecting one of the scroll buttons 350.

The scroll buttons 350 are examples of the GUI components and may be, for example, push buttons. The scroll buttons 350 need not be push buttons but may be replaced by a scroll bar.

In the example illustrated in FIG. 3A, eight scene icons 310 are displayed in the scene selection screen 300. At this time, if ten scenes have been set, the display control unit 130 generates the scene selection screen 300 including scene icons 310 corresponding to the other two scenes and displays the scene selection screen 300 if the input unit 110 detects pressing of one of the scroll buttons 350.

More specifically, the scroll buttons 350 are buttons for switching a page. For example, if one of the scroll buttons 350 is selected, the display control unit 130 changes the screen in which the eight scene icons 310 are displayed to the screen in which the two scene icons 310 are displayed.

Alternatively, if one of the scroll buttons 350 is selected, the display control unit 130 may replace a certain number of scene icons 310, that is, one or more scene icons 310, to display other scene icons 310. For example, if the right scroll button 350 is selected, the display control unit 130 may remove the scene icon 310 with the scene name "party", move the remaining seven scene icons 310 forward, and display another scene icon 310.

Now, a process for rearranging the scene icons 310 on the basis of the terminal location information and the one or more pieces of scene location information will be described by comparing the scene selection screen 300 illustrated in FIG. 3A and the scene selection screen 301 illustrated in FIG. 3B.

The scene selection screen 300 illustrated in FIG. 3A is a scene selection screen displayed when the location of the mobile terminal 100 is the "living room". For example, if the terminal location information is information identifying the "living room", the display control unit 130 gives higher priority in display to scenes in the "living room". The display control unit 130 then generates the scene selection screen 300 on the basis of the set priority in display and displays the scene selection screen 300 on the display unit 120.

Therefore, as illustrated in FIG. 3A, scene icons 310 corresponding to the scenes in the "living room" are displayed first among the plurality of scene icons 310. More specifically, as illustrated in FIG. 2, the scenes in the "living room" are six scenes, namely "party", "meal", "relax", "happy home", "power saving", and "goodnight". Therefore, these six scene icons 310 are displayed first.

On the other hand, the scene selection screen 301 illustrated in FIG. 3B is a scene selection screen displayed when the location of the mobile terminal 100 is the "bedroom". More specifically, if the terminal location information is information identifying the "bedroom", the display control unit 130 gives higher priority in display to scenes in the "bedroom". The display control unit 130 then generates the scene selection screen 301 on the basis of the set priority in display and displays the scene selection screen 301 on the display unit 120.

As illustrated in FIG. 3B, scene icons 310 corresponding to the scenes in the "bedroom" are displayed first among the plurality of scene icons 310. More specifically, eight scene icons 310 corresponding to the scenes in the "bedroom", such as "calming down", "relaxing in hotel", and "reading before sleep" are displayed.

As described above, the display control unit 130 rearranges the scene icons 310 and displays scene icons 310 corresponding to scenes having higher priority in display first, so that the scene selection screen displayed on the display unit 120 changes in accordance with the location of the mobile terminal 100. A specific example of a process for setting priority in display for a plurality of scenes will be described later with reference to FIG. 11.

For example, if the number of scene icons 310 that can be displayed in one screen is N (N is a natural number), the display control unit 130 generates the scene selection screen 300 or 301 including scene icons 310 corresponding to N scenes, that is, a scene having the highest priority in display to a scene having the N-th highest priority in display.

If the scroll buttons 350 are buttons for switching the page and one of the scroll buttons 350 is selected, scene icons 310 corresponding to N scenes, that is, a scene having the (N+1)th highest priority in display to a scene having the 2N-th highest priority in display, are displayed. On the other hand, if the scroll buttons 350 are buttons for replacing the scene icons 310 one by one and one of the scroll buttons 350 is selected, the scene icon 310 corresponding to the scene having the (N+1)th highest priority in display replaces the scene icon 310 corresponding to the scene having the highest priority in display.

Figure 5:
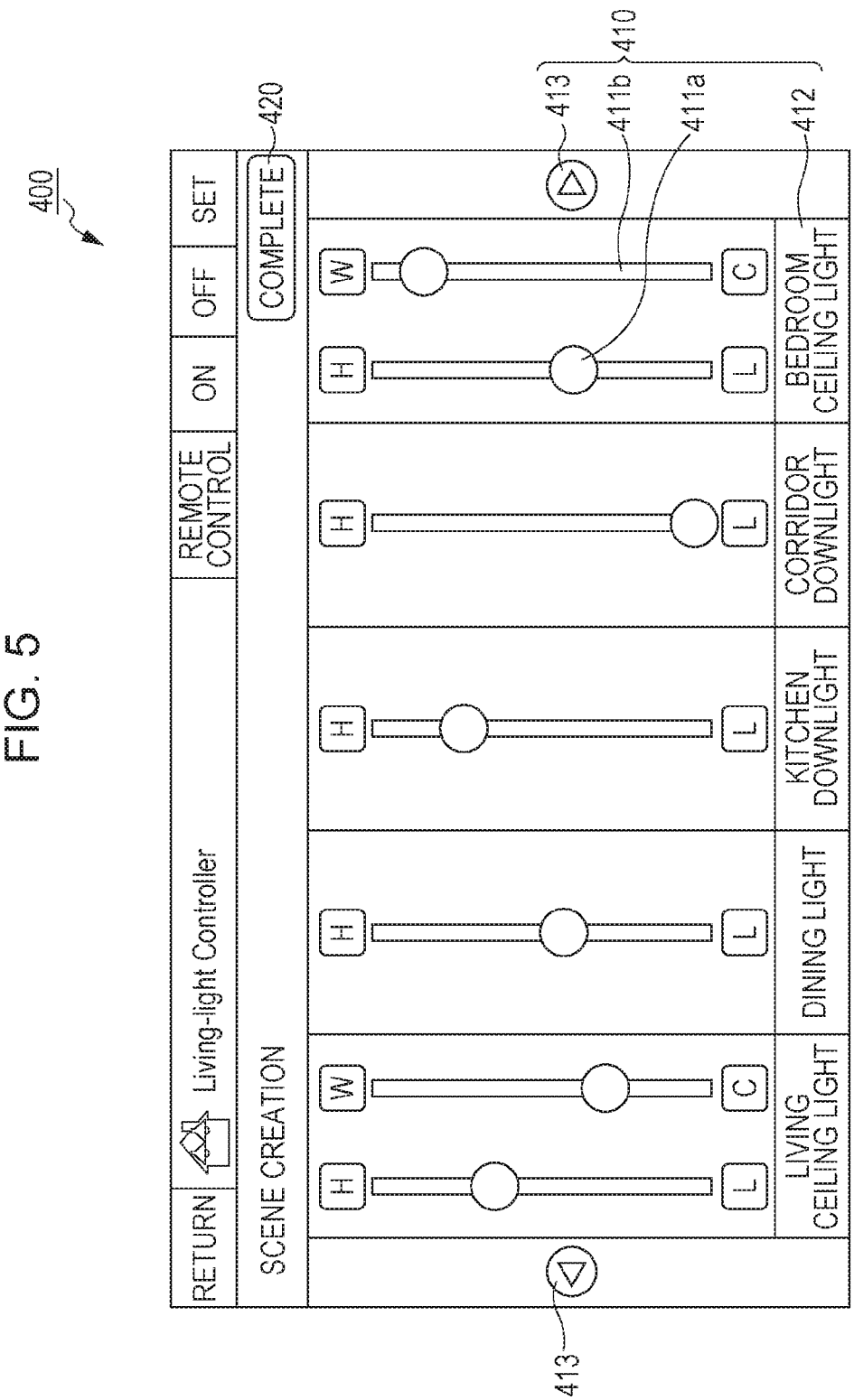
FIG. 5 is a diagram illustrating an example of a scene creation screen according to the first embodiment.

Next, the operation target lighting information managed by the lighting information management unit 150 and the scene creation screen generated on the basis of the operation target lighting information will be described with reference to FIGS. 4 and 5. FIG. 4 is a diagram illustrating an example of the operation target lighting information according to the first embodiment. FIG. 5 is a diagram illustrating a scene creation screen 400 according to the first embodiment.

The operation target lighting information is information indicating one or more lighting devices that can be controlled by the mobile terminal 100.

As illustrated in FIG. 4, the operation target lighting information includes item numbers (type numbers), the names of lighting devices, and setting parameters. An item number, a name of a lighting device, and setting parameters are associated with each lighting device. That is, the lighting information management unit 150 manages each lighting device by associating an item number, a name of a lighting device, and setting parameters.

The item number (type number) is information indicating the type of lighting device. More specifically, the item number is an identifier defined on the basis of the power consumption, the shape, or the function of the lighting device or the like.

The name of a lighting device is a name set by the user in order to identify the lighting device. As illustrated in FIG. 4, the user can set a name with which the user can easily identify the installed position of the lighting device, such as a "living ceiling light" or a "dining light". Therefore, the user can easily identify which lighting device is to be adjusted when trying to set a scene.

The setting parameters are information indicating the adjustable functions of a lighting device. More specifically, the setting parameters are information indicating the intensity adjustment function, the color adjustment function, and the like. As illustrated in FIG. 4, available functions are different between lighting devices.

The operation target lighting information is information generated by the user or the like in advance. In addition, information regarding a new lighting device may be added to the operation target lighting information.

For example, when a new lighting device is registered as an operation target, the mobile terminal 100 asks the user to input the item number of the lighting device to be registered. More specifically, the mobile terminal 100 displays a screen for inputting the item number of the lighting device and obtains a text input through the screen as the item number of the lighting device.

The mobile terminal 100 can obtain the setting parameters of the target lighting device by referring to a certain database using the input item number. The certain database is a database in which a plurality of item numbers and setting parameters are associated with each other and, for example, is saved in a server that can be accessed by the mobile terminal 100 through a network or a memory of the mobile terminal 100.

The mobile terminal 100 then asks the user to input the name of the lighting device to be registered. More specifically, the mobile terminal 100 displays a screen for inputting the name of the lighting device and obtains a text input through the screen as the name of the lighting device.

The scene creation screen is generated on the basis of the above-described operation target lighting information. More specifically, the display control unit 130 generates the scene creation screen 400 illustrated in FIG. 5 on the basis of the operation target lighting information illustrated in FIG. 4 and displays the scene creation screen 400 on the display unit 120.

The scene creation screen 400 is an example of the scene setting screen and is a screen for newly creating a scene separately from existing scenes. The scene creation screen 400 is displayed if the create button 330 is selected in the scene selection screen 300 illustrated in FIG. 3A or the scene selection screen 301 illustrated in FIG. 3B.

As illustrated in FIG. 5, the scene creation screen 400 includes a setting screen 410 and a complete button 420.

The setting screen 410 is a screen for setting a new scene indicating a new illumination state established by the one or more lighting devices. More specifically, the setting screen 410 is a screen for creating a new scene.

As illustrated in FIG. 5, the setting screen 410 includes intensity adjustment sliders 411a, color adjustment sliders 411b, lighting device names 412, and scroll buttons 413. For example, the setting screen 410 includes a lighting device name 412 and a setting slider for each of the one or more lighting devices registered in the operation target lighting information. As the setting slider, for example, at least either the intensity adjustment slider 411a or the color adjustment slider 411b is displayed in accordance with the setting parameters corresponding to each lighting device.

The intensity adjustment sliders 411a are examples of the GUI components and are sliders for setting the values (intensity adjustment ratios) of the intensity adjustment function. That is, the user can adjust the intensity of light emitted by a lighting device by operating the corresponding intensity adjustment slider 411a.

For example, the intensity adjustment slider 411a can set the intensity adjustment ratio using a value of 0 to 100. In the example illustrated in FIG. 5, as the intensity adjustment slider 411a approaches "H", the intensity adjustment ratio becomes closer to 100 and the light emitted by a lighting device becomes brighter. On the other hand, as the intensity adjustment slider 411a approaches "L", the intensity adjustment ratio becomes closer to 0 and the light emitted by a lighting device becomes weaker.

For example, in the case of a lighting device having only the turn-on function and the turn-off function, the corresponding intensity adjustment slider 411a can indicate either 0 or 100 as the intensity adjustment ratio.

The color adjustment sliders 411b are examples of the GUI components and sliders for setting the values (color temperatures) of the color adjustment function. That is, the user can adjust the color of light emitted by a lighting device by operating the corresponding color adjustment slider 411b.

For example, the color adjustment slider 411b can set the color temperature using a value of 2,100 to 5,000 K. In the example illustrated in FIG. 5, as the color adjustment slider 411b approaches "W", the color temperature decreases and the color of the light emitted by a lighting device becomes warmer. On the other hand, as the color adjustment slider 411b approaches "C", the color temperature increases and the color of the light emitted by a lighting device becomes colder.

In the case of a lighting device that does not have the color adjustment function, the color adjustment slider 411b is not displayed. That is, the slider to be displayed for each lighting device is determined on the basis of the setting parameters included in the operation target lighting information.

The lighting device names 412 are displayed near the corresponding intensity adjustment sliders 411a and color adjustment sliders 411b. Although the lighting device names 412 are displayed under the corresponding sliders in the example illustrated in FIG. 5, the lighting device names 412 may be displayed to the left or right of the corresponding sliders or may be displayed above the corresponding sliders. Alternatively, the lighting device names 412 may be superimposed upon the corresponding sliders.

The scroll buttons 413 are buttons for changing the sliders of lighting devices to be displayed. That is, the scroll buttons 413 are buttons for changing the lighting devices to be set (operated). In other words, the scroll buttons 413 are buttons for switching the setting screen for lighting devices. For example, if lighting devices more than the maximum number of lighting devices that can be displayed on the setting screen 410 can be operated, the user can display and operate the slider of another lighting device on the setting screen 410 by selecting one of the scroll buttons 413.

The scroll buttons 413 are examples of the GUI components and, for example, are push buttons. Alternatively, the scroll buttons 413 need not be push buttons but may be replaced by a scroll bar.

In the example illustrated in FIG. 5, five lighting device names 412 and corresponding sliders (intensity adjustment sliders 411a and color adjustment sliders 411b) are displayed on the setting screen 410. At this time, if seven lighting devices can be operated and the input unit 110 detects pressing of one of the scroll buttons 413, the display control unit 130 generates and displays a setting screen 410 including lighting device names and sliders of the other two lighting devices.

More specifically, the scroll buttons 413 are buttons for switching a page. For example, if one of the scroll buttons 413 is selected, the display control unit 130 changes the screen in which the five lighting device names 412 and the corresponding sliders are displayed to the screen in which the other two lighting device names 412 and the corresponding sliders are displayed.

Alternatively, if one of the scroll buttons 413 is selected, the display control unit 130 may replace a certain number of lighting devices, that is, one or more lighting devices, to display other lighting devices. For example, if the right scroll button 413 is selected, the display control unit 130 may remove the lighting device name 412 and the sliders of the "living ceiling light", move the remaining four lighting device names 412 and the corresponding sliders to the left, and display another lighting device name and the corresponding slider(s).

The complete button 420 is an example of a setting complete button and is a button for completing the setting of the one or more lighting devices. That is, the complete button 420 is a button for completing the setting of the illumination state established by the one or more lighting devices and, more specifically, a button for completing the setting of the intensity adjustment ratio and the color temperature.

The complete button 420 is an example of the GUI component and, for example, is a push button. If the user selects the complete button 420, the adjustment of the intensity and color of the one or more lighting devices ends. For example, if the input unit 110 detects pressing of the complete button 420, the display control unit 130 generates the scene name input screen and displays the scene name input screen on the display unit 120.

Alternatively, text boxes may be displayed instead of the intensity adjustment sliders 411a and the color adjustment sliders 411b. The input unit 110 may obtain values input to the text boxes as intensity adjustment ratios or color temperatures.

Alternatively, for example, radio buttons, check boxes, a drop-down list, a list box, or the like including values of, say, 0, 20, 40, 60, 80, and 100 as options may be displayed for the intensity adjustment ratio. Various other GUI components may be used for adjusting intensity and color temperature.

The initial position of each slider when the scene creation screen 400 is displayed may be a position corresponding to a predetermined default value or may be a position corresponding to a set value indicating the current illumination state of the corresponding space. For example, the default value of the intensity adjustment ratio may be 0, 50, 100, or the like, and the default value of the color temperature may be 2,100 K, 3,500 K, 5,000 K, or the like.

Figure 6:
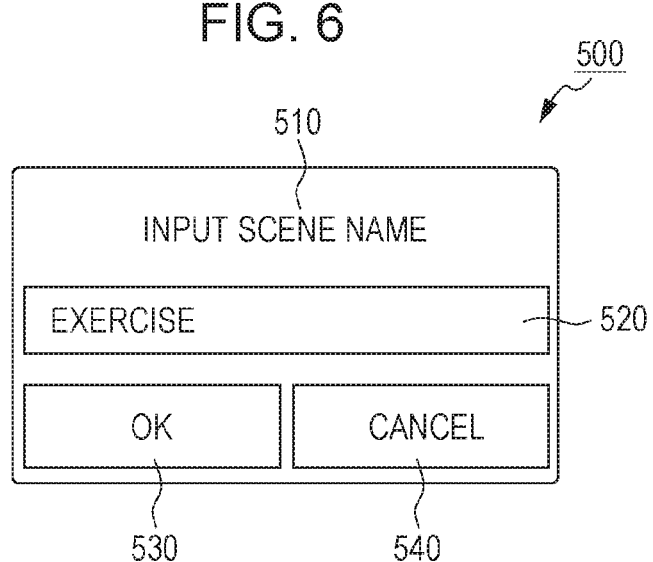
FIG. 6 is a diagram illustrating an example of a scene name input screen according to the first embodiment.

Next, the scene name input screen generated by the display control unit 130 will be described with reference to FIG. 6. FIG. 6 is a diagram illustrating a scene name input screen 500 according to the first embodiment.

The scene name input screen 500 is a screen for enabling the user to input a scene name. The scene name input screen 500 is displayed after the setting of the one or more lighting devices is completed. More specifically, the scene name input screen 500 is displayed if the complete button 420 is selected in the scene creation screen 400 illustrated in FIG. 5.

As illustrated in FIG. 6, the scene name input screen 500 includes a comment 510, a text box 520, an OK button 530, and a cancel button 540.

The comment 510 is a text indicating an operation to be performed by the user. More specifically, the comment 510 is a text for asking the user to input a scene name. For example, as illustrated in FIG. 6, the comment 510, "Input scene name", is displayed. Alternatively, the user may be asked by a sound to input a scene name, instead of the comment 510.

The text box 520 is an example of the GUI component and is an interface for enabling the user to input a text. The text box 520 displays a text input by the user. For example, if the user inputs "exercise", "exercise" is displayed in the text box 520 as illustrated in FIG. 6.

More specifically, the input unit 110 obtains a text input by the user. The display control unit 130 generates the scene name input screen 500 in which the text obtained by the input unit 110 is displayed in the text box 520 and displays the scene name input screen 500 on the display unit 120.

The OK button 530 is an example of the GUI component and, for example, is a push button. The OK button 530 is a button for enabling the user to confirm completion of the input of a scene name.

If the OK button 530 is selected, the text input to the text box 520 is stored in the memory as a scene name. More specifically, if the input unit 110 detects pressing of the OK button 530, the lighting information management unit 150 manages the text input to the text box 520 as a scene name.

The cancel button 540 is an example of the GUI component and, for example, is a push button. The cancel button 540 is a button for enabling the user to confirm cancellation of the input of a scene name.

If the cancel button 540 is selected, the process for inputting a scene name is canceled, and, for example, the scene creation screen 400 is displayed on the display unit 120 to enable the user to set the lighting devices again. Alternatively, if the cancel button 540 is selected, the process for creating a scene may be canceled. That is, if the cancel button 540 is selected, the scene selection screen 300 or 301 may be displayed.

Although an example in which the scene name input screen 500 is displayed by selecting the complete button 420 has been described, the timing at which the scene name input screen 500 is displayed is not limited to this. For example, the scene name input screen 500 may be displayed before the setting of the one or more lighting devices is completed. More specifically, the scene name input screen 500 may be displayed by selecting the create button 330 in the scene selection screen 300 illustrated in FIG. 3A or the scene selection screen 301 illustrated in FIG. 3B. Alternatively, the text box 520 may be displayed at the same time as the scene creation screen 400 is displayed.

Figure 7:
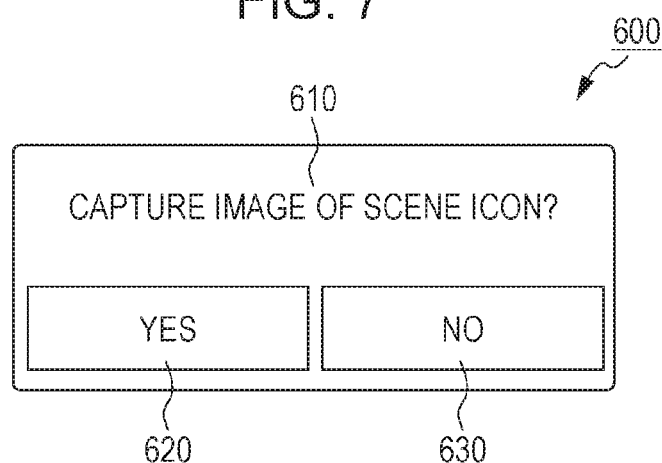
FIG. 7 is a diagram illustrating an example of an image capture confirmation screen according to the first embodiment.

Next, the image capture confirmation screen generated by the display control unit 130 will be described with reference to FIG. 7. FIG. 7 is a diagram illustrating an image capture confirmation screen 600 according to the first embodiment.

The image capture confirmation screen 600 is a screen for enabling the user to confirm whether to capture an image used as a scene icon. In other words, the image capture confirmation screen 600 is a screen for confirming whether to capture an image using the imaging device 140.

The image capture confirmation screen 600 is displayed when the setting of the one or more lighting devices has been completed. For example, the image capture confirmation screen 600 is displayed after the complete button 420 is selected in the scene creation screen 400. More specifically, the image capture confirmation screen 600 is displayed if the OK button 530 is selected in the scene name input screen 500.

As illustrated in FIG. 7, the image capture confirmation screen 600 includes a comment 610, a YES button 620, and a NO button 630.

The comment 610 is a text indicating an operation to be performed by the user. More specifically, the comment 610 is a text for asking the user whether to capture an image using the imaging device 140. For example, as illustrated in FIG. 7, the comment 610, "Capture scene icon?", is displayed. Alternatively, the user may be asked by a sound whether to capture an image, instead of the comment 610.

The YES button 620 is an example of the GUI component and, for example, is a push button. The YES button 620 is an example of an activation button for activating the imaging device 140 and is a button for positively responding to the comment 610.

If the YES button 620 is selected, the imaging device 140 is activated. More specifically, if the input unit 110 detects pressing of the YES button 620, the imaging device 140 can capture an image.

The NO button 630 is an example of the GUI component and, for example, is a push button. The NO button 630 is an example of inactivation button for not activating the imaging device 140 and is a button for negatively responding to the comment 610.

If the NO button 630 is selected, the imaging device 140 is not activated. That is, if the NO button 630 is selected, the imaging device 140 is not activated and a default image is stored in the memory as a scene icon, instead of a captured image. More specifically, if the input unit 110 detects pressing of the NO button 630, the lighting information management unit 150 manages the predetermined default image as a scene icon.

Although an example in which the image capture confirmation screen 600 is displayed by selecting the OK button 530 in the scene name input screen 500 has been described, the timing at which the image capture confirmation screen 600 is displayed is not limited to this. For example, the image capture confirmation screen 600 may be displayed by selecting the complete button 420 in the scene creation screen 400.

Figure 8:
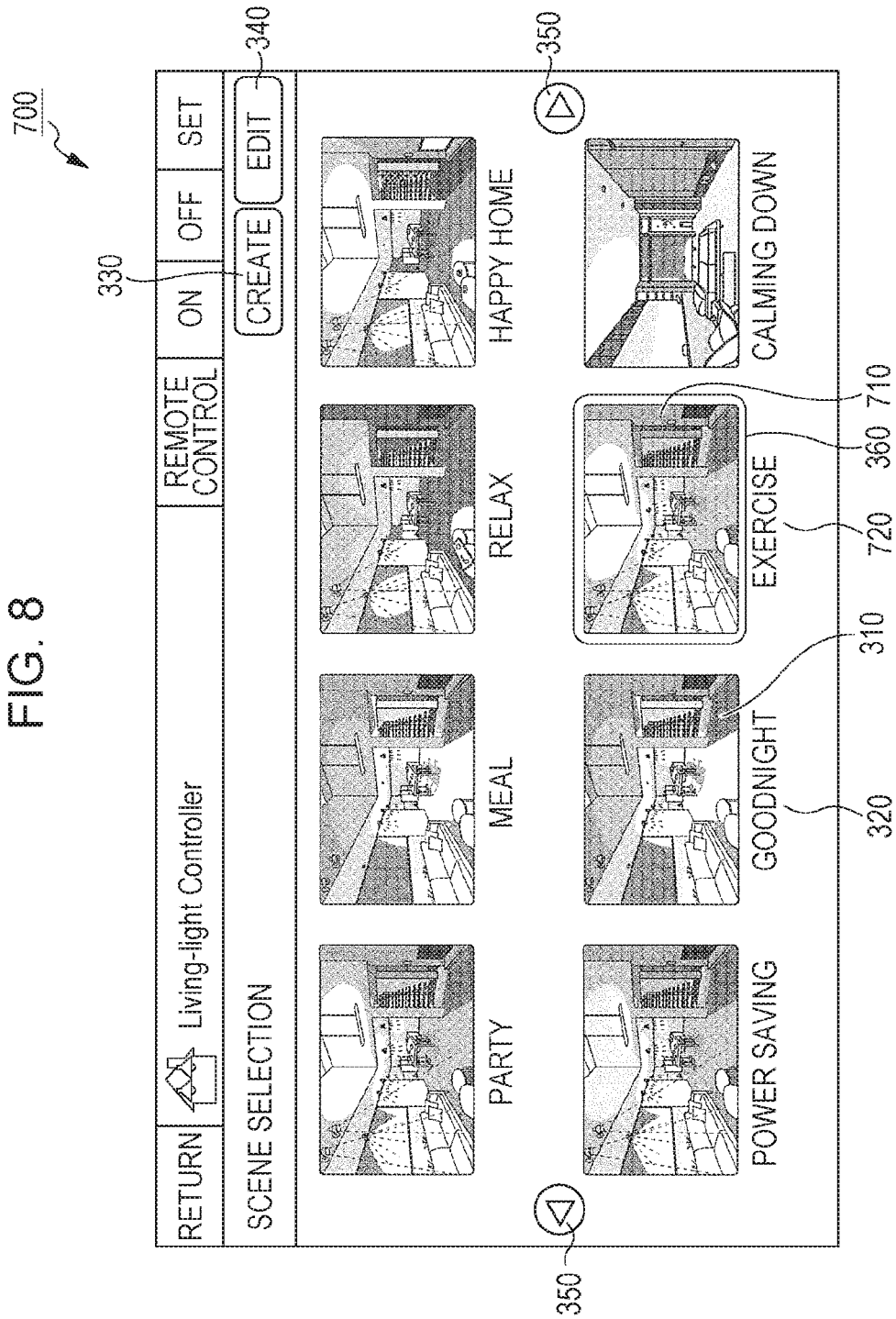
FIG. 8 is a diagram illustrating an example of a new scene selection screen according to the first embodiment.

Next, a new scene selection screen generated by the display control unit 130 will be described with reference to FIG. 8. FIG. 8 is a diagram illustrating a new scene selection screen 700 according to the first embodiment.

The new scene selection screen 700 is a scene selection screen displayed after the setting of a new scene is completed. More specifically, the new scene selection screen 700 is a screen obtained by adding a scene icon of a new scene to an existing scene selection screen.

The new scene selection screen 700 includes one or more scene icons 310, scene names 320, a scene icon 710 of a new scene, and a scene name 720 of the new scene. For example, the new scene selection screen 700 is displayed after the imaging device imaging device 140 captures an image.

The scene icon 710 is a scene icon of the new scene added to an existing scene selection screen (for example, the scene selection screen 300 illustrated in FIG. 3A). More specifically, the scene icon 710 is an image captured by the imaging device 140. For example, the scene icon 710 is an image obtained by capturing an image of a space illuminated in an illumination state indicated by the new scene. More specifically, the scene icon 710 is an image captured by the imaging device 140 after the YES button 620 is selected in the image capture confirmation screen 600 illustrated in FIG. 7.

The scene name 720 is a scene name of the new scene. More specifically, the scene name 720 is a text input to the text box 520 in the scene name input screen 500 illustrated in FIG. 6.

In the new scene selection screen 700, the scene icon 710 of the new scene is displayed in a selected state. More specifically, as illustrated in FIG. 8, the scene icon 710 of the new scene is included in a frame 360. At this time, the one or more lighting devices are illuminating the space in the illumination state indicated by the new scene.

For example, assume that the location of the scene "exercise", which is the new scene, is set as the "living room". In this case, the scene icon 710 of the new scene takes priority in display over scene icons corresponding to the "bedroom". Therefore, as illustrated in FIG. 8, the scene icon 710 of the new scene is displayed between "goodnight", which is a scene in the "living room", and "calming down", which is a scene in the "bedroom". The scene icon 710 of the new scene may be displayed first among the scenes in the "living room" and, for example, displayed in an upper-left portion of the screen.

Figure 9:
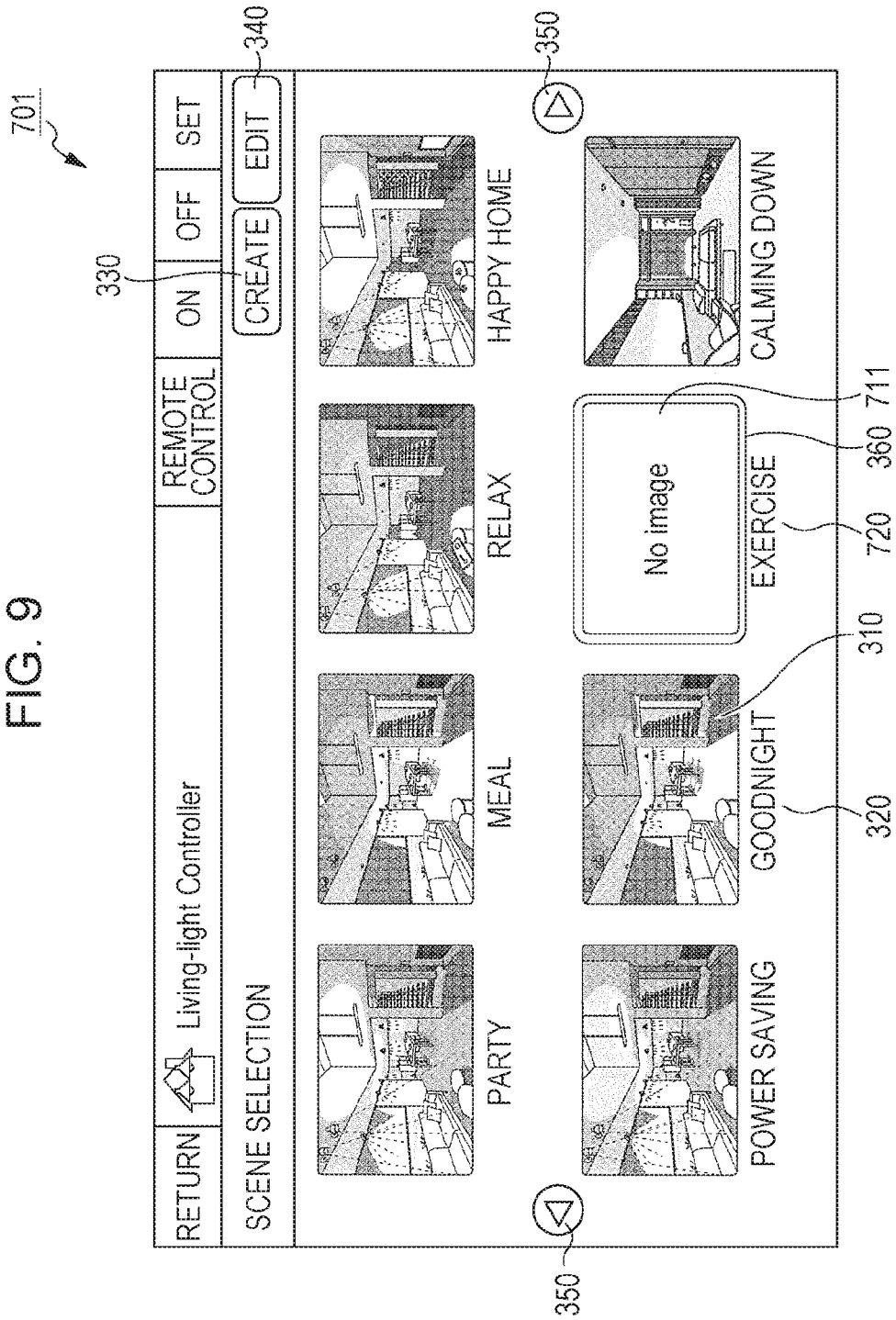
FIG. 9 is a diagram illustrating another example of the new scene selection screen according to the first embodiment.

Here, another example of the new scene selection screen generated by the display control unit 130 will be described with reference to FIG. 9. FIG. 9 is a diagram illustrating a new scene selection screen 701 according to the first embodiment.

The new scene selection screen 701 is a scene selection screen displayed after the setting of a new scene is completed. More specifically, the new scene selection screen 701 is a screen obtained by adding a scene icon of a new scene to an existing scene selection screen.

The new scene selection screen 701 includes a scene icon 711 and a scene name 720 of the new scene. For example, the new scene selection screen 701 is displayed by selecting the NO button 630 in the image capture confirmation screen 600 illustrated in FIG. 7.

The scene icon 711 is a scene icon of the new scene added to an existing scene selection screen (for example, the scene selection screen 300 illustrated in FIG. 3A). More specifically, the scene icon 711 is a default image.

Thus, if the imaging device 140 does not capture an image, a default image is displayed as the scene icon 711 of the new scene.

In the new scene selection screen 701, the scene icon 711 of the new scene is displayed in a selected state. More specifically, as illustrated in FIG. 9, the scene icon 711 of the new scene is included in a frame 360. At this time, the one or more lighting devices are illuminating the space in an illumination state indicated by the new scene.

Figure 10A:
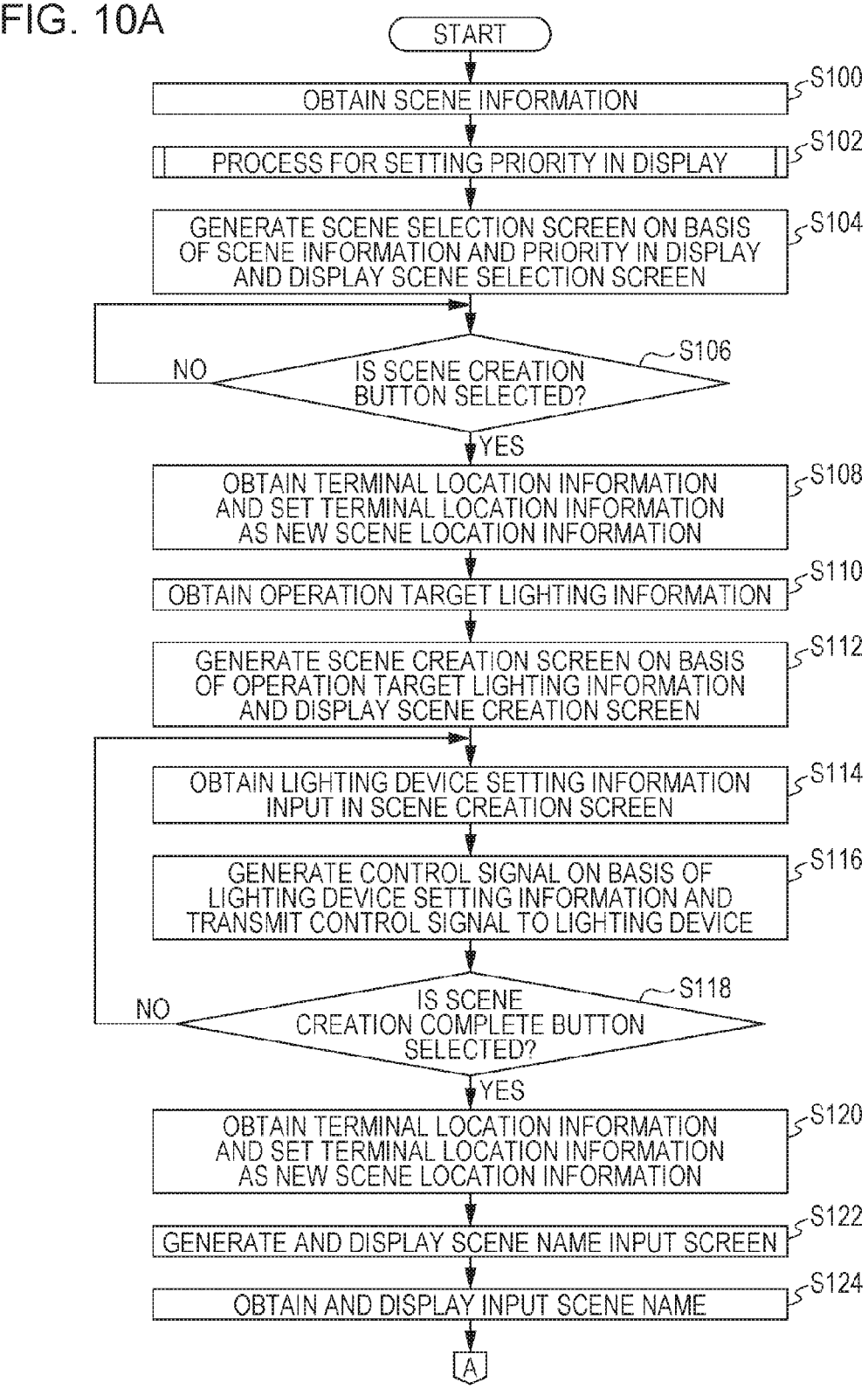
FIG. 10A is a flowchart illustrating an example of a method for creating a scene according to the first embodiment.
Figure 10B:
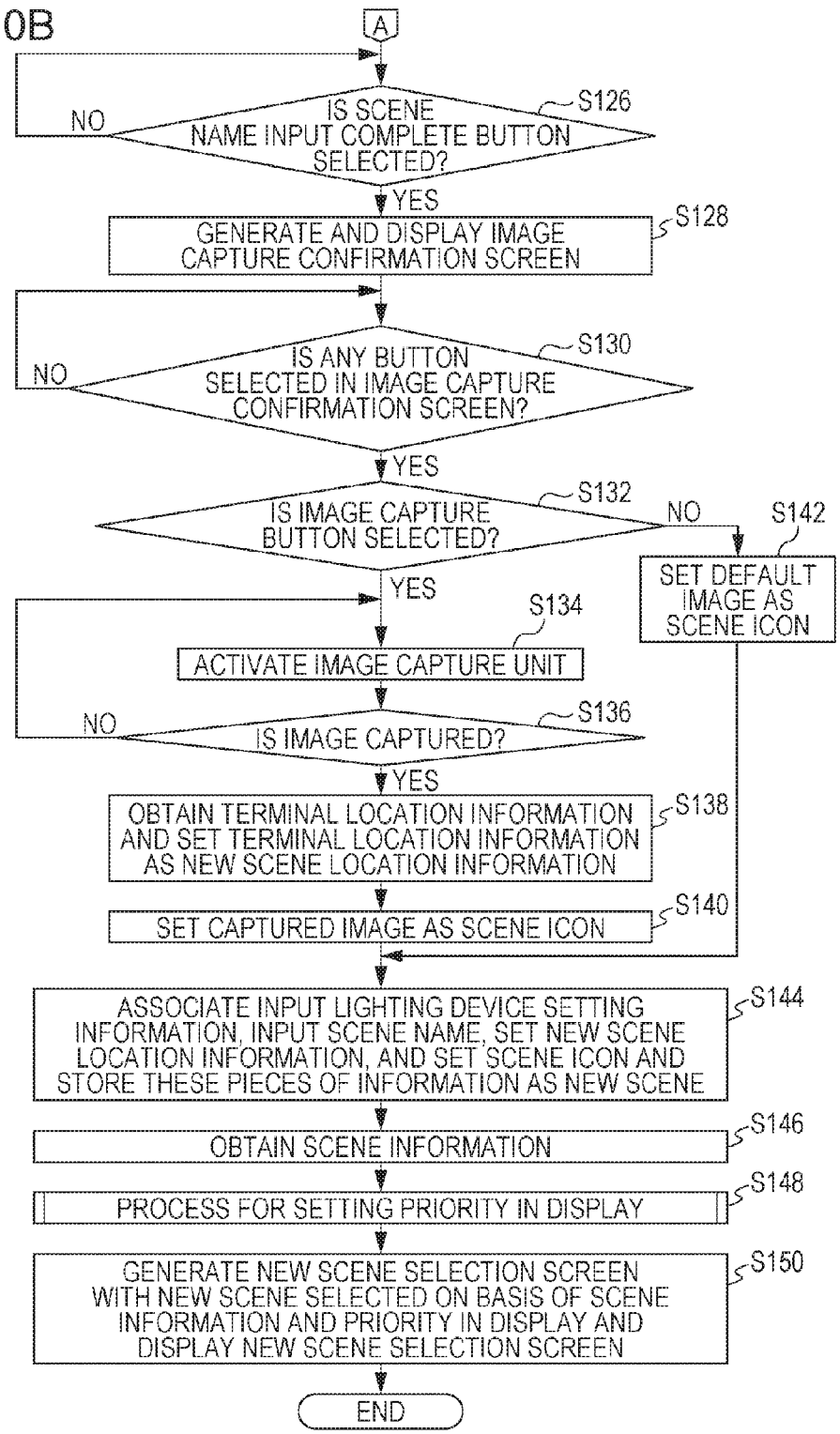
FIG. 10B is a flowchart illustrating the example of the method for creating a scene according to the first embodiment.
Figure 11:
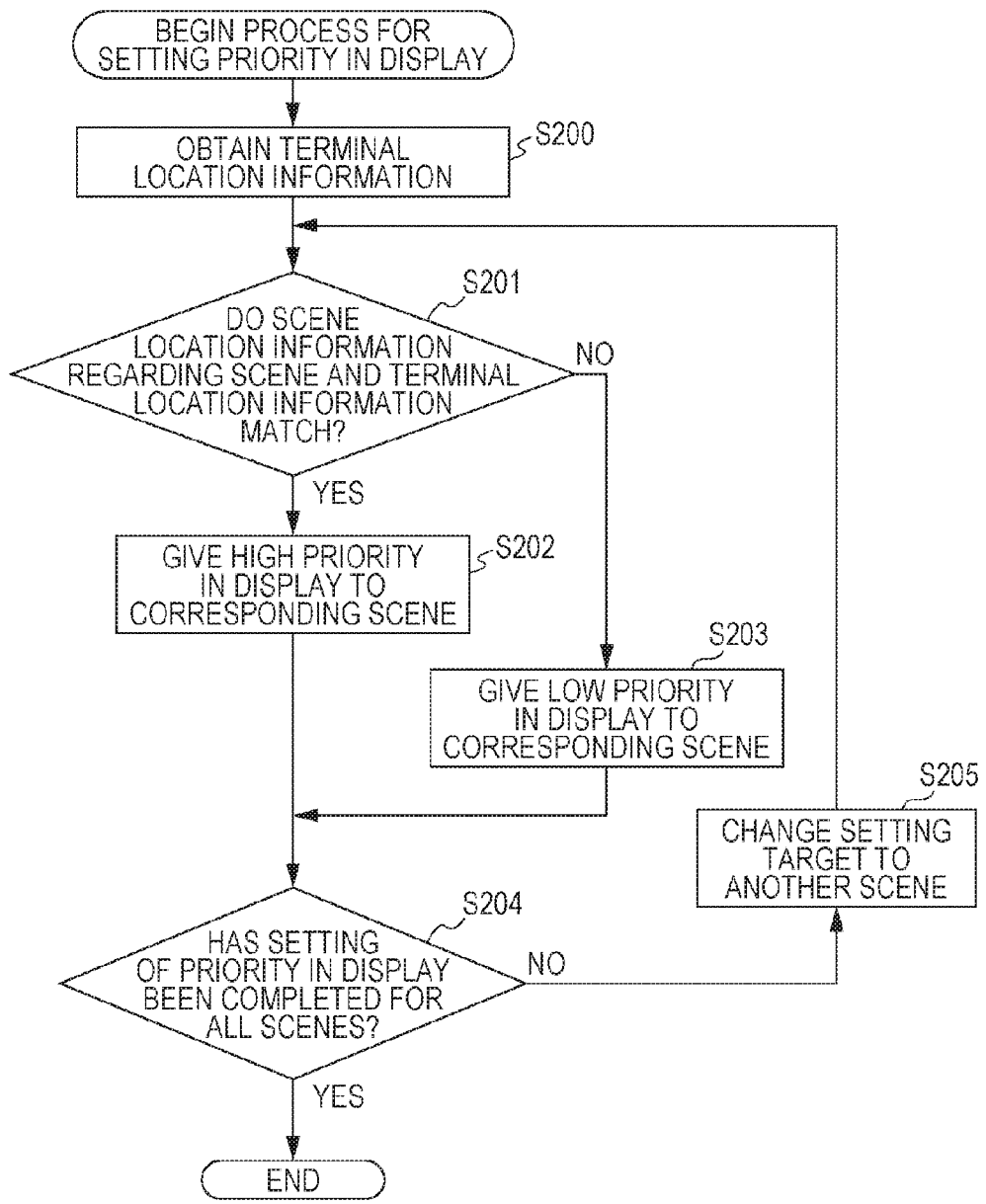
FIG. 11 is a flowchart illustrating an example of a method for setting priority in display according to the first embodiment.

Next, a method for creating a scene according to the first embodiment will be described with reference to FIGS. 10A to 12I. FIGS. 10A and 10B are flowcharts illustrating an example of the method for creating a scene according to the first embodiment. FIG. 11 is a flowchart illustrating an example of a method for setting priority in display according to the first embodiment. FIGS. 12A to 12I are diagrams illustrating an example of switching of the screen displayed in the method for creating a scene according to the first embodiment.

For example, a method for controlling the mobile terminal 100 according to this embodiment is realized by application software for controlling the one or more lighting devices. For example, by activating the application software, the method for creating a scene according to the first embodiment begins.

First, the display control unit 130 obtains the scene information (S100). More specifically, the display control unit 130 reads and obtains the scene information stored in the lighting information management unit 150. The scene information is, for example, the information illustrated in FIG. 2 indicating one or more already created scenes.

Next, the display control unit 130 performs the process for setting priority in display on the basis of the obtained scene information (S102). A specific process will be described with reference to FIG. 11.

As illustrated in FIG. 11, first, the terminal location identification unit 180 obtains the terminal location information indicating the location of the mobile terminal 100 (S200). That is, the terminal location identification unit 180 obtains information for identifying the current location of the mobile terminal 100 as the terminal location information. A method for obtaining the terminal location information used by the terminal location identification unit 180 will be described with reference to FIGS. 13 to 16.

Next, the display control unit 130 determines whether the scene location information regarding one of the scenes included in the scene information and the obtained terminal location information match (S201). More specifically, the display control unit 130 determines whether a room or an area identified by the scene location information and a room or an area identified by the terminal location information match.

If the scene location information and the terminal location information match (YES in S201), the display control unit 130 gives high priority in display to the scene corresponding to the scene location information (S202). More specifically, the display control unit 130 gives relatively high priority in display to the scene corresponding to the scene location information compared to when the scene location information and the terminal location information do not match.

On the other hand, if the scene location information and the terminal location information do not match (NO in S201), the display control unit 130 gives low priority in display to the scene corresponding to the scene location information (S203). For example, the lighting information management unit 150 temporarily manages the set priority in display by associating the set priority in display with a scene icon.

Next, the display control unit 130 determines whether the setting of priority in display has been completed for all the scenes included in the scene information (S204). If the setting of priority in display has not been completed for all the scenes (NO in S204), the display control unit 130 changes the setting target to another scene for which priority in display has not been set (S205), and then compares the location information (S201) and sets priority in display (S202 or S203).

If the setting of priority in display has been completed for all the scenes included in the scene information (YES in S204), the process for setting priority in display ends.

As a result of the above-described operation, for example, if the terminal location information is information identifying the "living room", the display control unit 130 gives high priority in display to the scenes whose location is the "living room". On the other hand, the display control unit 130 gives lower priority in display to other scenes, such as scenes whose location is the "bedroom", than the scenes whose location is the "living room".

Figure 12C:
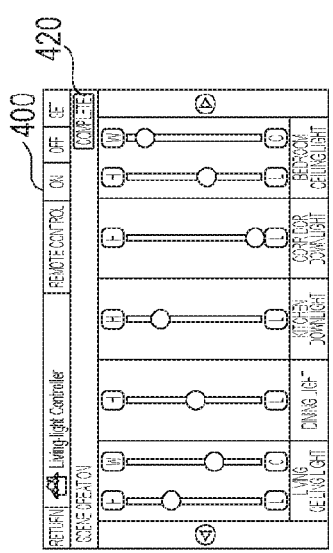
Figure 12B:
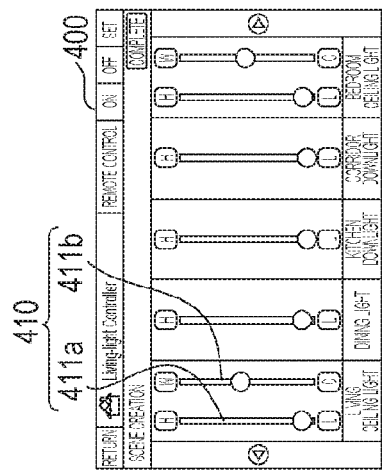
Figure 12A:
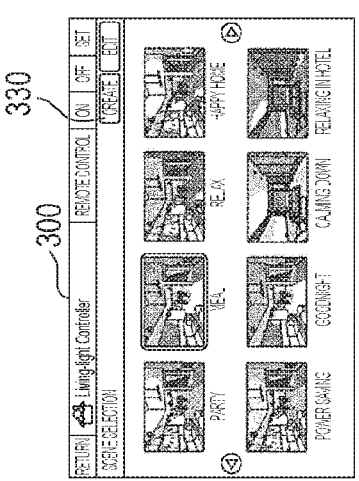

Next, as illustrated in FIG. 10A, the display control unit 130 generates the scene selection screen on the basis of the obtained scene information and the set priority in display and displays the generated scene selection screen on the display unit 120 (S104). For example, the display control unit 130 generates the scene selection screen by rearranging the one or more scene icons 310 in order of priority in display and displays the scene selection screen on the display unit 120. As a result, for example, as illustrated in FIG. 12A, the scene selection screen 300 in which the scene icons 310 whose location is the "living room" are displayed first is displayed on the display unit 120. Details of the scene selection screen 300 are as described with reference to FIG. 3A.

Next, if a scene creation button (the create button 330) is selected (YES in S106), the display control unit 130 obtains the location information regarding the mobile terminal 100 and sets the obtained location information as new scene location information indicating the location of the new scene (S108). For example, if the scene creation button is selected, the terminal location identification unit 180 identifies the location of the mobile terminal 100 and outputs location information indicating the identified location to the display control unit 130. Thus, if the scene creation button is selected, the display control unit 130 obtains the location information indicating the location of the mobile terminal 100 using the terminal location identification unit 180. The display control unit 130 then sets the obtained location information as the new scene location information, which is managed by the lighting information management unit 150.

If the scene creation button (the create button 330) is not selected (NO in S106), the display control unit 130 waits until the create button 330 is selected. At this time, if one of the one of more scene icons 310 is selected, the display control unit 130 displays the selected scene icon 310 while adding the certain frame 360 around the scene icon. In addition, the lighting control unit 160 generates a control signal for controlling the one or more lighting devices in order to illuminate the space in the illumination state indicated by the scene corresponding to the selected scene icon 310. The lighting control unit 160 then transmits the generated control signal to the one or more lighting devices through the communication unit 170 and the network. As a result, the space can be illuminated in the illumination state indicated by the selected scene.

Next, the display control unit 130 obtains the operation target lighting information (S110). More specifically, if the input unit 110 detects pressing of the create button 330, the display control unit 130 reads and obtains the operation target lighting information stored in the lighting information management unit 150. As illustrated in FIG. 4, the operation target lighting information is, for example, information indicating the one or more already registered lighting devices.

Next, the display control unit 130 creates the scene creation screen 400 on the basis of the obtained operation target lighting information and displays the generated scene creation screen 400 on the display unit 120 (S112). As a result, the scene creation screen 400 is displayed on the display unit 120 as illustrated in FIG. 12B. Details of the scene creation screen 400 are as described with reference to FIG. 5.

Next, the display control unit 130 and the lighting control unit 160 obtain the lighting device setting information input by the user in the scene creation screen 400 (S114). As illustrated in FIG. 12B, by displaying the scene creation screen 400, the user can set the value of the intensity adjustment function or the color adjustment function of each of the one or more lighting devices. For example, the display control unit 130 and the lighting control unit 160 obtain, through the input unit 110, the set value indicated by the intensity adjustment slider 411a or the color adjustment slider 411b operated by the user.

The display control unit 130 then generates the scene creation screen 400 in accordance with the set value obtained through the input unit 110 and displays the generated scene creation screen 400 on the display unit 120. That is, the display control unit 130 sequentially generates the scene creation screen 400 in synchronization with operations performed by the user and displays the generated scene creation screen 400 on the display unit 120. More specifically, if the user operates a slider, how the slider is displayed in the scene creation screen 400 changes in accordance with the operation performed by the user. Thus, as illustrated in FIG. 12C, the scene creation screen 400 after the change is displayed on the display unit 120.

In addition, the lighting control unit 160 generates a control signal for controlling the one or more lighting devices on the basis of the setting information indicated by the illumination state set through an operation performed by the user in the setting screen 410 (S116). The lighting control unit 160 then transmits the generated control signal to the one or more lighting devices through the communication unit 170 and the network. As a result, the illumination state established by the one or more lighting devices sequentially changes in synchronization with operations performed by the user.

For example, if the user operates the intensity adjustment slider 411a of the "living ceiling light" among the one or more lighting devices, the intensity of the actual "living ceiling light" changes in accordance with the operation of the user. For example, if the user operates the intensity adjustment slider 411a such that the intensity adjustment ratio of the "living ceiling light" becomes 100, the "living ceiling light" illuminates the space with the maximum intensity.

The obtaining of the setting information (S114) and the control of the one or more lighting devices (S116) realized by operations performed by the user are repeated until a scene creation complete button (the complete button 420) is selected (NO in S118).

Thus, the illumination state established by the one or more lighting devices changes in synchronization with operations performed by the user in the setting screen 410. Therefore, the user can create a desired scene by operating the mobile terminal 100 while checking the actual atmosphere of the illumination state.

If the scene creation complete button (the complete button 420) is selected (YES in S118), the display control unit 130 obtains the location information regarding the mobile terminal 100 and sets the obtained location information as the new scene location information (S120). A specific process is the same as that of the process for setting new scene location information (S108), which is performed by selecting the create button 330. That is, if the scene creation complete button is selected, the display control unit 130 obtains the location information indicating the location of the mobile terminal 100 using the terminal location identification unit 180. The display control unit 130 then sets the obtained location information as the new scene location information.

If the currently obtained location information is different from the new scene location information set by selecting the create button 330, the display control unit 130 changes the new scene location information to the currently obtained location information. If the currently obtained location information is the same as the new scene location information set by selecting the create button 330, the display control unit 130 need not change the new scene location information.

Next, the display control unit 130 generates the scene name input screen 500 and displays the generated scene name input screen 500 on the display unit 120 (S122). More specifically, if the input unit 110 detects pressing of the complete button 420, the display control unit 130 generates the scene name input screen 500. As a result, the scene name input screen 500 is displayed on the display unit 120 as illustrated in FIG. 12D. Details of the scene name input screen 500 are as described with reference to FIG. 6.

When the scene name input screen 500 is displayed, nothing is input to the text box 520. That is, an empty text box 520 is displayed. The user inputs a desired scene name to the text box 520.

The input unit 110 obtains the text (scene name) input to the text box 520. The display control unit 130 displays the text obtained by the input unit 110 in the text box 520 (S124). As a result, the scene name input screen 500 including the text box 520 in which the text input by the user is displayed is displayed on the display unit 120 as illustrated in FIG. 12E.

If a scene name input complete button (the OK button 530) is selected (YES in S126), the display control unit 130 generates the image capture confirmation screen 600 for a scene icon and displays the generated image capture confirmation screen 600 on the display unit 120 (S128). More specifically, if the input unit 110 detects pressing of the OK button 530, the display control unit 130 generates the image capture confirmation screen 600. As a result, the image capture confirmation screen 600 is displayed on the display unit 120 as illustrated in FIG. 12F. At this time, the lighting information management unit 150 manages, as the scene name of the new scene, the text in the text box 520 at a time when the OK button 530 has been selected.

If the scene name input complete button (the OK button 530) is not selected (NO in S126), the display control unit 130 waits until the OK button 530 is selected.

Next, the display control unit 130 waits until one of the buttons is selected in the image capture confirmation screen 600 (NO in S130). More specifically, the display control unit 130 keeps displaying the image capture confirmation screen 600 on the display unit 120 until the input unit 110 detects pressing of either the YES button 620 or the NO button 630.

If one of the buttons is selected (YES in S130) and the selected button is an image capture button (the YES button 620) (YES in S132), the imaging device 140 is activated (S134). More specifically, if the input unit 110 detects pressing of the YES button 620, the display control unit 130 activates the imaging device 140.

Figure 12I:
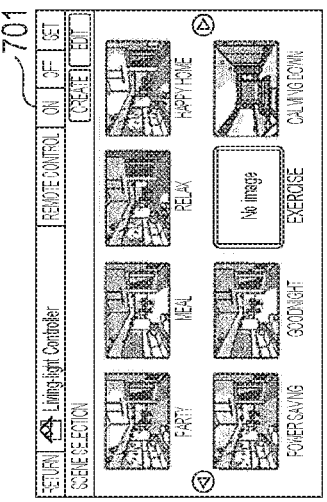
Figure 12H:
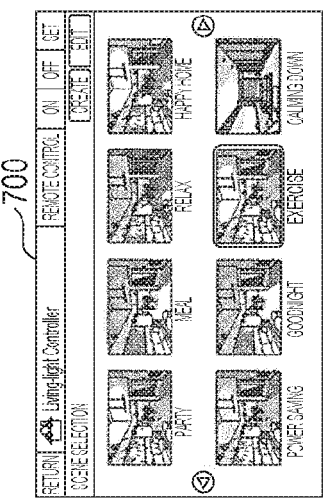
Figure 12G:
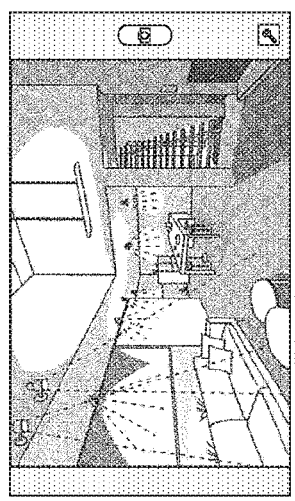

By activating the imaging device 140, the image (live view image) captured by an image sensor of the imaging device 140 is displayed on the display unit 120 as illustrated in FIG. 12G. The user can press the shutter button while looking at the image displayed on the display unit 120. If the shutter button is pressed, the imaging device 140 captures an image.

When the imaging device 140 is activated, the space is illuminated in the illumination state based on the lighting device setting information at the time of the selection of the complete button 420. That is, the space is illuminated in the illumination state indicated by the new scene created by the user. Therefore, by capturing an image of the space, the atmosphere of the new scene created by the user can be saved as the captured image. That is, the user can check the atmosphere of the new scene by taking a look at the captured image.

If an image is captured (YES in S136), the display control unit 130 obtains the location information regarding the mobile terminal 100 and sets the obtained location information as the new scene location information (S138). A specific process is the same as that of the process for setting new scene location information (S108 or S120), which is performed by selecting the create button 330 or the complete button 420.

That is, the display control unit 130 obtains, using the terminal location identification unit 180, the location information indicating the location of the mobile terminal 100 at a time when the imaging device 140 has captured an image. The display control unit 130 then sets the obtained location information as the new scene location information.

If the currently obtained location information is different from the new scene location information set by selecting the complete button 420, the display control unit 130 changes the new scene location information to the currently obtained location information. If the currently obtained location information is the same as the new scene location information set by selecting the complete button 420, the display control unit 130 need not change the new scene location information.

Furthermore, the display control unit 130 sets the captured image as a scene icon (S140). The imaging device 140 can capture an image until an image is captured (NO in S136). That is, the imaging device 140 remains activated.

If the button selected in the image capture confirmation screen 600 is the NO button 630 (NO in S132), the display control unit 130 sets a default image as a scene icon (S142).

The lighting information management unit 150 associates the setting information regarding the one or more lighting devices, the input scene name, the set new scene location information, and the scene icon with one another and stores these pieces of information as a new scene (S144). That is, if the imaging device 140 captures an image, the captured image is managed as a scene icon, and if the imaging device 140 does not capture an image, a default image is managed as a scene icon.

Next, the display control unit 130 obtains the scene information (S146). More specifically, the display control unit 130 reads and obtains the scene information stored in the lighting information management unit 150 and including the new scene.

Next, the display control unit 130 performs the process for setting priority in display on the basis of the obtained scene information (S148). The process for setting priority in display is as illustrated in FIG. 11.

The display control unit 130 then generates the new scene selection screen 700 or 701 with the created new scene selected and displays the generated new scene selection screen 700 or 701 on the display unit 120 (S150). As a result, if an image is captured, the new scene selection screen 700 is displayed on the display unit 120 as illustrated in FIG. 12H. If an image is not captured, the new scene selection screen 701 is displayed on the display unit 120 as illustrated in FIG. 12I.

After the new scene selection screen 700 or 701 is displayed, the procedure after the process for detecting pressing of the create button 330 (S106) is repeated.

As described above, according to the method for controlling the mobile terminal 100 according to this embodiment, when a new scene is created, one or more lighting devices are set, an image of a space illuminated by the one or more lighting devices on the basis of the setting is captured, and the captured image is set as a scene icon of the new scene. That is, an image indicating the atmosphere of the new scene is set as a scene icon.

Since the image indicating the atmosphere of the new scene is displayed as the scene icon in the scene selection screen, the user can easily check the atmosphere of the scene by taking a look at the scene icon. That is, since the scene icon is the image of the actual scene, the user can visually check the atmosphere of the scene.

Although an example in which the process for setting the new scene location information is performed three times (S108, S120, and S138) has been described in the flowcharts of FIGS. 10A and 10B, the number of times that the process for setting the new scene location information is performed is not limited to this. It is only required that the process for setting the new scene location information be performed at least once. The process for setting the new scene location information may be performed at any time between the selection of the scene creation button and the storage of the new scene (between S106 and S144).

Next, a specific configuration for identifying the location of the mobile terminal 100 will be described with reference to FIGS. 13 to 16. FIGS. 13 to 16 are block diagrams illustrating examples of a configuration for obtaining the location information regarding the mobile terminal 100 according to the first embodiment.

FIGS. 13 to 16 illustrate configurations for automatically obtaining the location information using different types of means. The mobile terminal 100 according to this embodiment may, for example, use one of the means illustrated in FIGS. 13 to 16 or may use another means.

The location information regarding the mobile terminal 100 is information for identifying the location of the mobile terminal 100. The terminal location information and the scene location information are both information based on the location information. More specifically, the terminal location information is information for identifying the current location of the mobile terminal 100, and the scene location information is information for identifying the location of the mobile terminal 100 at a time when a scene is selected or set. The terminal location information and the scene location information are information based on the location information obtained by the same one of the means illustrated in FIGS. 13 to 16.

First, a case in which a wireless LAN function is used will be described with reference to FIG. 13.

Figure 13:
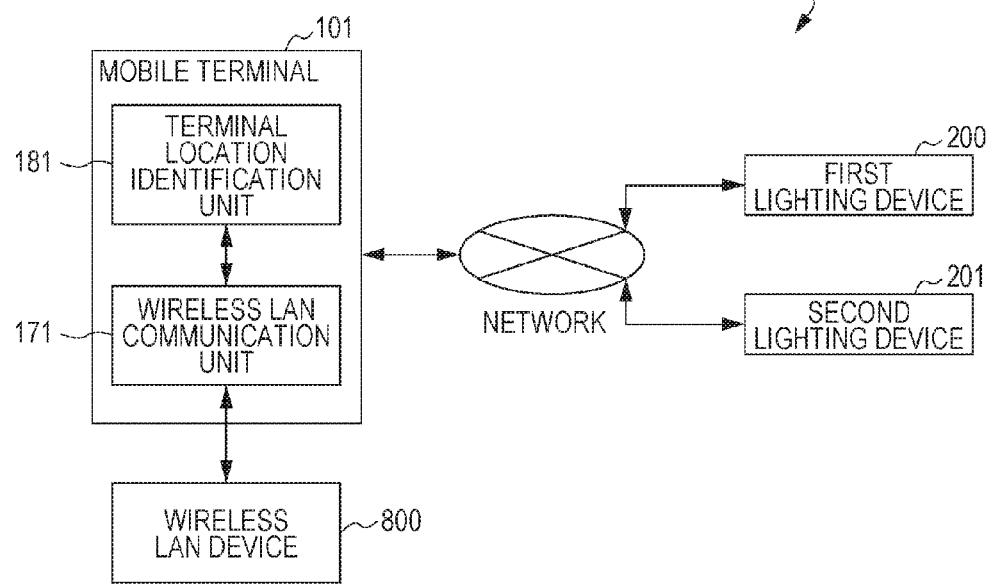
FIG. 13 is a block diagram illustrating an example of a configuration for obtaining location information regarding a mobile terminal according to the first embodiment.

A lighting system 11 illustrated in FIG. 13 is an example of the lighting system 10 illustrated in FIG. 1. The lighting system 11 includes a mobile terminal 101, the first lighting device 200, the second lighting device 201, and a wireless LAN device 800.

Although only one wireless LAN device 800 is illustrated in FIG. 13, the lighting system 11 includes a plurality of wireless LAN devices 800. Each of the plurality of wireless LAN devices 800 is, for example, arranged in a room or an area.

The wireless LAN device 800 performs communication according to a wireless LAN standard. A unique identifier is set for the wireless LAN device 800. For example, a service set identifier (SSID) is set for the wireless LAN device 800. The wireless LAN device 800 regularly transmits wireless signal information including the SSID.

The mobile terminal 101 is an example of the mobile terminal 100 illustrated in FIG. 1 and identifies the location thereof using the wireless LAN function. The mobile terminal 101 includes a wireless LAN communication unit 171 and a terminal location identification unit 181.

The wireless LAN communication unit 171 can communicate with the wireless LAN device 800. The wireless LAN communication unit 171 obtains the wireless signal information transmitted from the wireless LAN device 800.

The wireless LAN communication unit 171 may be the same as the communication unit 170 illustrated in FIG. 1. That is, the mobile terminal 101 may be capable of communicating with the first lighting device 200 and the second lighting device 201 through the wireless LAN communication unit 171 and the wireless LAN device 800.

The terminal location identification unit 181 is an example of the terminal location identification unit 180 illustrated in FIG. 1 and identifies the location of the mobile terminal 101 on the basis of the identifier included in the wireless signal information transmitted from the wireless LAN device 800 and unique to the wireless LAN device 800. For example, the terminal location identification unit 181 identifies the location of the mobile terminal 101 using the SSID included in the wireless signal information received by the wireless LAN communication unit 171.

For example, the location of the wireless LAN device 800 is associated with the SSID and registered to the wireless LAN device 800 or the mobile terminal 101 in advance. In doing so, the terminal location identification unit 181 can identify the location of the mobile terminal 101 by obtaining the SSID.

Thus, by automatically identifying the location of the mobile terminal 101 through wireless LAN communication, the location information can be obtained. Accordingly, the display control unit 130 can obtain the terminal location information and the scene location information.

Next, a case in which a BLUETOOTH (registered trademark) communication function is used will be described with reference to FIG. 14.

Figure 14:
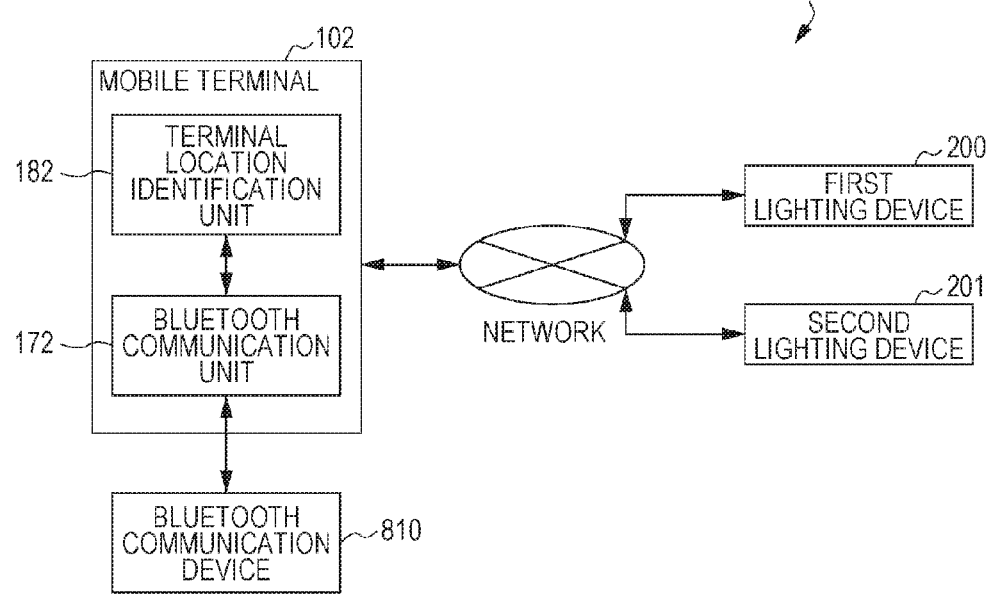
FIG. 14 is a block diagram illustrating another example of the configuration for obtaining the location information regarding the mobile terminal according to the first embodiment.

A lighting system 12 illustrated in FIG. 14 is an example of the lighting system 10 illustrated in FIG. 1. The lighting system 12 includes a mobile terminal 102, the first lighting device 200, the second lighting device 201, and a BLUETOOTH (registered trademark) communication device 810.

Although only one BLUETOOTH (registered trademark) communication device 810 is illustrated in FIG. 14, the lighting system 12 includes a plurality of BLUETOOTH (registered trademark) communication devices 810. Each of the plurality of BLUETOOTH (registered trademark) communication devices 810 is, for example, arranged in a room or an area.

The BLUETOOTH (registered trademark) communication device 810 performs communication according to a BLUETOOTH (registered trademark) standard. A unique identifier is set for the BLUETOOTH (registered trademark) communication device 810. The BLUETOOTH (registered trademark) communication device 810 regularly transmits wireless signal information including the unique identifier.

The mobile terminal 102 is an example of the mobile terminal 100 illustrated in FIG. 1 and identifies the location thereof using the BLUETOOTH (registered trademark) communication function. The mobile terminal 102 includes a BLUETOOTH (registered trademark) communication unit 172 and a terminal location identification unit 182.

The BLUETOOTH (registered trademark) communication unit 172 can communicate with the BLUETOOTH (registered trademark) communication device 810. The BLUETOOTH (registered trademark) communication unit 172 obtains the wireless signal information transmitted from the BLUETOOTH (registered trademark) communication device 810.

The BLUETOOTH (registered trademark) communication unit 172 may be the same as the communication unit 170 illustrated in FIG. 1. That is, the mobile terminal 102 may be capable of communicating with the first lighting device 200 and the second lighting device 201 through the BLUETOOTH (registered trademark) communication unit 172 and the BLUETOOTH (registered trademark) communication device 810.

The terminal location identification unit 182 is an example of the terminal location identification unit 180 illustrate din FIG. 1 and identifies the location of the mobile terminal 102 on the basis of the identifier included in the wireless signal information transmitted from the BLUETOOTH (registered trademark) communication device 810 and unique to the BLUETOOTH (registered trademark) communication device 810. For example, the terminal location identification unit 182 identifies the location of the mobile terminal 102 using the identifier included in the wireless signal information received by the BLUETOOTH (registered trademark) communication unit 172.

For example, the location of the BLUETOOTH (registered trademark) communication device 810 is associated with the identifier and registered to the BLUETOOTH (registered trademark) communication device 810 or the mobile terminal 102 in advance. In doing so, the terminal location identification unit 182 can identify the location of the mobile terminal 102 by obtaining the identifier.

Thus, by automatically identifying the location of the mobile terminal 102 through BLUETOOTH (registered trademark) communication, the location information can be obtained. Accordingly, the display control unit 130 can obtain the terminal location information and the scene location information.

Next, a case in which a visible light communication function is used will be described with reference to FIG. 15.

Figure 15:
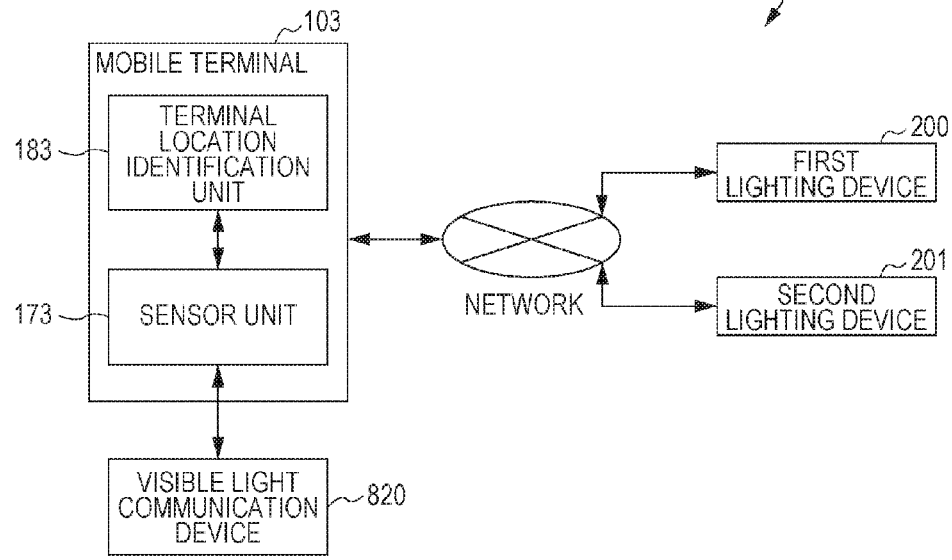
FIG. 15 is a block diagram illustrating another example of the configuration for obtaining the location information regarding the mobile terminal according to the first embodiment.

A lighting system 13 illustrated in FIG. 15 is an example of the lighting system 10 illustrated in FIG. 1. The lighting system 13 includes a mobile terminal 103, the first lighting device 200, the second lighting device 201, and a visible light communication device 820.

Although only one visible light communication device 820 is illustrated in FIG. 15, the lighting system 13 includes a plurality of visible light communication devices 820. Each of the plurality of visible light communication devices 820 is, for example, arranged in a room or an area.

The visible light communication device 820 performs communication using an electromagnetic wave in a visible light range. A unique identifier is set for the visible light communication device 820. The visible light communication device 820 regularly transmits an electromagnetic wave including the unique identifier.

The visible light communication device 820 may be either the first lighting device 200 or the second lighting device 201. That is, the visible light communication device 820 may be one of lighting devices controlled by the mobile terminal 103.

The mobile terminal 103 is an example of the mobile terminal 100 illustrated in FIG. 1 and identifies the location thereof using an electromagnetic wave in the visible light range. The mobile terminal 103 includes a sensor unit 173 and a terminal location identification unit 183.

The sensor unit 173 receives an electromagnetic wave in the visible light range. More specifically, the sensor unit 173 receives the electromagnetic wave transmitted from the visible light communication device 820.

The terminal location identification unit 183 is an example of the terminal location identification unit 180 illustrated in FIG. 1 and identifies the location of the mobile terminal 103 on the basis of the identifier included in the electromagnetic wave transmitted from the visible light communication device 820 and unique to the visible light communication device 820. For example, the terminal location identification unit 183 identifies the location of the mobile terminal 103 using the identifier included in the electromagnetic wave received by the sensor unit 173.

For example, the location of the visible light communication device 820 is associated with the identifier and registered to the visible light communication device 820 or the mobile terminal 103 in advance. In doing so, the terminal location identification unit 183 can identify the location of the mobile terminal 103 by obtaining the identifier.

Thus, by automatically identifying the location of the mobile terminal 103 through visible light communication, the location information can be obtained. Accordingly, the display control unit 130 can obtain the terminal location information and the scene location information.

Next, a case in which an ultrasonic wave is used will be described with reference to FIG. 16.

Figure 16:
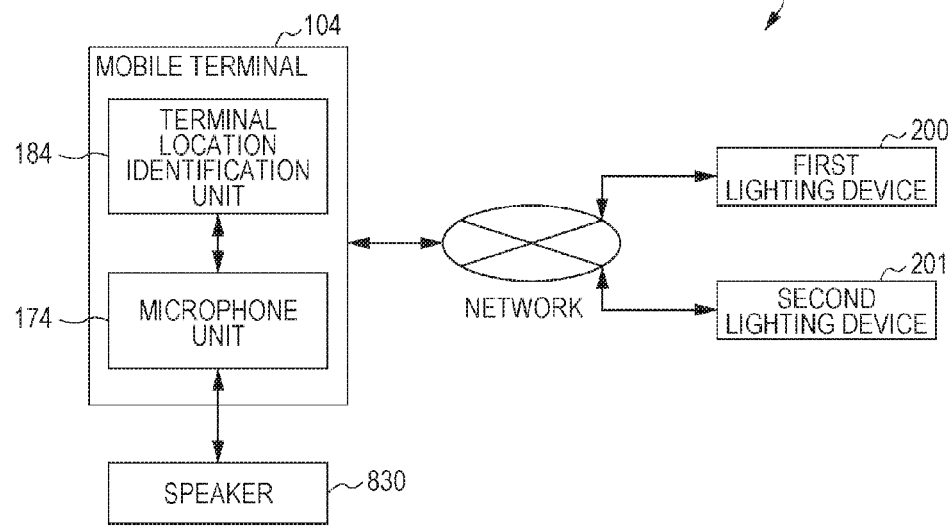
FIG. 16 is a block diagram illustrating another example of the configuration for obtaining the location information regarding the mobile terminal according to the first embodiment.

A lighting system 14 illustrated in FIG. 16 is an example of the lighting system 10 illustrated in FIG. 1. The lighting system 14 includes a mobile terminal 104, the first lighting device 200, the second lighting device 201, and a speaker 830.

Although only one speaker 830 is illustrated in FIG. 16, the lighting system 14 includes a plurality of speakers 830. Each of the plurality of speakers 830 is, for example, arranged in a room or an area.

The speaker 830 performs communication using an ultrasonic wave. A unique identifier is set for the speaker 830. The speaker 830 regularly transmits an ultrasonic wave including the unique identifier.

The mobile terminal 104 is an example of the mobile terminal 100 illustrated in FIG. 1 and identifies the location thereof using an ultrasonic wave. The mobile terminal 104 includes a microphone unit 174 and a terminal location identification unit 184.

The microphone unit 174 receives an ultrasonic wave. More specifically, the microphone unit 174 receives the ultrasonic wave transmitted from the speaker 830.

The terminal location identification unit 184 is an example of the terminal location identification unit 180 illustrated in FIG. 1 and identifies the location of the mobile terminal 104 on the basis of the identifier included in the ultrasonic wave transmitted from the speaker 830 and unique to the speaker 830. For example, the terminal location identification unit 184 identifies the location of the mobile terminal 104 using the identifier included in the ultrasonic wave received by the microphone unit 174.

For example, the location of the speaker 830 is associated with the identifier and registered to the speaker 830 or the mobile terminal 104 in advance. In doing so, the terminal location identification unit 184 can identify the location of the mobile terminal 104 by obtaining the identifier.

Thus, by automatically identifying the location of the mobile terminal 104 using an ultrasonic wave, the location information can be obtained. Accordingly, the display control unit 130 can obtain the terminal location information and the scene location information.

As described above, according to the method for controlling the mobile terminal 100 according to this embodiment, one or more scene icons are rearranged and displayed on the basis of the terminal location information and the one or more pieces of scene location information. Therefore, the scene selection screen according to the location of the mobile terminal 100 can be generated. As a result, the user can easily select a scene.

In S201 to S204 illustrated in FIG. 11, the mobile terminal 100 may give priority in display to the scenes corresponding to each room or area on the basis of signal intensity received from each room or area.

First Modification of First Embodiment

Although a configuration in which the terminal location information is automatically obtained has been described with reference to the mobile terminal 100 according to the first embodiment, the terminal location information may be obtained on the basis of an instruction issued by the user as in a mobile terminal 100 according to a first modification. That is, the location of the mobile terminal may be manually identified.

Figure 17:
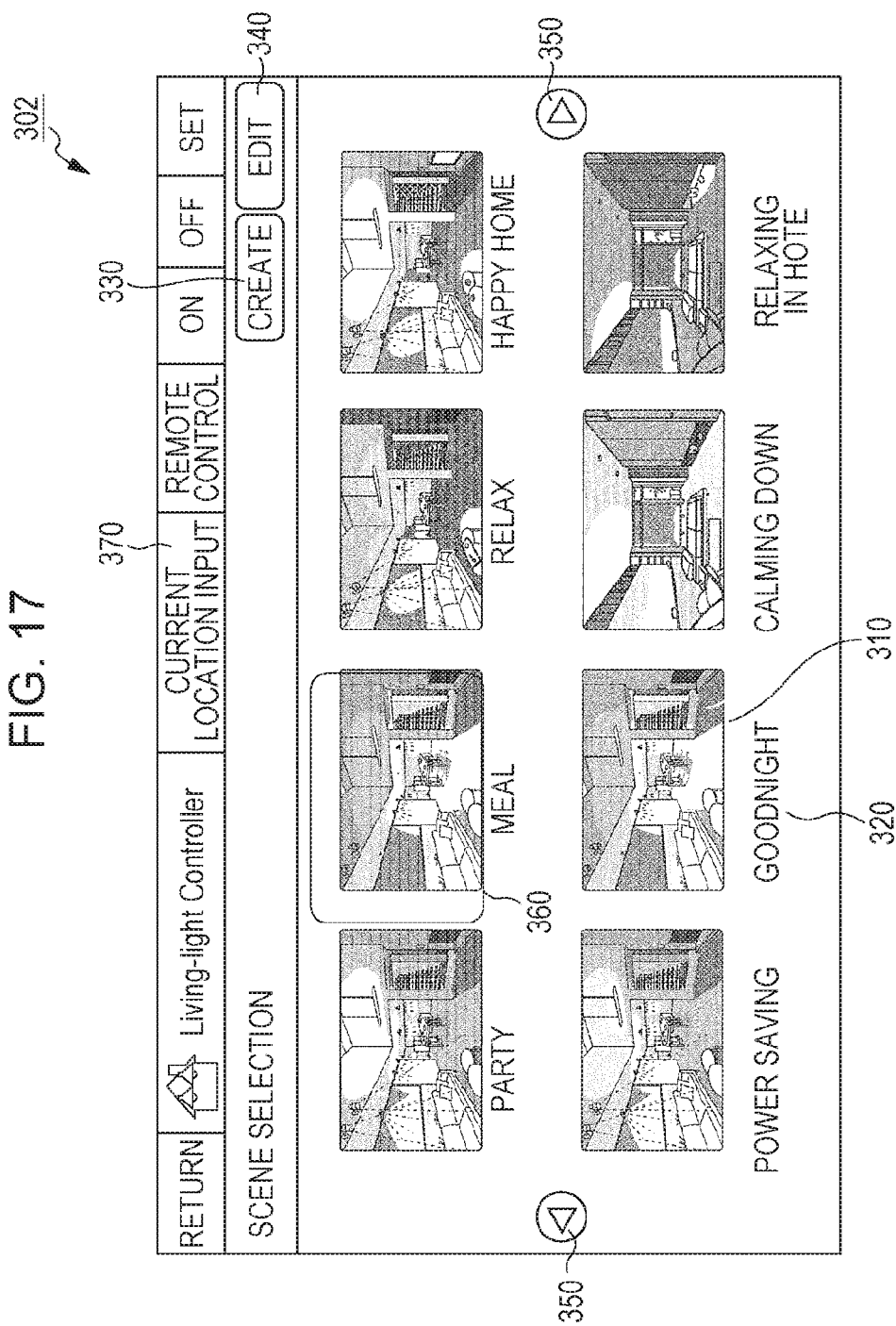
FIG. 17 is a diagram illustrating an example of a scene selection screen according to a first modification of the first embodiment.
Figure 18:
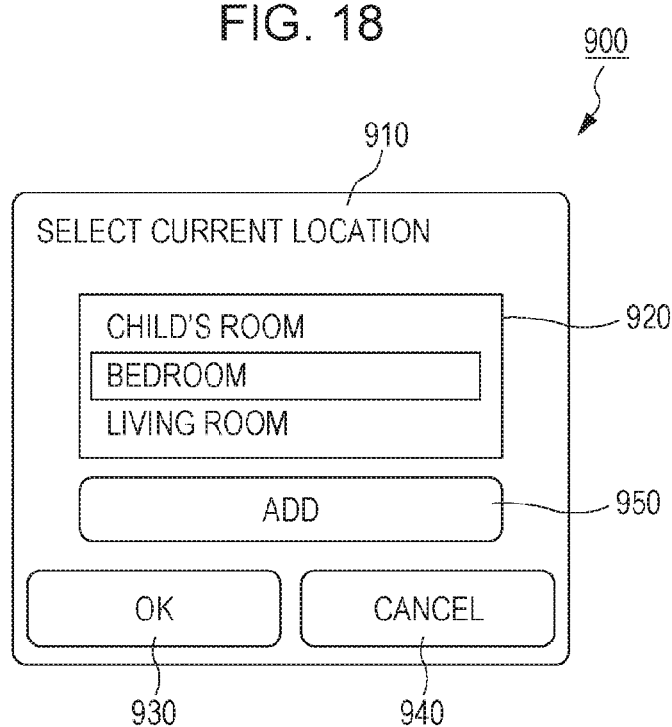
FIG. 18 is a diagram illustrating an example of a current location selection screen according to the first modification of the first embodiment.
Figure 19:
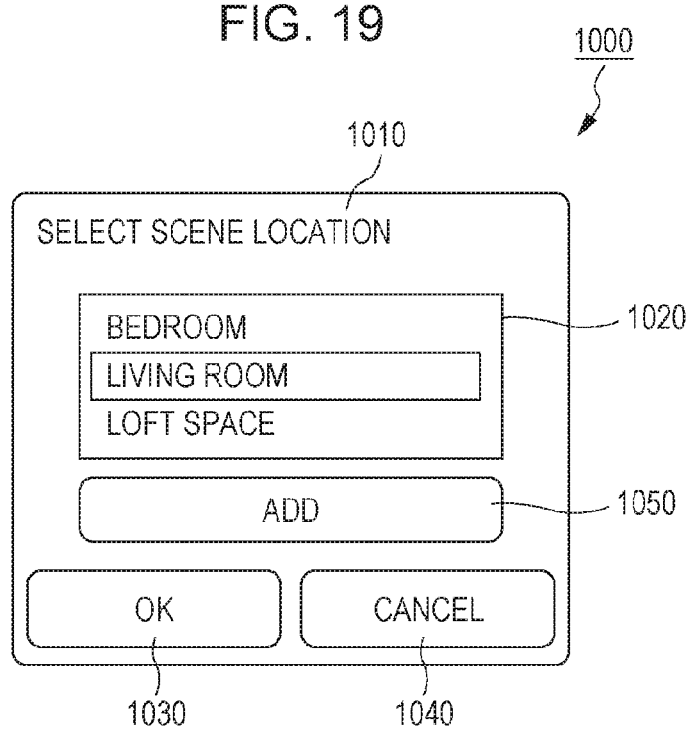
FIG. 19 is a diagram illustrating an example of a scene location selection screen according to the first modification of the first embodiment.

A configuration in which the location of the mobile terminal 100 is obtained by asking the user to input the location of the mobile terminal 100 will be described with reference to FIGS. 17 to 19. FIG. 17 is a diagram illustrating an example of a scene selection screen 302 according to the first modification of the first embodiment. FIG. 18 is a diagram illustrating an example of a current location selection screen 900 according to the first modification of the first embodiment. FIG. 19 is a diagram illustrating a scene location selection screen 1000 according to the first modification of the first embodiment.

As illustrated in FIG. 17, the scene selection screen 302 is different from the scene selection screen 300 illustrated in FIG. 3A only in that the scene selection screen 302 includes a current location input button 370.

The current location input button 370 is an example of a location input button and is a button for enabling the user to input the terminal location information. The current location input button 370 is an example of the GUI component and, for example, is a push button.

If the user selects the current location input button 370, for example, the process for setting priority in display illustrated in FIG. 11 begins. Next, the current location selection screen 900 illustrated in FIG. 18 is displayed in order to identify the terminal location information. More specifically, if the input unit 110 detects pressing of the current location input button 370, the display control unit 130 generates the current location selection screen 900 and displays the display unit 120.

The current location selection screen 900 is an example of a first input request screen for asking the user to input the terminal location information. As illustrated in FIG. 18, the current location selection screen 900 includes a comment 910, a list box 920, an OK button 930, a cancel button 940, and an add button 950.

The comment 910 is a text indicating an operation to be performed by the user. More specifically, the comment 910 is a text for asking the user to select the terminal location information. For example, as illustrated in FIG. 18, the comment 910, "Select current location", is displayed. Alternatively, the user may be asked by a sound to select the location, instead of the comment 910.

The list box 920 is an example of the GUI component and is an interface for enabling the user to select the terminal location information. One or more options for identifying the location, such as a "child's room" and the "bedroom", are displayed in the list box 920, and the user can select one of the one or more options. These options are, for example, registered by the user in advance.

The OK button 930 is an example of the GUI component and, for example, is a push button. The OK button 930 is a button for enabling the user to confirm the selection, by the user, of one of the one or more options displayed in the list box 920.

If the OK button 930 is selected, the option selected in the list box 920 is determined as the terminal location information. That is, the display control unit 130 obtains the determined terminal location information (S200 illustrated in FIG. 11) and performs the process for setting priority in display for each scene. Therefore, after the OK button 930 is selected, a scene selection screen including scene icons rearranged on the basis of the selected terminal location information is displayed on the display unit 120.

The cancel button 940 is an example of the GUI component and, for example, is a push button. The cancel button 940 is a button for enabling the user to cancel the selection of the terminal location information. If the cancel button 940 is selected, the selection of the terminal location information is canceled, and, for example, the scene selection screen 302 is displayed on the display unit 120.

The add button 950 is an example of the GUI component and, for example, is a push button. The add button 950 is a button for adding an option to be displayed in the list box 920.

If the add button 950 is selected, for example, a text box is displayed in order to enable the user to input a text indicating a desired location. Alternatively, the user may be enabled to input a sound, instead of displaying the text box.

Although an example in which the current location selection screen 900 is displayed by selecting the current location input button 370 has been described above, the timing at which the current location selection screen 900 is displayed is not limited to this. For example, if the input unit 110 detects pressing of the current location input button 370, the mobile terminal 100 may get ready to detect a sound.

For example, an input request screen including a comment, "Speak current location", may be displayed on the display unit 120. The mobile terminal 100 may detect the sound uttered by the user by activating the function of a microphone unit. As a result, the user may input the current location using a sound.

Alternatively, if the input unit 110 detects pressing of the current location input button 370, the mobile terminal 100 may get ready to detect a gesture of the user. For example, the mobile terminal 100 obtains an action of the user's body, that is, more specifically, an action of a part of the user's body such as the user's hands or head, as a gesture input. Each gesture input is associated with the terminal location information in advance. For example, the user's action of waving his/her right hand is associated with the "living room" and managed by the lighting information management unit 150.

For example, if the input unit 110 detects pressing of the current location input button 370, the imaging device 140 is activated. By making a predetermined gesture, the user can input the gesture to the imaging device 140. The display control unit 130 can obtain the terminal location information on the basis of the gesture input obtained through the imaging device 140 and the terminal location information managed by the lighting information management unit 150.

Alternatively, the mobile terminal 100 may detect the movement thereof as a gesture input. For example, the mobile terminal 100 may activate an acceleration sensor or the like to detect a direction in which the user moves the mobile terminal 100. For example, each direction in which the mobile terminal 100 is moved and the terminal location information are associated with each other in advance. As a result, the display control unit 130 can obtain the terminal location information.

Although an example in which the user can input the current location of the mobile terminal 100 has been described above, the user may also input the scene location information.

The scene location selection screen 1000 is an example of a second input request screen for asking the user to input the scene location information. The scene location selection screen 1000 is displayed by, for example, capturing an image (S138 illustrated in FIG. 10B). Alternatively, the scene location selection screen 1000 may be displayed by, for example, selecting the create button 330 or the complete button 420 (S108 or S120 illustrated in FIG. 10A).

Although the process for setting the scene location information is performed three times in the example illustrated in FIGS. 10A and 10B, the process for setting the scene location information is preferably performed only once when the user manually inputs the scene location information in the displayed scene location selection screen 1000.

As illustrated in FIG. 19, the scene location selection screen 1000 includes a comment 1010, a list box 1020, an OK button 1030, a cancel button 1040, and an add button 1050.

The comment 1010 is a text indicating an operation to be performed by the user. More specifically, the comment 1010 is a text for asking the user to select the scene location information. For example, as illustrated in FIG. 19, the comment 1010, "Select scene location", is displayed. Alternatively, the user may be asked by a sound to select the location, instead of the comment 1010.

The list box 1020 is an example of the GUI component and is an interface for enabling the user to select the terminal location information. One or more options for identifying the location, such as the "bedroom" and the "living room", are displayed in the list box 1020, and the user can select one of the one or more options. These options are, for example, registered by the user in advance.

The one or more options displayed in the list box 1020 are the same as those displayed in the list box 920 illustrated in FIG. 18. For example, the list box 1020 (and the list box 920) can be vertically scrolled and is configured such that any of the one or more options registered in advance can be selected.

The OK button 1030 is an example of the GUI component and, for example, is a push button. The OK button 1030 is a button for enabling the user to confirm the selection, by the user, of one of the one or more options displayed in the list box 1020. If the OK button 1030 is selected, the option selected in the list box 1020 is determined as the scene location information.

The cancel button 1040 is an example of the GUI component and, for example, is a push button. The cancel button 1040 is a button for enabling the user to cancel the selection of the scene location information. If the cancel button 1040 is selected, the selection of the scene location information is canceled, and, for example, the imaging device 140 is activated in order to capture an image used as a scene icon again. Alternatively, the process for creating a new scene may end, and the scene selection screen 300 or the like may be displayed.

The add button 1050 is an example of the GUI component and, for example, is a push button. The add button 1050 is a button for adding an option to be displayed in the list box 1020.

If the add button 1050 is selected, for example, a text box is displayed in order to enable the user to input a text indicating a desired location. Alternatively, the user may be enabled to input a sound, instead of displaying the text box.

Instead of displaying the scene location selection screen 1000, the mobile terminal 100 may get ready to detect a sound or a gesture. Specific processes are the same as those used for inputting the terminal location information.

As described above, according to the method for controlling the mobile terminal 100 according to this modification, the user can input the terminal location information. Therefore, the user can display a desired screen at a desired timing. For example, even if the user having the mobile terminal 100 is in the "living room", the mobile terminal 100 can receive an input indicating the "bedroom" and display a scene selection screen according to the "bedroom". As a result, the user in the "living room" can check or select a scene in the "bedroom".

In addition, since the user can input the scene location information, the user can set a desired scene in a desired location. For example, even if the user having the mobile terminal 100 is in the "living room", the user can create a scene in the "bedroom".

Second Modification of First Embodiment

Although an example in which the terminal location information is information for identifying a room or an area in which a mobile terminal is located has been described in the first embodiment, the type of terminal location information is not limited to this. For example, the terminal location information may be information for identifying the latitude, the longitude, and the floor of the location of a mobile terminal. At this time, the one or more pieces of scene location information may be information for identifying the latitude, the longitude, and the floor of each of the locations of the one or more scenes. More specifically, the location of a mobile terminal and the locations of the scenes may be identified using an IMES, which is one of indoor global positioning system (GPS) technologies.

Figure 20:
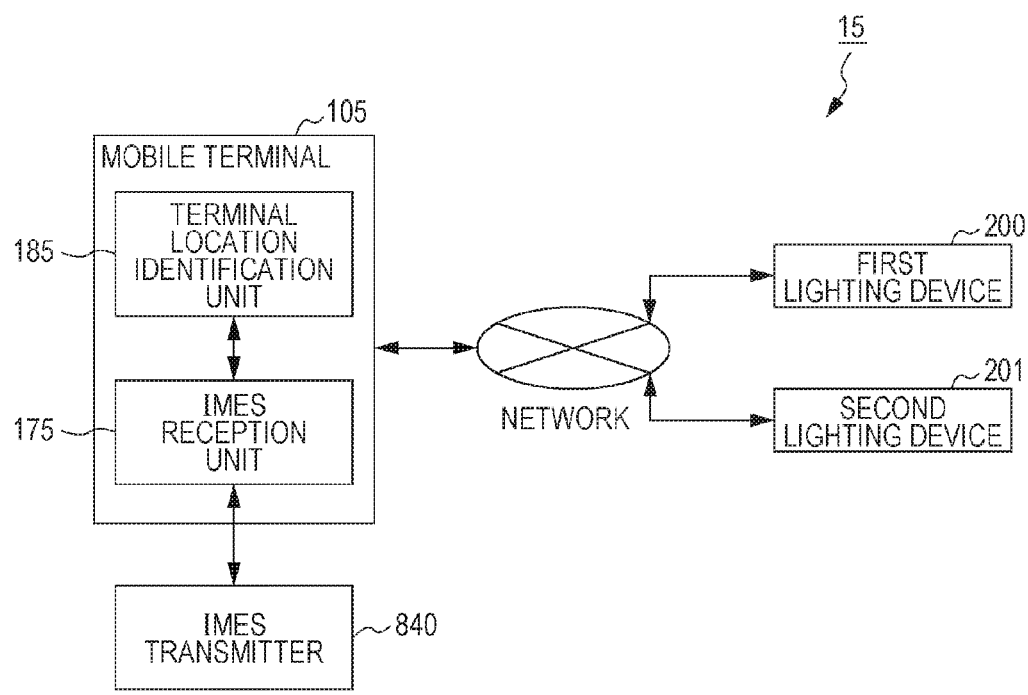
FIG. 20 is a block diagram illustrating an example of a configuration for obtaining location information regarding a mobile terminal according to a second modification of the first embodiment.
Figure 21:
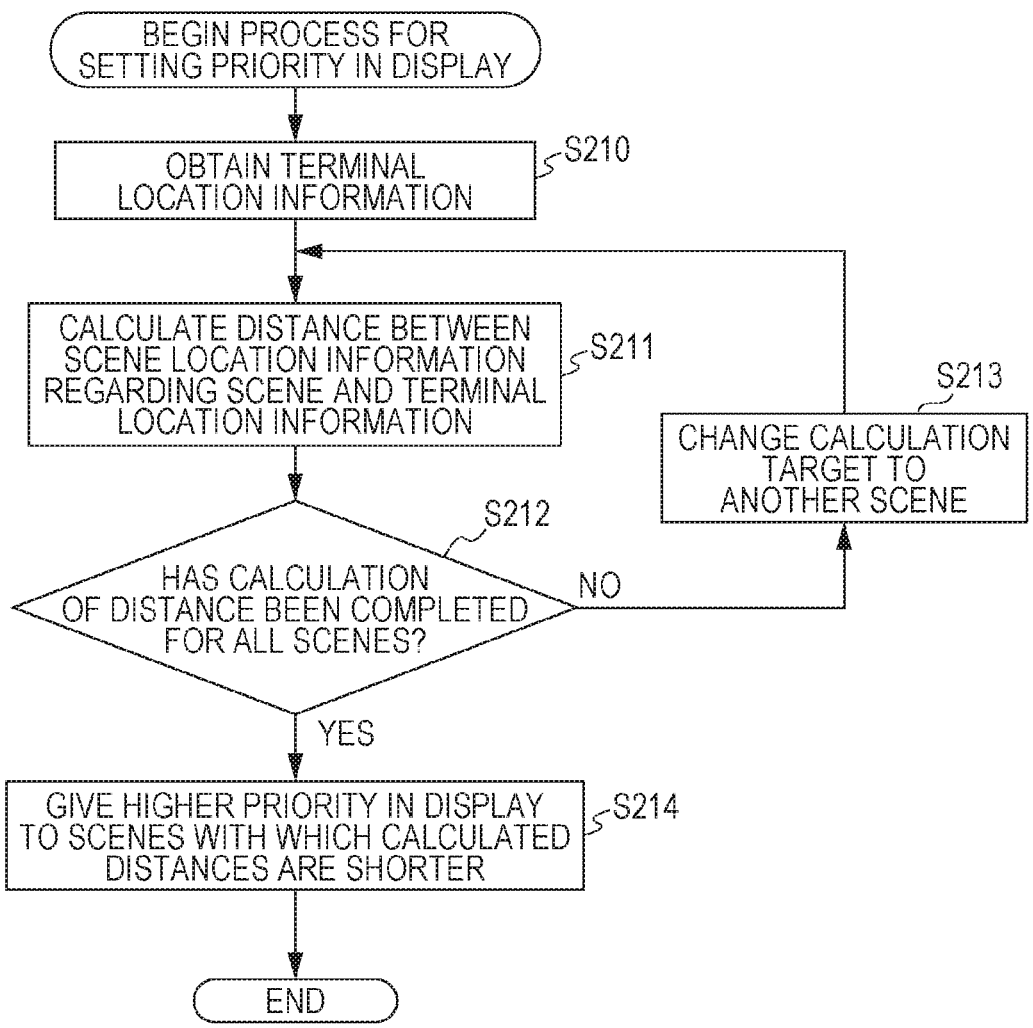
FIG. 21 is a flowchart illustrating an example of a method for setting priority in display according to the second modification of the first embodiment.

An example of a lighting system adopting the IMES will be described hereinafter with reference to FIGS. 20 and 21. FIG. 20 is a block diagram illustrating an example of a configuration for obtaining location information regarding a mobile terminal according to a second modification of the first embodiment. FIG. 21 is a flowchart illustrating an example of a method for setting priority in display according to the second modification of the first embodiment.

A lighting system 15 illustrated in FIG. 20 is an example of the lighting system 10 illustrated in FIG. 1 and is a system that uses the IMES to identify the location of a mobile terminal. The lighting system 15 includes a mobile terminal 105, the first lighting device 200, the second lighting device 201, and an IMES transmitter 840.

Although only one IMES transmitter 840 is illustrated in FIG. 20, the lighting system 15 includes a plurality of IMES transmitters 840. Each of the plurality of IMES transmitters 840 is arranged, for example, in a room or an area.

The IMES transmitter 840 transmits wireless signal information including positional information. More specifically, the IMES transmitter 840 transmits wireless signal information including information indicating the latitude, the longitude, and the floor. For example, the IMES transmitter 840 transmits wireless signal information including information indicating the latitude, the longitude, and the floor of the location thereof.

The mobile terminal 105 is an example of the mobile terminal 100 illustrated in FIG. 1 and identifies the location thereof using the IMES. The mobile terminal 105 includes an IMES reception unit 175 and a terminal location identification unit 185.

The IMES reception unit 175 can communicate with the IMES transmitter 840. The IMES reception unit 175 obtains the wireless signal information transmitted from the IMES transmitter 840.

The terminal location identification unit 185 is an example of the terminal location identification unit 180 illustrated in FIG. 1 and identifies the location of the mobile terminal 105 on the basis of the information indicating the latitude, the longitude, and the floor included in the wireless signal information transmitted from the IMES transmitter 840.

Since the location of the mobile terminal 105 and the locations of the scenes can be identified with values using the IMES in this modification, priority in display may be set more strictly as illustrated in FIG. 21.

As illustrated in FIG. 21, first, the terminal location identification unit 185 obtains the terminal location information indicating the location of the mobile terminal 105 (S210). That is, the terminal location identification unit 185 obtains the information for identifying the latitude, the longitude, and the floor of the current location of the mobile terminal 105 from the IMES transmitter 840 as the terminal location information.

Next, the display control unit 130 calculates a distance between a location indicated by scene location information regarding one of the scenes included in the scene information and the location indicated by the obtained terminal location information (S211). More specifically, the display control unit 130 calculates a distance between a location determined by the latitude, the longitude, and the floor identified by the scene location information and a location determined by the latitude, the longitude, and the floor identified by the terminal location information. For example, the lighting information management unit 150 temporarily manages the calculated distance by associating the distance with the scene.

Next, the display control unit 130 determines whether the calculation of a distance has been completed for all the scenes included in the scene information (S212). If the calculation of a distance has not been completed for all the scenes (NO in S212), the display control unit 130 changes the calculation target to another scene for which the distance has not been calculated (S213) and calculates the distance (S211).

If the calculation of a distance has been completed for all the scenes included in the scene information (YES in S212), the display control unit 130 gives higher priority in display to scenes with which the calculated distances are shorter (S214). As a result, the display control unit 130 can rearrange the one or more scene icons corresponding to the one or more pieces of scene location information in order of increasing distance from the location determined by the latitude, the longitude, and the floor identified by the terminal location information and display the one or more scene icons on the display unit 120.

As described above, according to the method for controlling the mobile terminal 105 according to this modification, the location of the mobile terminal 105 can be identified with values. Therefore, the one or more scene icons can be rearranged accurately. As a result, the user can select a scene more easily. In addition, since the terminal location information can be automatically and accurately obtained using the IMES, the amount of work performed by the user decreases, thereby enhancing usability.

Second Embodiment

Next, a method for controlling a mobile terminal 100 according to a second embodiment will be described. More specifically, a method for editing a scene will be described. That is, in the second embodiment, a method for setting a new scene by editing an existing scene will be described. For example, in the second embodiment, a case in which the edit button 340 is selected in the scene selection screen 300 illustrated in FIG. 3A or the scene selection screen 301 illustrated in FIG. 3B will be described.

The configurations of a lighting system 10, the mobile terminal 100, and one or more lighting devices (a first lighting device 200 and a second lighting device 201) according to the second embodiment are the same as those illustrated in FIG. 1, and accordingly description thereof might be omitted.

Figure 22:
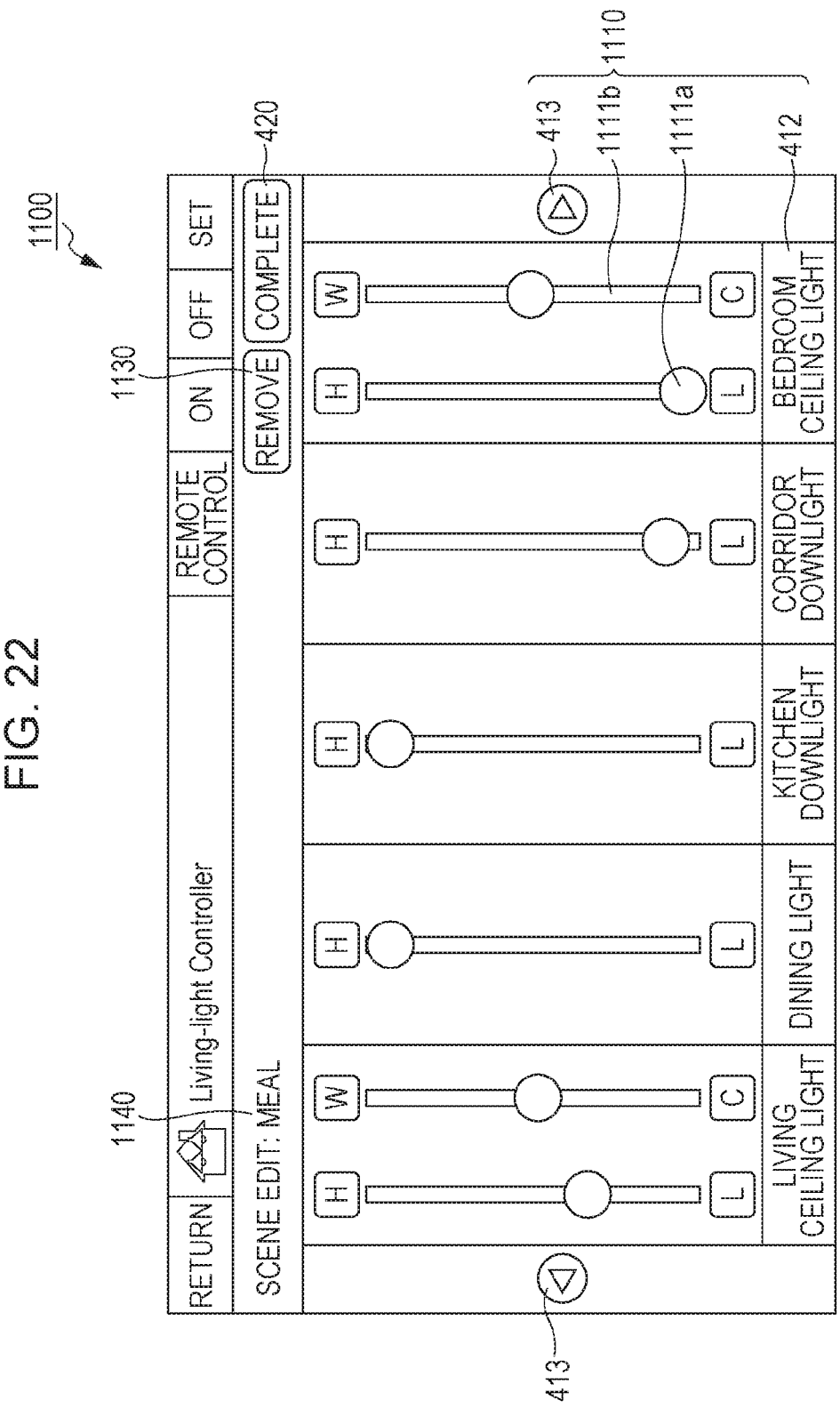
FIG. 22 is a diagram illustrating an example of a scene edit screen according to a second embodiment.

First, a scene edit screen generated by the display control unit 130 will be described with reference to FIG. 22. FIG. 22 is a diagram illustrating a scene edit screen 1100 according to the second embodiment.

The scene edit screen 1100 is an example of the scene setting screen and is a screen for setting a new scene by editing an existing scene. The scene edit screen 1100 is displayed by selecting the edit button 340 in the scene selection screen 300 illustrated in FIG. 3A or the scene selection screen 301 illustrated in FIG. 3B with one of the scene icons 310 selected.

As illustrated in FIG. 22, the scene edit screen 1100 includes a setting screen 1110, a complete button 420, a remove button 1130, and a scene name 1140.

The setting screen 1110 is a screen for setting a new scene indicating a new illumination state established by the one or more lighting devices by editing a scene corresponding to the selected scene icon 310. More specifically, the setting screen 1110 is a screen for setting a new scene by editing an existing scene. As illustrated in FIG. 22, the setting screen 1110 includes intensity adjustment sliders 1111a, color adjustment sliders 1111b, lighting device names 412, and scroll buttons 413.

The initial positions of the intensity adjustment sliders 1111a and the color adjustment sliders 1111b in the scene edit screen 1100 are different from those of the intensity adjustment sliders 411a and the color adjustment sliders 411b, respectively, illustrated in FIG. 5. That aside, the intensity adjustment sliders 1111a and the color adjustment sliders 1111b are the same as the intensity adjustment sliders 411a and the color adjustment sliders 411b, respectively.

The initial positions of the intensity adjustment sliders 1111a and the color adjustment sliders 1111b are determined on the basis of the setting information corresponding to the selected scene. That is, the illumination state set in the setting screen 1110 before the user operates the setting screen 1110 is the illumination state indicated by the scene corresponding to the selected scene icon 310.

For example, if the scene "meal" is selected as illustrated in FIG. 22, the initial positions of the intensity adjustment sliders 1111a and the color adjustment sliders 1111b are determined on the basis of the lighting device setting information corresponding to the scene "meal" using the scene information illustrated in FIG. 2. More specifically, because the initial value of the intensity adjustment ratio of the "living ceiling light" is 30 and the initial value of the color temperature of the "living ceiling light" is 3,500 K, the initial positions of the corresponding intensity adjustment slider 1111a and color adjustment slider 1111b are positions corresponding to 30 and 3,500 K, respectively.

The remove button 1130 is a button for removing the selected scene. The remove button 1130 is an example of the GUI component and, for example, is a push button. If the user selects the remove button 1130, the scene name, the scene icon, the scene location information, and the setting information corresponding to the selected scene are removed from the scene information.

The scene name 1140 is information indicating the scene to be edited. For example, the scene name 1140 is the scene name 320 corresponding to the scene icon 310 selected in the scene selection screen 300 illustrated in FIG. 3A or the scene selection screen 301 illustrated in FIG. 3B. Since the scene name 1140 is displayed, the user can understand which scene he/she is editing.

Figure 23B:
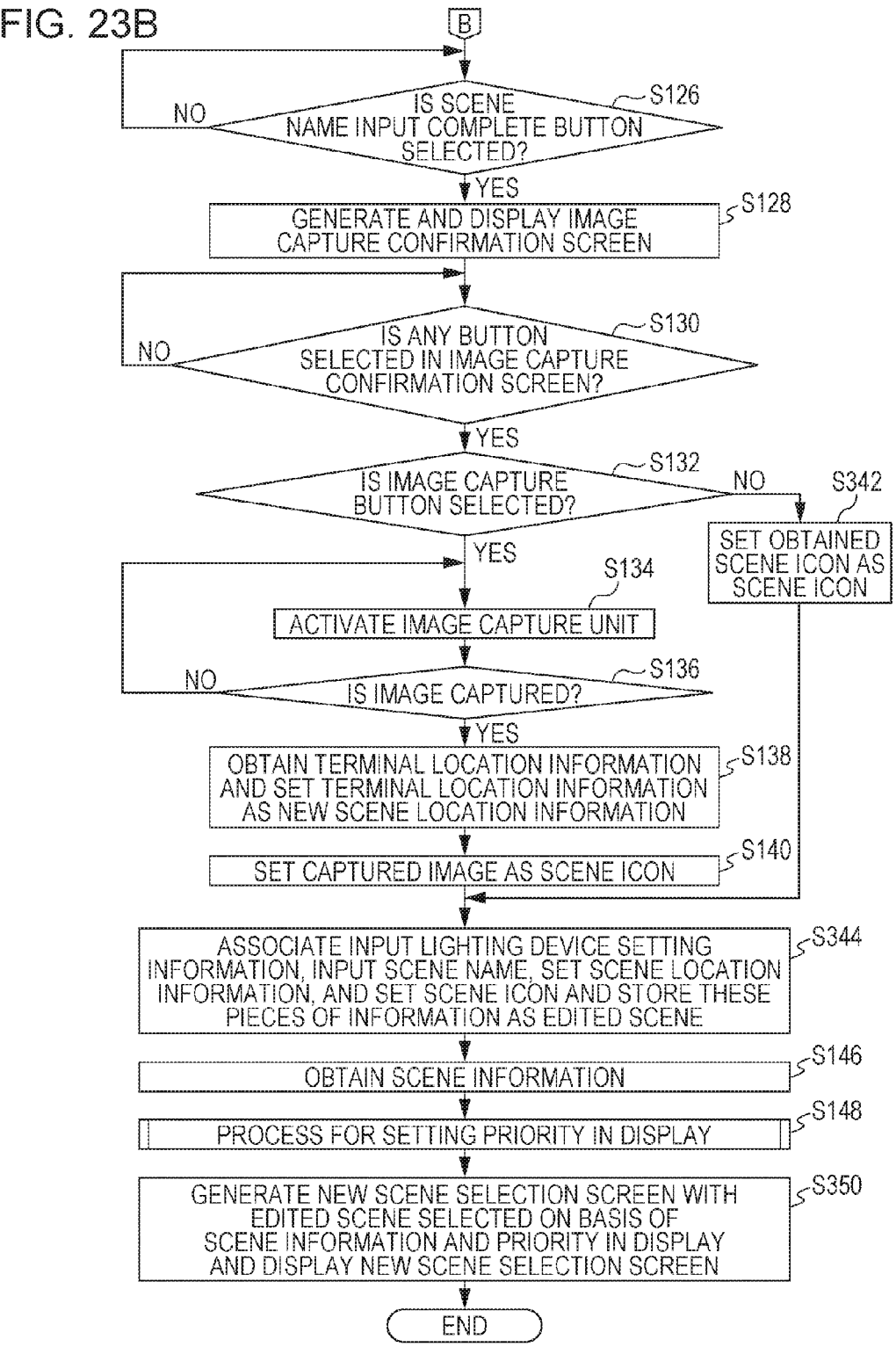
FIG. 23B is a flowchart illustrating the example of the method for editing a scene according to the second embodiment.

Next, a method for editing a scene according to the second embodiment will be described with reference to FIGS. 23A, 23B, and 24A to 24H. FIGS. 23A and 23B are flowcharts illustrating an example of the method for editing a scene according to the second embodiment. FIGS. 24A to 24H are diagrams illustrating an example of switching of the screen displayed in the method for editing a scene according to the second embodiment. In FIGS. 23A and 23B, the same steps of processing as in the method for creating a scene according to the first embodiment are given the same reference numerals, and description thereof might be omitted.

First, the display control unit 130 obtains the scene information (S100). The display control unit 130 then performs the process for setting priority in display on the basis of the obtained scene information (S102). A specific process is as described with reference to FIG. 11.

Figure 24A:
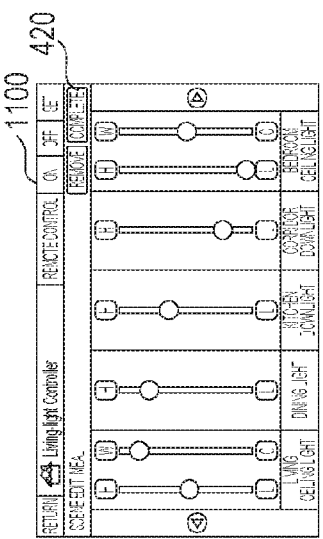

Next, the display control unit 130 generates the scene selection screen on the basis of the obtained scene information and the set priority in display and displays the generated scene selection screen on the display unit 120 (S104). For example, the display control unit 130 generates the scene selection screen by rearranging the one or more scene icons in order of priority in display and displays the scene selection screen on the display unit 120. As a result, for example, the scene selection screen 300 in which the scene icons corresponding to the scene "living room" are displayed first is displayed on the display unit 120 as illustrated in FIG. 24A. Details of the scene selection screen 300 are as described with reference to FIG. 3A.

Next, the display control unit 130 waits until one of the one or more scene icons 310 is selected (NO in S305). If one of the one or more scene icons 310 is selected (YES in S305), the display control unit 130 obtains the location information regarding the mobile terminal 100 and sets the obtained location information as the scene location information indicating the location of the selected scene (S306). The selected scene refers to a scene corresponding to the selected scene icon 310.

For example, the terminal location identification unit 180 identifies the location of the mobile terminal 100 at a time when the one of the one or more scene icons 310 is selected, and outputs location information indicating the identified location to the display control unit 130. Thus, the display control unit 130 obtains, using the terminal location identification unit 180, the location information indicating the location of the mobile terminal 100 if one of the one or more scene icons 310 is selected. The display control unit 130 then sets the obtained location information as the scene location information indicating the selected scene.

Next, the lighting control unit 160 generates a control signal on the basis of the setting information regarding the one or more lighting devices corresponding to the selected scene and transmits the generated control signal to the one or more lighting devices (S307). That is, the lighting control unit 160 generates a control signal for illuminating the corresponding space in the illumination state indicated by the scene corresponding to the selected scene icon 310. The lighting control unit 160 then transmits the generated control signal to the one or more lighting devices through the communication unit 170 and the network. As a result, the space can be illuminated in the illumination state indicated by the selected scene.

Next, if a scene edit button (the edit button 340) is selected (YES in S308), the display control unit 130 obtains the location information regarding the mobile terminal 100 and sets the obtained location information as the scene location information regarding the edited scene (S309). For example, the terminal location identification unit 180 identifies the location of the mobile terminal 100 at a time when the scene edit button is selected, and outputs the location information indicating the identified location to the display control unit 130. Thus, the display control unit 130 obtains, using the terminal location identification unit 180, the location information indicating the location of the mobile terminal 100 at a time when the scene edit button is selected. The display control unit 130 then sets the obtained location information as the scene location information regarding the edited scene.

On the other hand, if the scene edit button (the edit button 340) is not selected (NO in S308), the display control unit 130 waits until the edit button 340 is selected. At this time, if another scene icon 310 is selected, the display control unit 130 displays the selected scene icon 310 while adding the certain frame 360 around the scene icon. In addition, the lighting control unit 160 generates a control signal for illuminating the corresponding space in the illumination state indicated by the scene corresponding to the selected scene icon 310. The lighting control unit 160 then transmits the generated control signal to the one or more lighting devices through the communication unit 170 and the network. As a result, the corresponding space can be illuminated in the illumination state indicated by the selected scene.

Next, the display control unit 130 obtains the operation target lighting information (S110). More specifically, if the input unit 110 detects pressing of the edit button 340, the display control unit 130 reads and obtains the operation target lighting information stored in the lighting information management unit 150.

Next, the display control unit 130 obtains the lighting device setting information, the scene name, and the scene icon corresponding to the selected scene (S311). More specifically, the display control unit 130 reads and obtains the lighting device setting information, the scene name, and the scene icon corresponding to the selected scene from the lighting information management unit 150.

Figure 24B:
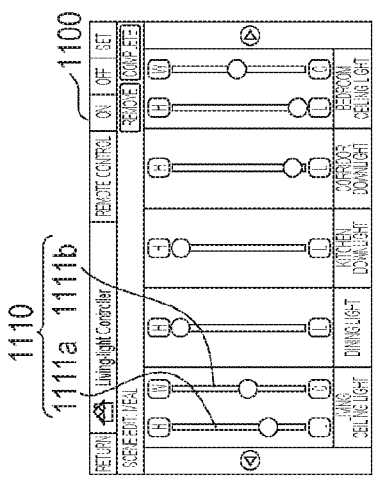

Next, the display control unit 130 generates the scene edit screen 1100 on the basis of the obtained operation target lighting information and displays the generated scene edit screen 1100 on the display unit 120 (S312). As a result, the scene edit screen 1100 is displayed on the display unit 120 as illustrated in FIG. 24B. Details of the scene edit screen 1100 are as described with reference to FIG. 22.

At this time, the display control unit 130 determines the initial positions of the sliders included in the scene edit screen 1100 on the basis of the lighting device setting information corresponding to the selected scene. That is, as illustrated in FIG. 24B, when the scene edit screen 1100 is displayed, the sliders whose initial positions are positions determined on the basis of the lighting device setting information corresponding to the scene "meal" are displayed.

Next, the display control unit 130 and the lighting control unit 160 obtain the lighting device setting information input by the user in the scene edit screen 1100 (S314). By displaying the scene edit screen 1100 as illustrated in FIG. 24B, the user can set the value of the intensity adjustment function or the color adjustment function of each of the one or more lighting devices. The display control unit 130 and the lighting control unit 160 obtain the set value indicated by the intensity adjustment slider 1111a or the color adjustment slider 1111b operated by the user through, for example, the input unit 110.

Figure 24C:
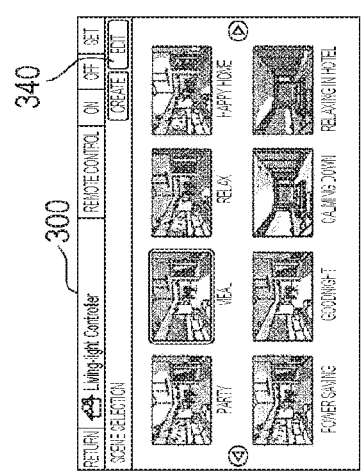

The display control unit 130 then generates the scene edit screen 1100 in accordance with the set values obtained through the input unit 110 and displays the generated scene edit screen 1100 on the display unit 120. That is, the display control unit 130 sequentially generates the scene edit screen 1100 in synchronization with operations performed by the user and displays the generated scene edit screen 1100 on the display unit 120. More specifically, if the user operates a slider, how the slider is displayed in the scene edit screen 1100 changes in accordance with the operation performed by the user. Thus, the scene edit screen 1100 after the change is displayed on the display unit 120 as illustrated in FIG. 24C.

The lighting control unit 160 generates a control signal for controlling the one or more lighting devices on the basis of the setting information indicating the illumination state set by the user by operating the setting screen (S116). The lighting control unit 160 then transmits the generated control signal to the one or more lighting devices through the communication unit 170 and the network. As a result, the illumination state established by the one or more lighting devices sequentially changes in synchronization with operations performed by the user.

The obtaining of the setting information (S314) and the control of the one or more lighting devices (S116) realized by operations performed by the user are repeated until a scene edit complete button (the complete button 420) is selected (NO in S318).

Thus, the illumination state established by the one or more lighting devices changes in synchronization with operations performed by the user in the setting screen 1110. Therefore, the user can set a desired scene by operating the mobile terminal 100 while checking the actual atmosphere of the illumination state.

If the scene edit complete button (the complete button 420) is selected (YES in S318), the display control unit 130 obtains the location information regarding the mobile terminal 100 and sets the obtained location information as the scene location information regarding the edited scene (S120). A specific process is the same as that of the process for setting scene location information (S309), which is performed by selecting the edit button 340. That is, the display control unit 130 obtains, using the terminal location identification unit 180, the location information indicating the location of the mobile terminal 100 at a time when the scene edit complete button is selected. The display control unit 130 then sets the obtained location information as the scene location information regarding the edited scene.

If the currently obtained location information is different from the scene location information set by selecting the edit button 340, the display control unit 130 changes the scene location information regarding the edited scene to the currently obtained location information. If the currently obtained location information is the same as the scene location information set by selecting the edit button 340, the display control unit 130 need not change the scene location information regarding the edited scene.

Figures 24D, 24E, 24F:
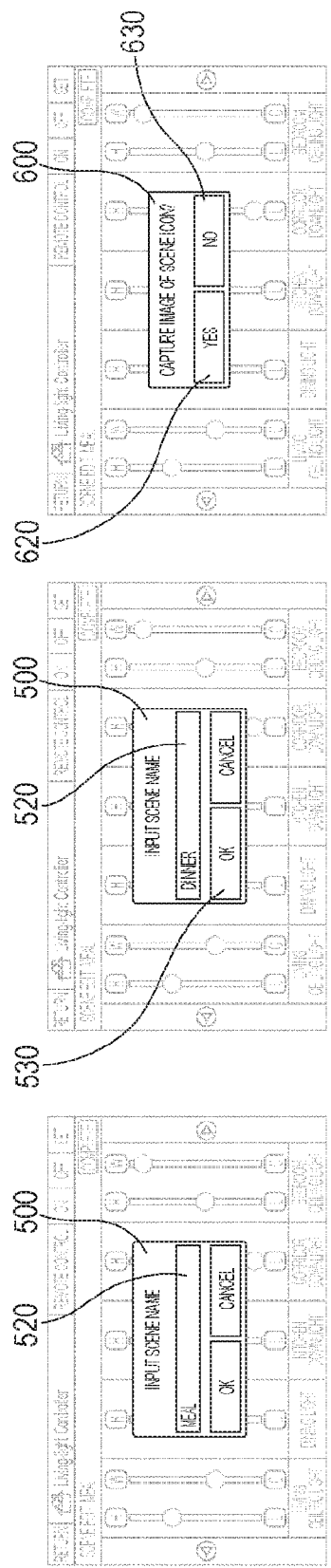

Next, the display control unit 130 generates the scene name input screen 500 and displays the generated scene name input screen 500 on the display unit 120 (S322). More specifically, if the input unit 110 detects pressing of the complete button 420, the display control unit 130 generates the scene name input screen 500. As a result, the scene name input screen 500 is displayed on the display unit 120 as illustrated in FIG. 24D. Details of the scene name input screen 500 are as described with reference to FIG. 6.

When the scene name input screen 500 is displayed, the scene name corresponding to the selected scene icon 310 is displayed in the text box 520. More specifically, as illustrated in FIG. 24D, "meal" is displayed in the text box 520. The user can use the displayed scene name. Alternatively, the user can remove the displayed scene name and input a desired scene name in the text box 520.

The input unit 110 obtains the text input to the text box 520. The display control unit 130 displays the text obtained by the input unit 110 in the text box 520 (S124). As a result, the scene name input screen 500 including the text box 520 in which the text input by the user is displayed is displayed on the display unit 120 as illustrated in FIG. 24E. In FIGS. 24A to 24H, a case in which the scene name is changed from "meal" to "dinner" is illustrated.

A procedure from the process for detecting pressing of the OK button 530 in the scene name input screen 500 (S126) to the process for setting a captured image as a scene icon (S140) is the same as that in the method for creating a scene illustrated in FIG. 10B.

More specifically, if the OK button 530 is selected, the image capture confirmation screen 600 is displayed as illustrated in FIG. 24F. Furthermore, if the YES button 620 is selected in the image capture confirmation screen 600, the imaging device 140 is activated, and an image (live view image) captured by the image sensor of the imaging device 140 is displayed on the display unit 120 as illustrated in FIG. 24G. If the user presses the shutter button, the imaging device 140 captures an image.

On the other hand, if the button selected in the image capture confirmation screen 600 is the NO button 630 (NO in S132), the display control unit 130 sets the scene icon corresponding to the selected scene, that is, the scene that is being edited, as the scene icon of the edited scene (S342). At this time, the display control unit 130 may set a default image as the scene icon.

The lighting information management unit 150 associates the setting information regarding the one or more lighting devices, the input scene name, the set scene location information, and the scene icon with one another and stores these pieces of information in the memory as the edited scene (S344). That is, if the imaging device 140 captures an image, the captured image is managed as the scene icon, and if the imaging device 140 does not capture an image, the scene icon before the editing or a default image is managed as the scene icon.

Next, the display control unit 130 obtains the scene information (S146). More specifically, the display control unit 130 reads and obtains the scene information stored in the lighting information management unit 150 and including the edited scene.

Next, the display control unit 130 performs the process for setting priority in display on the basis of the obtained scene information (S148). The process for setting priority in display is as illustrated in FIG. 11.

The display control unit 130 then generates a new scene selection screen 702 with the edited scene, that is, the new scene, selected and displays the generated new scene selection screen 702 on the display unit 120 (S350). Thus, the display control unit 130 displays the new scene selection screen 702 including the scene icon of the new scene on the display unit 120 instead of the scene icon (scene icon to be edited) selected from the one or more scene icons 310. As a result, the new scene selection screen 702 is displayed on the display unit 120 as illustrated in FIG. 24H.

After the new scene selection screen 702 is displayed, the procedure after the process for detecting pressing of one of the one or more scene icons 310 (S305) is repeated.

As described above, according to the method for controlling the mobile terminal 100 according to this embodiment, the scene icons 310 are rearranged on the basis of the terminal location information and the one or more pieces of scene location information. Therefore, a scene selection screen according to the location of the mobile terminal 100 can be generated. Therefore, the user can easily select a scene.

In this embodiment, an example in which a new scene is set by editing an existing scene has been described. At this time, the existing scene is overwritten with the new scene, but the new scene may be saved separately from the existing scene. That is, both the existing scene and the new scene may be included in the scene information. In other words, the display control unit 130 may display the new scene selection screen including the scene icon of the new scene as well as the one or more scene icons 310 on the display unit 120.

Modification of First and Second Embodiments

Figure 25:
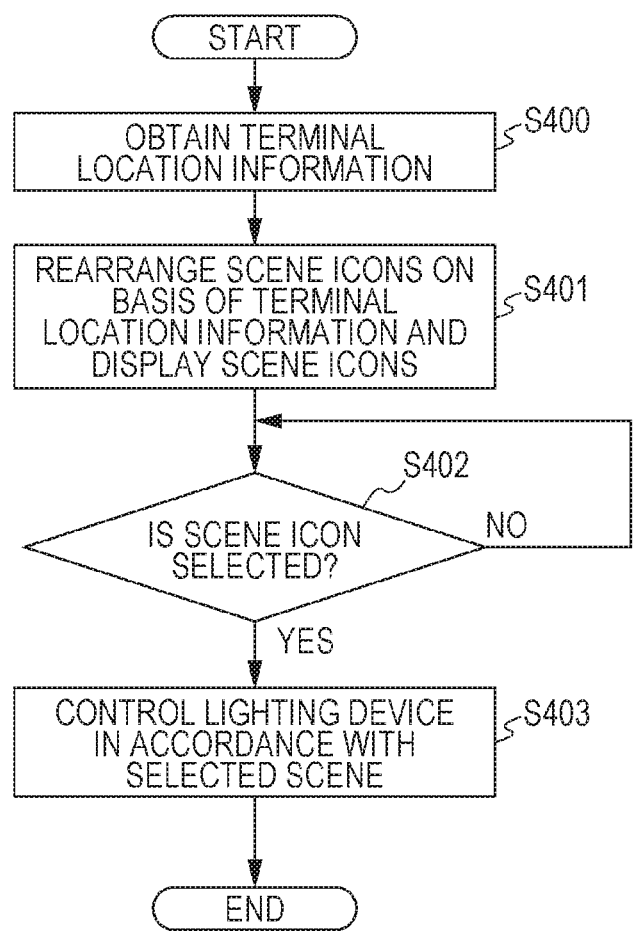
FIG. 25 is a flowchart illustrating an example of a method for setting a scene according to a modification of the first and second embodiments.

Although detailed configurations of the method for controlling the mobile terminal 100 has been described in the first and second embodiments, for example, a scene need not necessarily be created or edited. In other words, it is only required that predetermined one or more scene icons be rearranged on the basis of the terminal location information and displayed. More specifically, the mobile terminal 100 may be controlled in accordance with a flowchart of FIG. 25. FIG. 25 is a flowchart illustrating an example of a method for setting a scene according to a modification of the first and second embodiments.

First, the display control unit 130 obtains the terminal location information indicating the location of the mobile terminal 100 using the terminal location identification unit 180 (S400). More specifically, the terminal location identification unit 180 obtains information identifying a room or an area in which the mobile terminal 100 is located as the terminal location information and outputs the terminal location information to the display control unit 130.

Next, the display control unit 130 rearranges, using the lighting information management unit 150, which stores one or more scenes indicating one or more illumination states established by one or more lighting devices and one or more pieces of scene location information indicating the locations of the one or more scenes while associating the one or more scenes and the one or more pieces of scene location information with each other, one or more scene icons 310 corresponding to the one or more scenes on the basis of the terminal location information and the one or more pieces of scene location information and displays the one or more scene icons 310 on the display unit 120 (S401). More specifically, the display control unit 130 sets priority in display for each scene on the basis of FIG. 11 or FIG. 21 and displays scene icons 310 corresponding to scenes having higher priority first. At this time, the create button 330 and the edit button 340 need not be displayed.

Next, if one of the one or more scene icons 310 is selected (YES in S402), the lighting control unit 160 transmits, to the one or more lighting devices, a control signal for controlling the one or more lighting devices in such a way as to illuminate the corresponding space in the illumination state indicated by a scene corresponding to the selected icon 310 (S403).

If one of the one or more scene icons 310 is not selected (NO in S402), the display control unit 130 waits until one of the one or more scene icons 310 is selected.

As described above, according to the method for controlling the mobile terminal 100 according to this modification, the one or more scene icons 310 are rearranged on the basis of the terminal location information and displayed. As a result, scene icons 310 corresponding to the location of the mobile terminal 100 can be displayed first, and accordingly the user can easily select a scene.

Although an example in which the mobile terminal 100 includes the display control unit 130, the lighting information management unit 150, and the lighting control unit 160 has been described in each of the above embodiments, the configuration of the mobile terminal 100 is not limited to this. For example, a server connected to the mobile terminal 100 through the network may include the display control unit 130, the lighting information management unit 150, and the lighting control unit 160, instead. That is, the mobile terminal 100 may be a terminal that captures and displays images on the basis of instructions transmitted from the server through the network.

Figure 26:
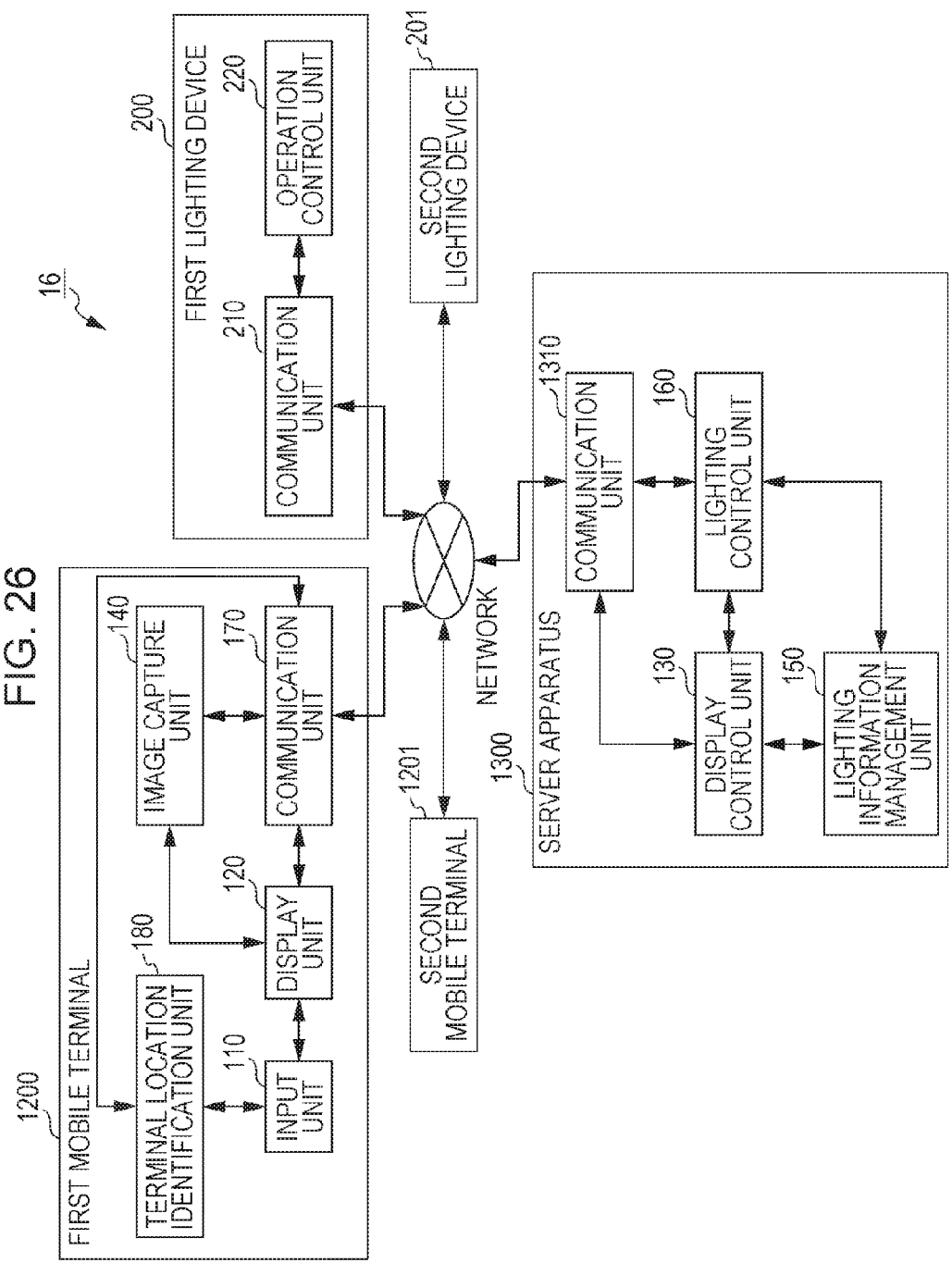
FIG. 26 is a block diagram illustrating an example of a lighting system according to the modification of the first and second embodiments.

FIG. 26 is a block diagram illustrating an example of a lighting system 16 according to the modification of the first and second embodiments. As illustrated in FIG. 26, the lighting system includes a first mobile terminal 1200, a second mobile terminal 1201, the first lighting device 200, the second lighting device 201, and a server apparatus 1300.

The first mobile terminal 1200 is an example of a terminal that controls one or more lighting devices that illuminate a space. More specifically, the first mobile terminal 1200 controls the one or more lighting devices (the first lighting device 200 and the second lighting device 201 in the example illustrated in FIG. 26) through the server apparatus 1300.

As illustrated in FIG. 26, the first mobile terminal 1200 includes an input unit 110, a display unit 120, an imaging device 140, a communication unit 170, and a terminal location identification unit 180.

Each processing unit performs processing on the basis of an instruction from the server apparatus 1300. For example, the display unit 120 displays a screen generated by a display control unit 130 of the server apparatus 1300 and obtained through the communication unit 170. In addition, the imaging device 140 transmits a captured image to the server apparatus 1300 through the communication unit 170. The input unit 110 transmits an operation performed by the user to the server apparatus 1300 through the communication unit 170. In addition, the terminal location identification unit 180 transmits obtained terminal location information to the server apparatus 1300 through the communication unit 170.

The second mobile terminal 1201 is, as with the first mobile terminal 1200, an example of the terminal that controls one or more lighting devices that illuminate a space. That is, the first mobile terminal 1200 and the second mobile terminal 1201 can each control the first lighting device 200 and the second lighting device 201. In other words, one or more mobile terminals can each control one or more lighting devices. Although not illustrated, the second mobile terminal 1201 includes, as with the first mobile terminal 1200, an input unit 110, a display unit 120, an imaging device 140, a communication unit 170, and a terminal location identification unit 180.

The server apparatus 1300 is a server that controls the mobile terminals that control the one or more lighting devices that illuminate the space. More specifically, the server apparatus 1300 controls the first mobile terminal 1200 and the second mobile terminal 1201.

As illustrated in FIG. 26, the server apparatus 1300 includes a communication unit 1310, the display control unit 130, a lighting information management unit 150, and a lighting control unit 160.

The communication unit 1310 transmits a control signal generated by the lighting control unit 160 to the one or more lighting devices connected through a network. In addition, the communication unit 1310 transmits information indicating a screen to be displayed on the display unit 120 generated by the display control unit 130 to the first mobile terminal 1200 or the second mobile terminal 1201. In addition, the communication unit 1310 receives an operation, which is performed by the user, obtained through the input unit 110 and the display unit 120 from the first mobile terminal 1200 or the second mobile terminal 1201. In addition, the communication unit 1310 receives an image captured by the imaging device 140 from the first mobile terminal 1200 or the second mobile terminal 1201. In addition, the communication unit 1310 receives the terminal location information obtained by the terminal location identification unit 180 from the first mobile terminal 1200 or the second mobile terminal 1201.

For example, the communication unit 1310 is a communication interface such as a wireless LAN module, a BLUETOOTH (registered trademark) module, or an NFC module. Alternatively, the communication unit 1310 may be a wired LAN terminal.

For example, assume that the first mobile terminal 1200 creates a first scene and the second mobile terminal 1201 creates a second scene. More specifically, the first mobile terminal 1200 and the second mobile terminal 1201 create the first scene and the second scene, respectively, by communicating with the server apparatus 1300. At this time, the lighting information management unit 150 of the server apparatus 1300 manages scene information including the first scene and the second scene.

Because the display control unit 130 generates a scene selection screen on the basis of the scene information managed by the lighting information management unit 150, a scene icon of the first scene and a scene icon of the second scene are displayed in the scene selection screen. Therefore, both the first mobile terminal 1200 and the second mobile terminal 1201 can select the first scene or the second scene.

At this time, if the first mobile terminal 1200 and the second mobile terminal 1201 are located in different places, different scene selection screens are displayed on the first mobile terminal 1200 and the second mobile terminal 1201. For example, if the terminal location information received from the first mobile terminal 1200 is information identifying the "living room", the server apparatus 1300 displays the scene selection screen 300 illustrated in FIG. 3A on the display unit 120 of the first mobile terminal 1200. If the terminal location information received from the second mobile terminal 1201 is information identifying the "bedroom", the server apparatus 1300 displays the scene selection screen 301 illustrated in FIG. 3B on the display unit 120 of the second mobile terminal 1201.

As described above, since the server apparatus 1300 controls the one or more mobile terminals and the one or more lighting devices, usability can be enhanced for the user. For example, the user can select a scene using any of the one or more mobile terminals even if the user has created scenes using any of the one or more lighting devices.

Here, the first mobile terminal 1200 and the second mobile terminal 1201 may each include the display control unit 130 and the lighting control unit 160, and the server apparatus 1300 may include the lighting information management unit 150, instead. That is, the server apparatus 1300 may collectively manage the scene information and operation target lighting information, and the first mobile terminal 1200 and the second mobile terminal 1201 may generate a control signal and transmit the control signal to the one or more lighting devices.

The second embodiment may be implemented in combination with the first embodiment.

Third Embodiment

Next, a method for controlling a mobile terminal according to a third embodiment will be described. The method for controlling a mobile terminal according to the third embodiment is different from those according to the first and second embodiments in that one or more scene icons corresponding to one or more scenes are rearranged on the basis of a current time and displayed on a display unit 120.

Figure 27:
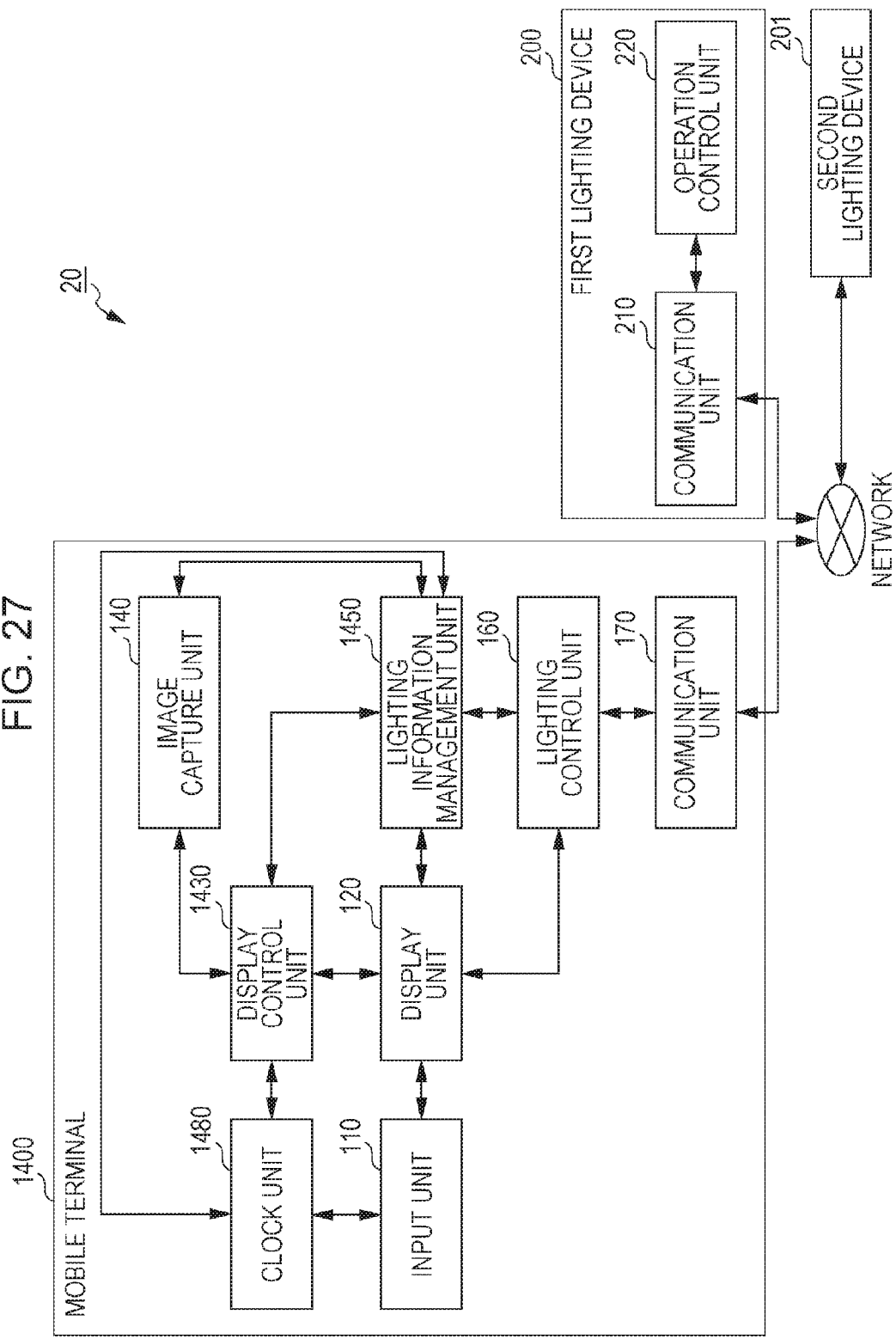
FIG. 27 is a block diagram illustrating an example of a lighting system according to a third embodiment.

First, the functional configuration of a lighting system according to the third embodiment will be described with reference to FIG. 27. FIG. 27 is a block diagram illustrating a lighting system 20 according to the third embodiment. In the following description, description of the same components as those according to the first embodiment might be omitted and differences will be mainly described.

As illustrated in FIG. 27, the lighting system 20 includes a mobile terminal 1400, the first lighting device 200, and the second lighting device 201. The mobile terminal 1400 is connected to the first lighting device 200 and the second lighting device 201 through a network.

Next, the configuration of the mobile terminal 1400 will be described.

The mobile terminal 1400 is, as with the mobile terminal 100 illustrated in FIG. 1, an example of the terminal that controls one or more lighting devices that illuminate one or more spaces. As illustrated in FIG. 27, the mobile terminal 1400 is different from the mobile terminal 100 illustrated in FIG. 1 in that the mobile terminal 1400 includes a display control unit 1430, a lighting information management unit 1450, and a clock unit 1480, instead of the display control unit 130, the lighting information management unit 150, and the terminal location identification unit 180.

As with the display control unit 130 illustrated in FIG. 1, the display control unit 1430 generates screens to be displayed on the display unit 120. More specifically, the display control unit 1430 generates a scene selection screen on the basis of scene information managed by the lighting information management unit 1450 and time information obtained by the clock unit 1480. For example, the display control unit 1430 includes a CPU, a ROM, and a RAM.

The lighting information management unit 1450 manages the scene information and operation target lighting information. The scene information is information including one or more scenes and one or more pieces of scene time information indicating the times of the corresponding scenes. The operation target lighting information is information indicating the one or more lighting devices that can be controlled by the mobile terminal 1400. The scene information will be described later with reference to FIG. 28. The operation target lighting information is the same as that illustrated in FIG. 4.

For example, the lighting information management unit 1450 is a memory such as a RAM or a nonvolatile memory. Alternatively, the lighting information management unit 1450 may be a memory removably attached to the mobile terminal 1400.

The clock unit 1480 is a timer and obtains the time information. For example, the clock unit 1480 outputs current time information indicating the current time to the display control unit 1430.

When a new scene is set, the clock unit 1480 outputs the time information indicating the time to the display control unit 1430 and the lighting information management unit 1450 at a certain timing. The output time information is associated with the set new scene and managed by the lighting information management unit 1450 as new scene time information indicating the time of the new scene.

Next, screens generated by the display control unit 1430 and displayed on the display unit 120 will be described with reference to FIGS. 28 to 30.

First, the scene information managed by the lighting information management unit 1450 and the scene selection screen generated on the basis of the scene information will be described with reference to FIGS. 28, 29A, and 29B. FIG. 28 is a diagram illustrating an example of the scene information according to the third embodiment. FIGS. 29A and 29B are diagrams illustrating scene selection screens 1500 and 1501, respectively, according to the third embodiment.

The scene information is, as with the scene information according to the second embodiment illustrated in FIG. 2, information indicating one or more scenes. The scene information illustrated in FIG. 28 is different from the scene information illustrated in FIG. 2 in that scene time information (the times of the scenes) is included instead of the scene location information (the locations of the scenes).

The scene time information is information indicating the times of the corresponding scenes. More specifically, the scene time information is information indicating the times at which the corresponding scenes have been set or the times at which the corresponding scenes have been selected. For example, the scene time information indicates times such as "20:00" and "19:00" as illustrated in FIG. 28.

The scene selection screen is generated on the basis of the above-described scene information. More specifically, the display control unit 1430 rearranges the one or more scene icons corresponding to the one or more scenes on the basis of the current time and displays the one or more scene icons on the display unit 120. More specifically, the display control unit 1430 rearranges the one or more scene icons corresponding to the one or more pieces of scene time information in a reverse chronological order and displays the one or more scene icons on the display unit 120.

For example, the display control unit 130 generates the scene selection screen 1500 illustrated in FIG. 29A or the scene selection screen 1501 illustrated in FIG. 29B on the basis of the scene information illustrated in FIG. 28 and the current time obtained by the clock unit 1480 and displays the scene selection screen 1500 or 1501 on the display unit 120.

The scene selection screen 1500 or 1501 is different from the scene selection screen 300 illustrated in FIG. 3A or the scene selection screen 301 illustrated in FIG. 3B only in terms of the arrangement of the scene icons 310. The arrangement of the buttons and the like is the same.

A process for rearranging scene icons on the basis of the current time will be described hereinafter by comparing the scene selection screen 1500 illustrated in FIG. 29A and the scene selection screen 1501 illustrated in FIG. 29B.

The display control unit 1430 displays scene icons corresponding to scenes having higher priority in display first. A specific example of a process for setting priority in display for each of the plurality of scenes will be described later with reference to FIG. 32.

The scene selection screen 1500 illustrated in FIG. 29A is, for example, a scene selection screen displayed when the current time is "20:00". In the scene information illustrated in FIG. 28, scene icons 310 corresponding to scenes (for example, "party", "meal", and the like) whose times are close to "20:00" are displayed first.

On the other hand, the scene selection screen 1501 illustrated in FIG. 29B is, for example, a scene selection screen displayed when the current time is "08:00". In the scene information illustrated in FIG. 28, scene icons 310 corresponding to scenes (for example, "power saving" and the like) whose times are close to "08:00" are displayed first.

Thus, the scene icons 310 rearranged in accordance with the time (current time) at which the scene selection screen is displayed are displayed on the display unit 120.

Next, a new scene selection screen generated by the display control unit 1430 will be described with reference to FIG. 30. FIG. 30 is a diagram illustrating a new scene selection screen 1600 according to the third embodiment.

The new scene selection screen 1600 is a scene selection screen displayed after the setting of a new scene is completed. More specifically, the new scene selection screen 1600 is a screen obtained by adding a scene icon of the new scene to an existing scene selection screen.

The new scene selection screen 1600 is different from the new scene selection screen 700 illustrated in FIG. 8 only in terms of the arrangement of the scene icons 310 and 710. The arrangement of buttons and the like is the same.

Scene time information regarding the new scene is normally closest to the current time, and accordingly the scene icon of the new scene is displayed first in the new scene selection screen 1600. In the example illustrated in FIG. 30, the new scene, which is "exercise", is displayed in an upper-left portion of the screen.

Figure 31A:
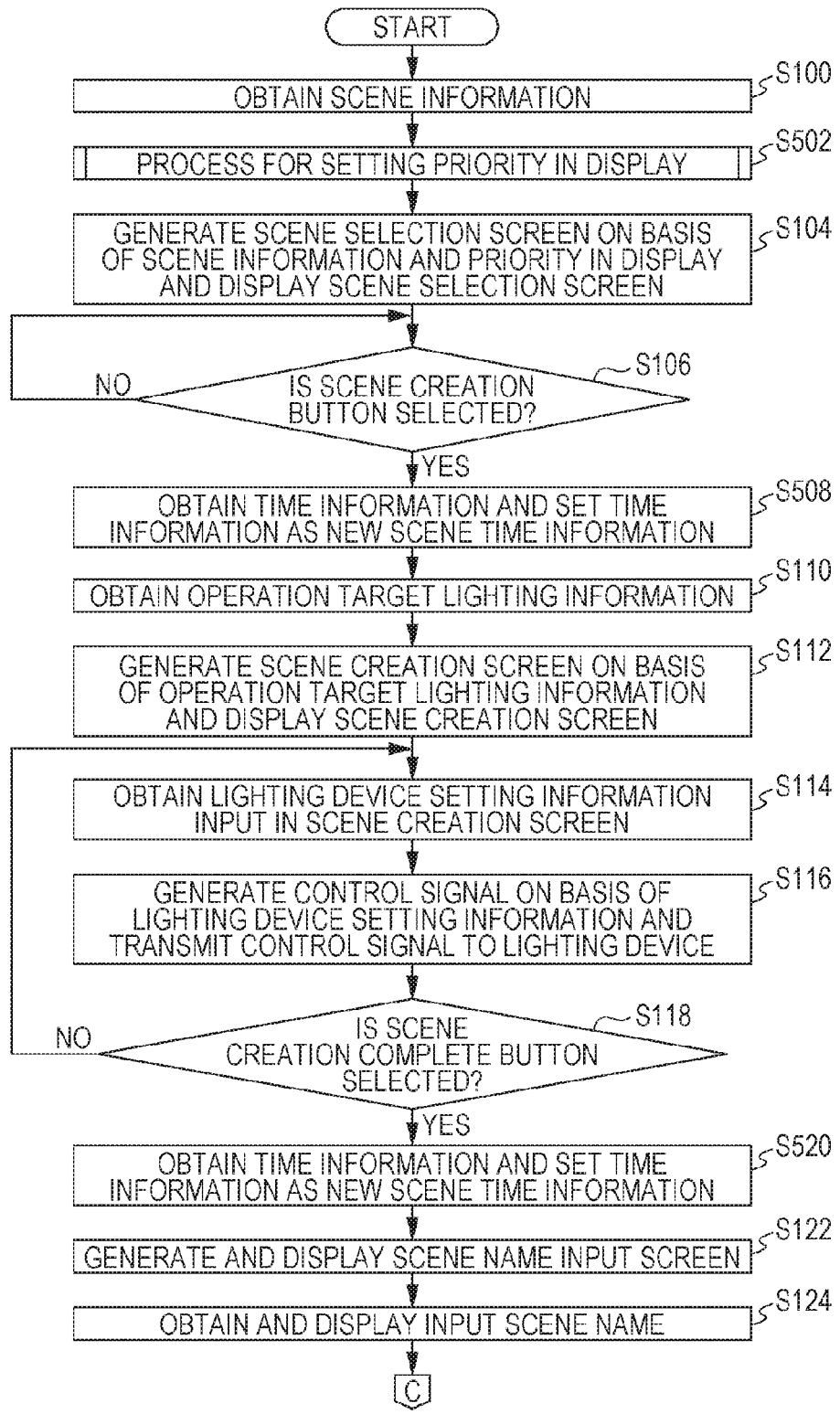
FIG. 31A is a flowchart illustrating an example of a method for creating a scene according to the third embodiment.
Figure 32:
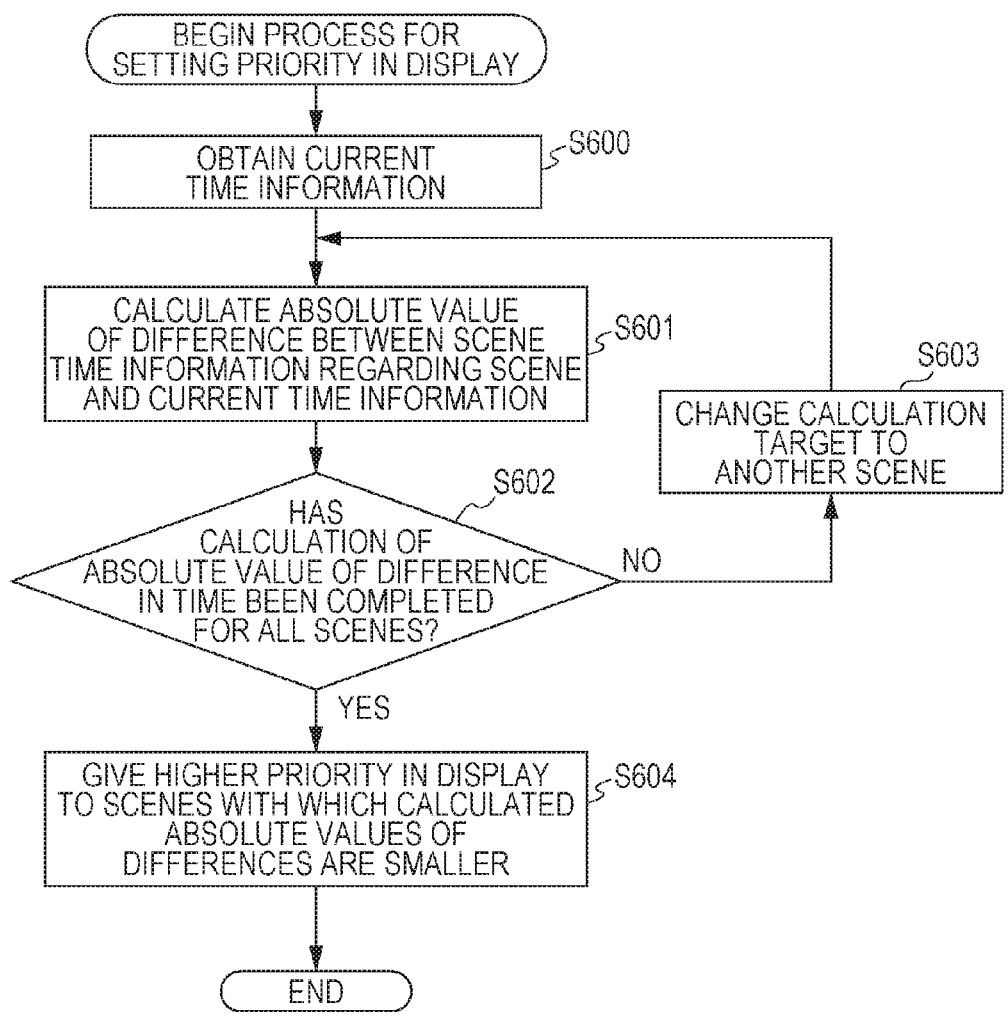
FIG. 32 is a flowchart illustrating an example of a method for setting priority in display according to the third embodiment.

Next, a method for creating a scene according to this embodiment will be described with reference to FIGS. 31A to 33I. FIGS. 31A and 31B are flowcharts illustrating an example of the method for creating a scene according to the third embodiment. FIG. 32 is a flowchart illustrating an example of the method for setting priority in display according to the third embodiment. FIGS. 33A to 33I are diagrams illustrating an example of switching of the screen displayed in the method for creating a scene according to the third embodiment.

For example, a method for controlling the mobile terminal 1400 according to this embodiment is realized by application software for controlling the one or more lighting devices. For example, the method for creating a scene according to the third embodiment is initiated by activating the application software.

First, the display control unit 1430 obtains the scene information (S100). More specifically, the display control unit 1430 reads and obtains the scene information stored in the lighting information management unit 1450. The scene information is, for example, information indicating the one or more already created scenes, such as one illustrated in FIG. 28.

Next, the display control unit 1430 performs the process for setting priority in display on the basis of the obtained scene information (S502). A specific process will be described with reference to FIG. 32.

As illustrated in FIG. 32, first, the clock unit 1480 obtains the current time information indicating the current time (S600).

Next, the display control unit 1430 calculates the absolute value of a difference between scene time information regarding one of the scenes included in the scene information and the obtained current time information (S601). More specifically, the display control unit 1430 calculates the absolute value of a difference between the time indicated by the scene time information and the current time indicated by the current time information. For example, the lighting information management unit 1450 temporarily manages the calculated absolute value of the time difference by associating the absolute value with the scene.

Next, the display control unit 1430 determines whether the calculation of the absolute value of a time difference has been completed for all the scenes included in the scene information (S602). If the calculation of the absolute value has not been completed for all the scenes (NO in S602), the display control unit 1430 changes the calculation target to another scene for which the absolute value has not been calculated (S603) and calculates the absolute value (S601).

If the calculation of the absolute value of a time difference has been completed for all the scenes included in the scene information (YES in S602), the display control unit 1430 gives higher priority in display to scenes with which the calculated absolute values are smaller (S604). As a result, the display control unit 1430 can rearrange the one or more scene icons 310 corresponding to the one or more pieces of scene time information in a reverse chronological order and display the scene icon 310 on the display unit 120.

Figure 33C:
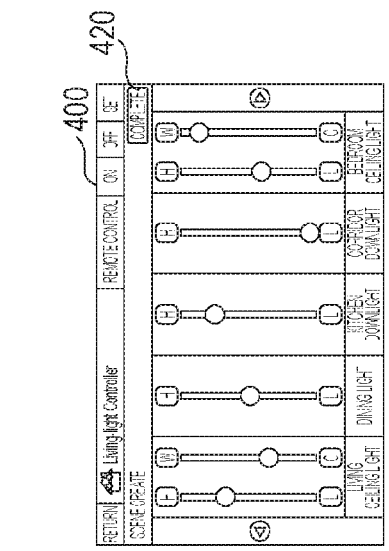
FIGS. 33A to 33I are diagrams illustrating an example of switching of a screen displayed in the method for creating a scene according to the third embodiment.
Figure 33B:
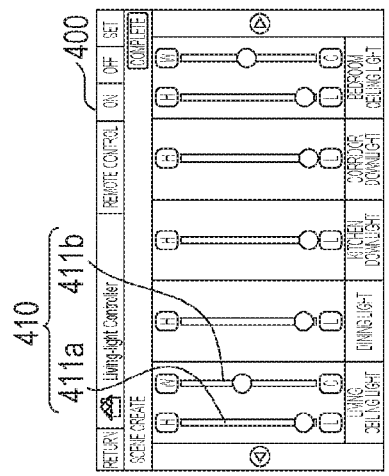
Figure 33A:
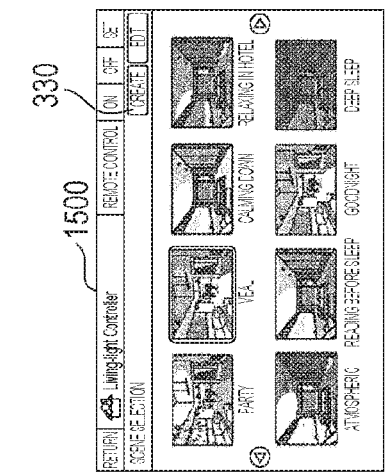

Next, as illustrated in FIG. 31A, the display control unit 1430 generates the scene selection screen on the basis of the obtained scene information and the set priority in display and displays the generated scene selection screen on the display unit 120 (S104). For example, the display control unit 1430 generates the scene selection screen by rearranging the one or more scene icons 310 in order of priority in display and displays the scene selection screen on the display unit 120. As a result, for example, the scene selection screen 1500 in which scene icons 310 whose times are close to "20:00" are displayed first is displayed on the display unit 120 as illustrated in FIG. 33A. Details of the scene selection screen 1500 are as described with reference to FIG. 29A.

Next, if the scene creation button (the create button 330) is selected (YES in S106), the display control unit 130 obtains time information and sets the obtained time information as the new scene time information indicating the time of the new scene (S508). For example, the clock unit 1480 outputs the time information indicating the time at which the scene creation button has been selected to the display control unit 130.

If the scene creation button (the create button 330) is not selected (NO in S106), the display control unit 130 waits until the create button 330 is selected.

A procedure performed until the scene creation complete button is selected (YES in S118) is the same as that in the method for creating a scene illustrated in FIG. 10A. More specifically, as illustrated in FIGS. 33B and 33C, the scene creation screen 400 is displayed on the display unit 120 in accordance with an operation performed by the user.

If the scene creation complete button (S420) is selected (YES in S118), the display control unit 1430 obtains the time information and sets the obtained time information as the new scene time information (S520). A specific process is the same as that of the process for setting new scene time information (S508), which is performed by selecting the create button 330. That is, the display control unit 1430 obtains, using the clock unit 1480, the time information indicating the time at which the scene creation button has been selected. The display control unit 1430 then sets the obtained time information as the new scene time information.

If the currently obtained time information is different from the new scene time information set by selecting the create button 330, the display control unit 1430 changes the new scene time information to the currently obtained time information. If the currently obtained time information is the same as the new scene time information set by selecting the create button 330, the display control unit 1430 need not change the new scene time information. Alternatively, the display control unit 1430 may set an average time of the time at which the create button 330 has been selected and the time at which the complete button 420 has been selected as the new scene time information.

Figure 33D:
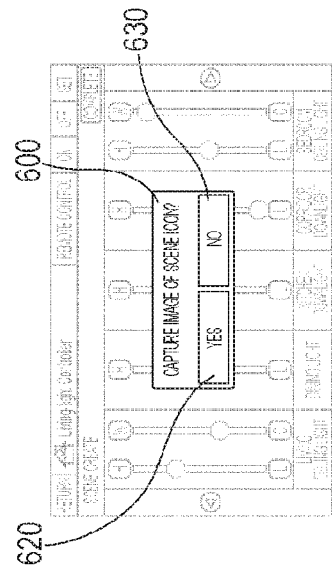
Figure 33E:
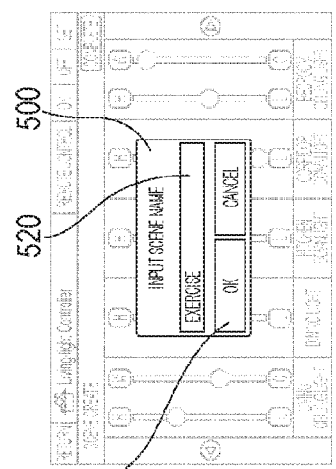
Figure 33F:
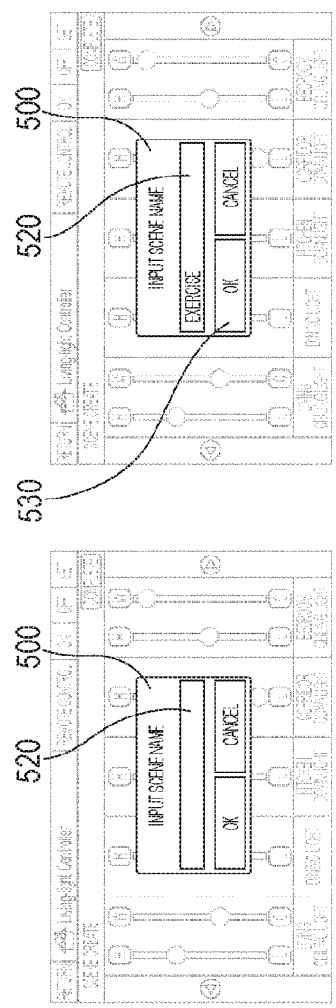
Figure 33I:
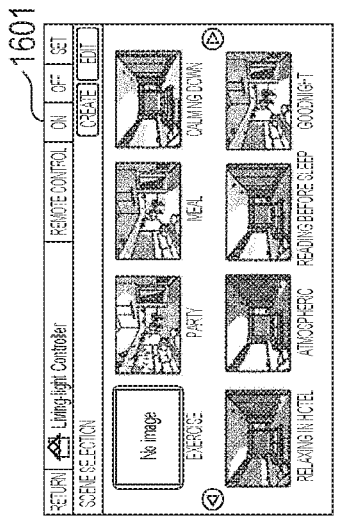
Figure 33H:
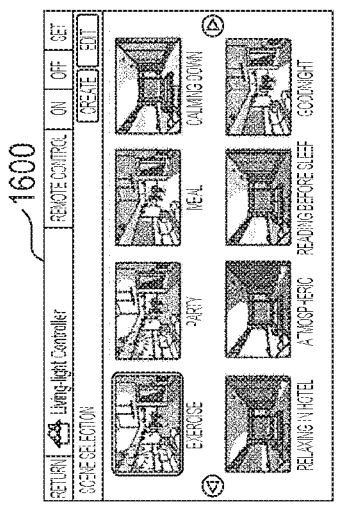
Figure 33G:
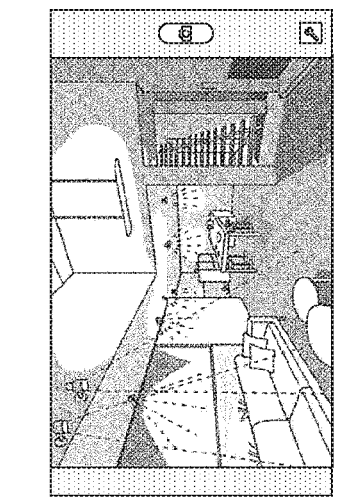

A procedure from the process for generating and displaying the scene name input screen 500 (S122) to the process for capturing an image (S136) is the same as that of the method for creating a scene illustrated in FIGS. 10A and 10B. More specifically, as illustrated in FIGS. 33D to 33F, the scene name input screen 500 and the image capture confirmation screen 600 are displayed. If the imaging device 140 is activated, a live view image is displayed as illustrated in FIG. 33G. If the user presses the shutter button, the imaging device 140 captures an image.

If an image is captured (YES in S136), the display control unit 1430 obtains time information and sets the obtained time information as the new scene time information (S538). A specific process is the same as that of the process for setting new scene time information (S508 or S520), which is performed by selecting the create button 330 or the complete button 420.

That is, the display control unit 1430 obtains, using the clock unit 1480, the time information indicating the time at which the imaging device 140 has captured an image. The display control unit 1430 then sets the obtained time information as the new scene time information.

If the currently obtained time information is different from the new scene time information set by selecting the complete button 420, the display control unit 1430 changes the new scene time information to the currently obtained time information. If the currently obtained time information is the same as the new scene time information set by selecting the complete button 420, the display control unit 1430 need not change the new scene time information. Alternatively, the display control unit 1430 may set an average time of the time at which the create button 330 has been selected, the time at which the complete button 420 has been selected, and the time at which the image has been captured as the new scene time information.

Furthermore, the display control unit 1430 sets the captured image as a scene icon (S140). The imaging device 140 can capture an image until an image is captured (NO in S136). That is, the imaging device 140 remains activated.

If the button selected in the image capture confirmation screen 600 is the NO button 630 (NO in S132), the display control unit 1430 sets a default image as a scene icon (S142).

The lighting information management unit 1450 associates the setting information regarding the one or more lighting devices, the input scene name, the set new scene location information, and the scene icon with one another and stores these pieces of information as a new scene (S544). That is, if the imaging device 140 captures an image, the captured image is managed as a scene icon, and if the imaging device 140 does not capture an image, a default image is managed as a scene icon.

Next, the display control unit 1430 obtains the scene information (S146). More specifically, the display control unit 1430 reads and obtains the scene information stored in the lighting information management unit 1450 and including the new scene.

Next, the display control unit 1430 performs the process for setting priority in display on the basis of the obtained scene information (S548). The process for setting priority in display is as illustrated in FIG. 32.

The display control unit 1430 then generates the new scene selection screen 1600 or 1601 with the created new scene selected and displays the generated new scene selection screen 1600 or 1601 on the display unit 120 (S150). As a result, if an image is captured, the new scene selection screen 1600 is displayed on the display unit 120 as illustrated in FIG. 33H. If an image is not captured, the new scene selection screen 1601 is displayed on the display unit 120 as illustrated in FIG. 33I.

After the new scene selection screen 1600 or 1601 is displayed, the procedure after the processing for detecting pressing of the create button 330 (S106) is repeated.

Although an example in which the process for setting the new scene location information is performed three times (S508, S520, and S538) has been described in the flowcharts of FIGS. 31A and 31B, the number of times that the process for setting the new scene location information is performed is not limited to this. It is only required that the process for setting the new scene location information be performed at least once. The process for setting the new scene location information may be performed at any time between the selection of the scene creation button and the storage of the new scene (between S106 and S544).

As described above, according to the method for controlling the mobile terminal 1400 according to this embodiment, the one or more scene icons 310 are rearranged on the basis of the current time information and the one or more pieces of scene time information and displayed. Therefore, a scene selection screen according to the current time can be generated. Accordingly, the user can easily select a scene.

Fourth Embodiment

Next, a method for controlling the mobile terminal 1400 according to a fourth embodiment will be described. More specifically, a method for editing a scene will be described with reference to FIGS. 34A to 35H. That is, in the fourth embodiment, a method for setting a new scene by editing an existing scene will be described. For example, in the fourth embodiment, a case in which the edit button 340 is selected in the scene selection screen 1500 illustrated in FIG. 29A or the scene selection screen 1501 illustrated in FIG. 29B will be described. The configurations of the lighting system 20, the mobile terminal 1400, and the one or more lighting devices (the first lighting device 200 and the second lighting device 201) are the same as those according to the third embodiment illustrated in FIG. 27, and accordingly description thereof might be omitted. Description of the same elements as those according to the first to third embodiments is omitted, and differences will be mainly described hereinafter.

Figure 34A:
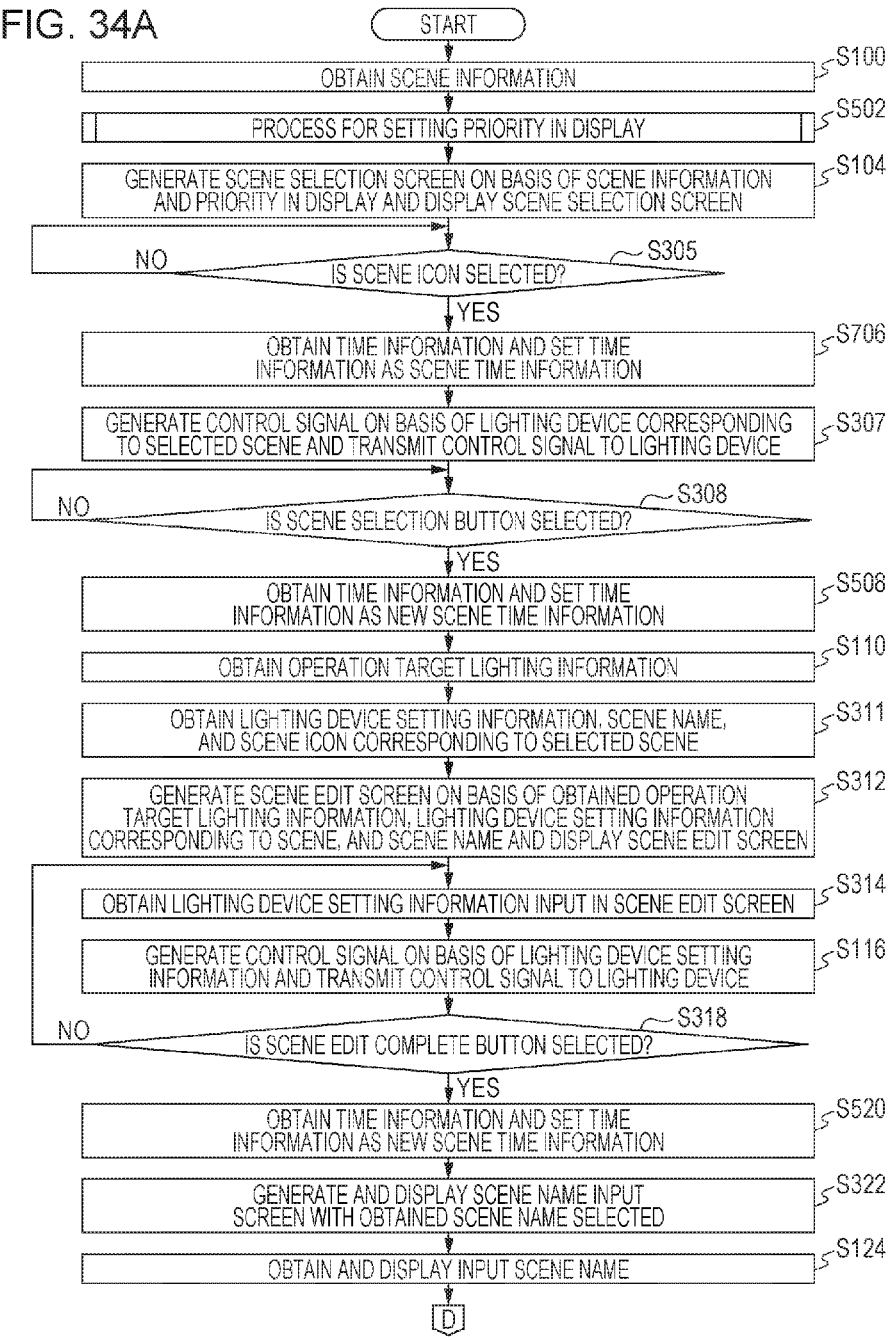
FIG. 34A is a flowchart illustrating an example of a method for editing a scene according to a fourth embodiment.

FIGS. 34A and 34B are flowcharts illustrating an example of the method for editing a scene according to the fourth embodiment. FIGS. 35A to 35H are diagrams illustrating an example of switching of the screen displayed in the method for editing a scene according to the fourth embodiment.

A procedure from the obtaining of the scene information (S100) to the generation of the scene selection screen (S104) is the same as that of the method for creating a scene illustrated in FIG. 31A. More specifically, as illustrated in FIG. 35A, the scene selection screen 1500 including the scene icons 310 rearranged on the basis of the current time is displayed on the display unit 120.

Next, the display control unit 1430 waits until one of the one or more scene icons 310 is selected (NO in S305). If one of the one or more scene icons 310 is selected (YES in S305), the display control unit 1430 obtains time information and sets the obtained time information as the scene time information indicating the time of the selected scene (S706). The selected scene is a scene corresponding to the selected scene icon 310.

For example, the clock unit 1480 outputs the time information indicating the time at which the scene icon 310 is selected to the display control unit 130. The display control unit 130 obtains the time information output from the clock unit 1480 and sets the obtained time information as the time information regarding the selected scene.

It is possible that the same scene is selected a plurality of times. At this time, for example, each time the scene icon 310 is selected, the lighting information management unit 1450 may store the obtained time information as illustrated in FIG. 36. The display control unit 1430 may then sets an average time of a plurality of times indicated by the plurality of pieces of time information stored in the lighting information management unit 1450 as the scene time information regarding the selected scene.

Here, FIG. 36 is a diagram illustrating selection history information according to the fourth embodiment. The selection history information indicates the times at which each scene has been selected.

As illustrated in FIG. 36, the lighting information management unit 1450 manages the one or more pieces of time information indicating the times at which each scene has been selected. Each time a scene is newly selected, time information indicating a time at which the scene is selected is added to the selection history information. Furthermore, an average time of the times indicated by the plurality of time information including the added time is calculated and set as the scene time information regarding the selected scene.

A procedure from the process for transmitting a control signal to the one or more lighting devices (S307) to the process for setting a captured image as a scene icon (S140) is the same as that of the method for editing a scene illustrated in FIGS. 23A and 23B. More specifically, as illustrated in FIGS. 35B to 35G, the scene edit screen 1100, the scene name input screen 500, the image capture confirmation screen 600, and the live view image for capturing an image are displayed on the display unit 120.

The lighting information management unit 1450 associates the setting information regarding the one or more lighting devices, the input scene name, the set new scene time information, and the scene icon with one another and stores these pieces of information as an edited scene (S744). That is, if the imaging device 140 captures an image, the captured image is managed as a scene icon, and if the imaging device 140 does not capture an image, the scene icon before the editing or a default image is managed as a scene icon.

Next, the display control unit 1430 obtains the scene information (S146). More specifically, the display control unit 1430 reads and obtains the scene information stored in the lighting information management unit 1450 and including the edited scene.

Next, the display control unit 1430 performs the process for setting priority in display on the basis of the obtained scene information (S548). The process for setting priority in display is as illustrated in FIG. 32.

Figure 35D:
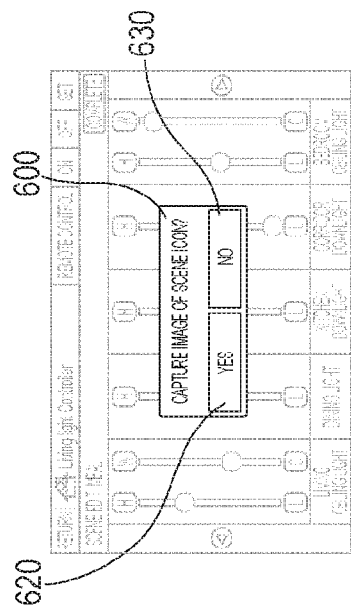
Figure 35E:
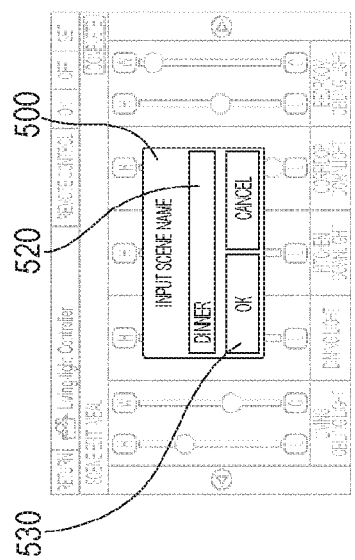
Figure 35F:
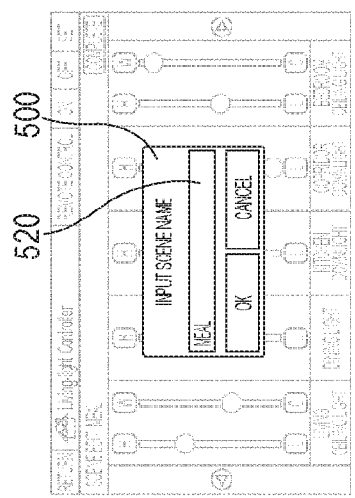
Figure 35H:
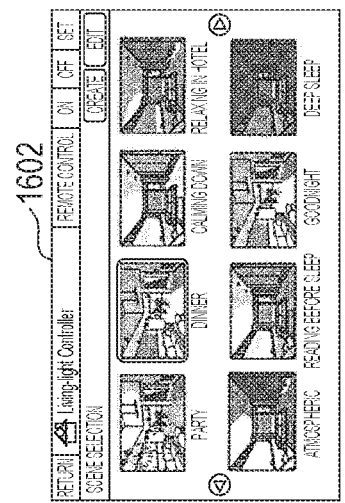
Figure 35G:
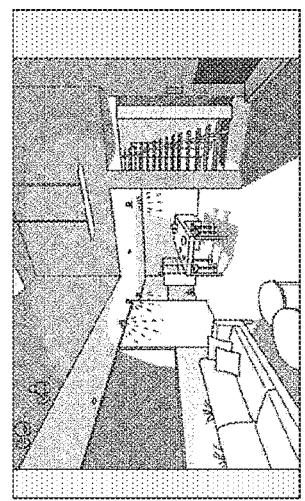

The display control unit 1430 then generates a new scene selection screen with the edited scene, that is, the new scene, selected and displays the generated new scene selection screen on the display unit 120 (S350). Thus, the display control unit 1430 displays the new scene selection screen including the scene icon of the new scene on the display unit 120, instead of the selected one of the one or more scene icons 310 (the scene icon to be edited). As a result, a new scene selection screen 1602 is displayed on the display unit 120 as illustrated in FIG. 35H.

After the new scene selection screen 1602 is displayed, the procedure after the process for detecting pressing of the scene icon 310 (S305) is repeated.

As described above, according to the method for controlling the mobile terminal 1400 according to this embodiment, the one or more scene icons 310 are rearranged on the basis of the current time information and the one or more pieces of scene time information and displayed. Therefore, a scene selection screen according to the current time can be generated. Accordingly, the user can easily select a scene.

Modification of Third and Fourth Embodiments

Although higher priority in display is given to newer scenes in the third and fourth embodiments, higher priority in display may be given when, for example, a time period including the current time and a time period including the scene time information match, instead. A method for setting priority in display on the basis of time periods will be described hereinafter with reference to FIGS. 37 and 38.

Figure 38:
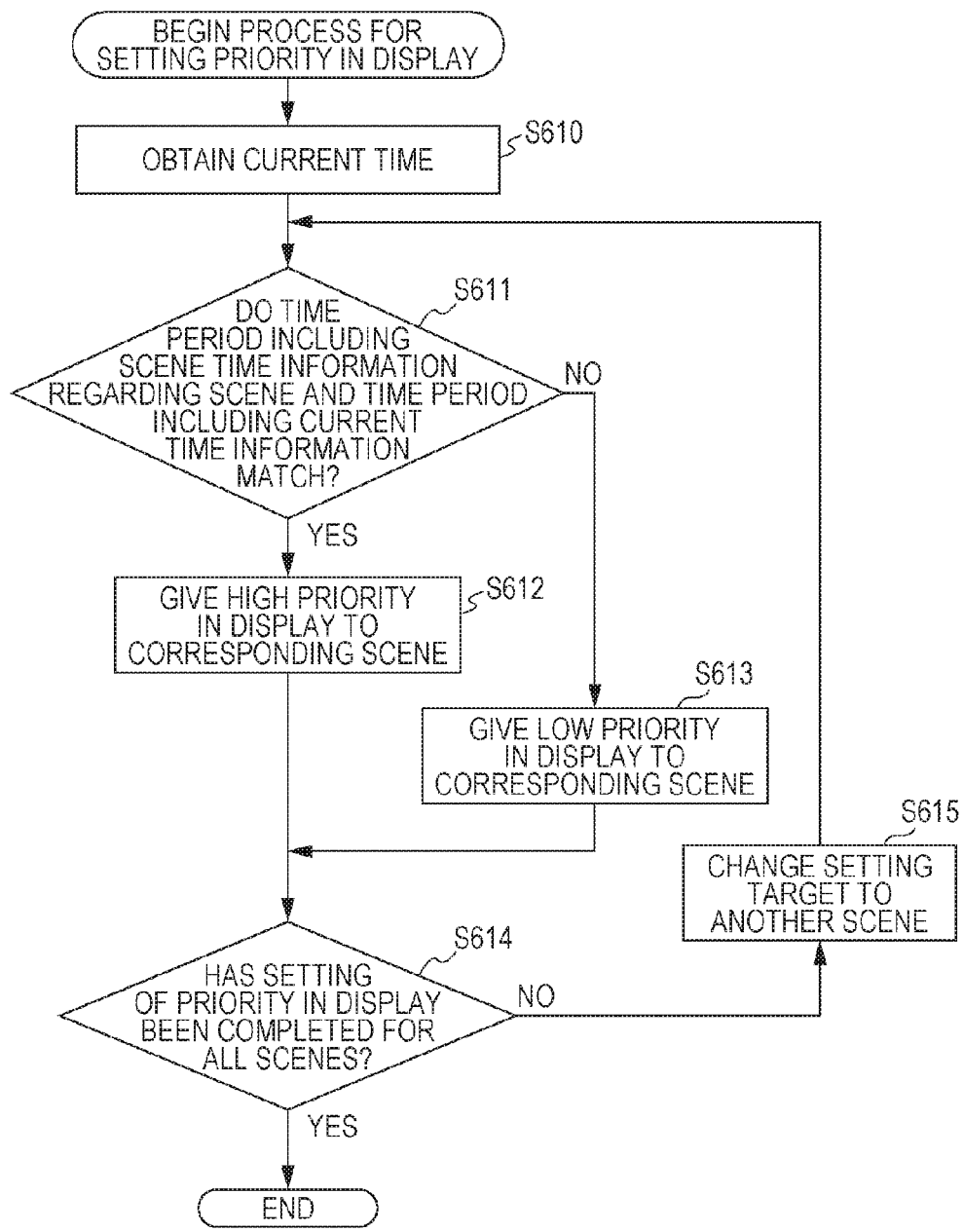
FIG. 38 is a flowchart illustrating an example of a method for setting priority in display according to the modification of the third and fourth embodiments.

FIG. 37 is a diagram illustrating an example of scene information according to the modification of the third and fourth embodiments. FIG. 38 is a flowchart illustrating an example of the method for setting priority in display according to the modification of the third and fourth embodiments.

As illustrated in FIG. 37, each of one or more scenes is included in any of time periods predetermined on the basis of the scene time information. For example, by dividing 24 hours, a plurality of time periods are predetermined. In the example illustrated in FIG. 37, three time periods, namely "5:00-11:00", "11:00-18:00", and "18:00-5:00", are predetermined.

A plurality of time periods may overlap. That is, each of the one or more scenes may be included in a plurality of times periods.

Next, the method for setting priority in display using the time periods will be described.

As illustrated in FIG. 38, first, the clock unit 1480 obtains the current time information indicating the current time (S610). Next, the display control unit 1430 determines whether a time period including scene time information regarding one of the scenes included in the scene information and a time period including the current time information match (S611).

If the time periods match (YES in S611), the display control unit 1430 gives high priority in display to the scene corresponding to the scene time information (S612). More specifically, the display control unit 1430 gives relatively high priority in display compared to when the time periods do not match.

On the other hand, if the time periods do no match (NO in S611), the display control unit 1430 gives low priority in display to the scene corresponding to the scene information (S613). For example, the lighting information management unit 1450 temporarily manages the set priority in display by associating the set priority in display with a corresponding scene icon.

Next, the display control unit 1430 determines whether the setting of priority in display has been completed for all the scenes included in the scene information (S614). If the setting of priority in display has not been completed for all the scenes (NO in S614), the display control unit 1430 changes the setting target to another scene for which priority in display has not been set (S615), and then compares the time periods (S611) and sets priority in display (S612 or S613).

If the setting of priority in display has been completed for all the scenes included in the scene information (YES in S614), the process for setting priority in display ends.

As described above, since the scene icons can be rearranged on the basis of the time periods and displayed, the user can easily select a scene.

Figure 39:
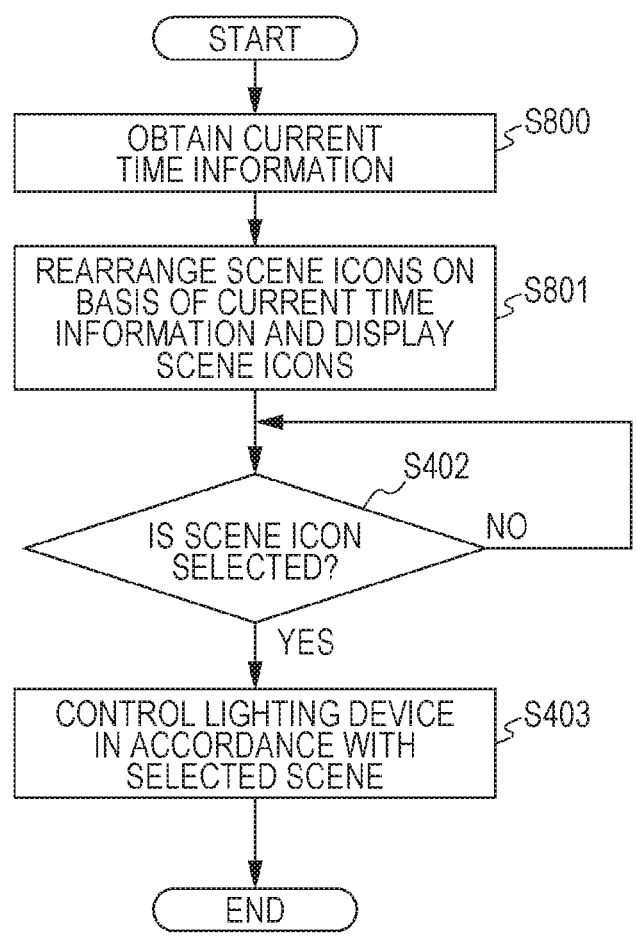
FIG. 39 is a flowchart illustrating an example of a method for setting a scene according to the modification of the third and fourth embodiments.

Although a detailed configuration of the method for controlling the mobile terminal 1400 has been described in the third and fourth embodiments, for example, a scene need not be created or edited. In other words, it is only required that the predetermined one or more scene icons be rearranged on the basis of the current time and displayed. More specifically, the mobile terminal 1400 may be controlled in accordance with a flowchart of FIG. 39. FIG. 39 is a flowchart illustrating an example of a method for setting a scene according to the modification of the third and fourth embodiments.

First, the display control unit 1430 obtains the current time information indicating the current time using the clock unit 1480 (S800).

Next, the display control unit 1430 rearranges, using the lighting information management unit 1450, which stores one or more scenes indicating one or more illumination states established by one or more lighting devices and one or more pieces of scene time information indicating the times of the one or more scenes while associating the one or more scenes and the one or more pieces of scene time information with each other, one or more scene icons 310 corresponding to the one or more scenes on the basis of the current time information and the one or more pieces of scene time information and displays the one or more scene icons 310 on the display unit 120 (S801). More specifically, the display control unit 1430 gives priority in display to each scene on the basis of FIG. 32 or FIG. 38 and displays scene icons 310 corresponding to scenes having higher priority first. At this time, the create button 330 and the edit button 340 need not be displayed.

Next, if one of the one or more scene icons 310 is selected (YES in S402), the lighting control unit 160 transmits, to the one or more lighting devices, a control signal for controlling the one or more lighting devices in such a way as to illuminate a corresponding space in the illumination state indicated by a scene corresponding to the selected icon 310 (S403).

If one of the one or more scene icons 310 is not selected (NO in S402), the display control unit 1430 waits until one of the one or more scene icons 310 is selected.

As described above, according to the method for controlling the mobile terminal 1400 according to this modification, the one or more scene icons 310 are rearranged on the basis of the current time information and displayed. As a result, scene icons 310 whose times are close to the current time can be displayed first, and accordingly the user can easily select a scene.

Although an example in which the mobile terminal 1400 includes the display control unit 1430, the lighting information management unit 1450, and the lighting control unit 160 has been described in each of the above embodiments, the configuration of the mobile terminal 1400 is not limited to this. For example, a server connected to the mobile terminal 1400 through the network may include the display control unit 1430, the lighting information management unit 1450, and the lighting control unit 160, instead. That is, the mobile terminal 1400 may be a terminal that captures and displays images on the basis of instructions transmitted from the server through the network.

Figure 40:
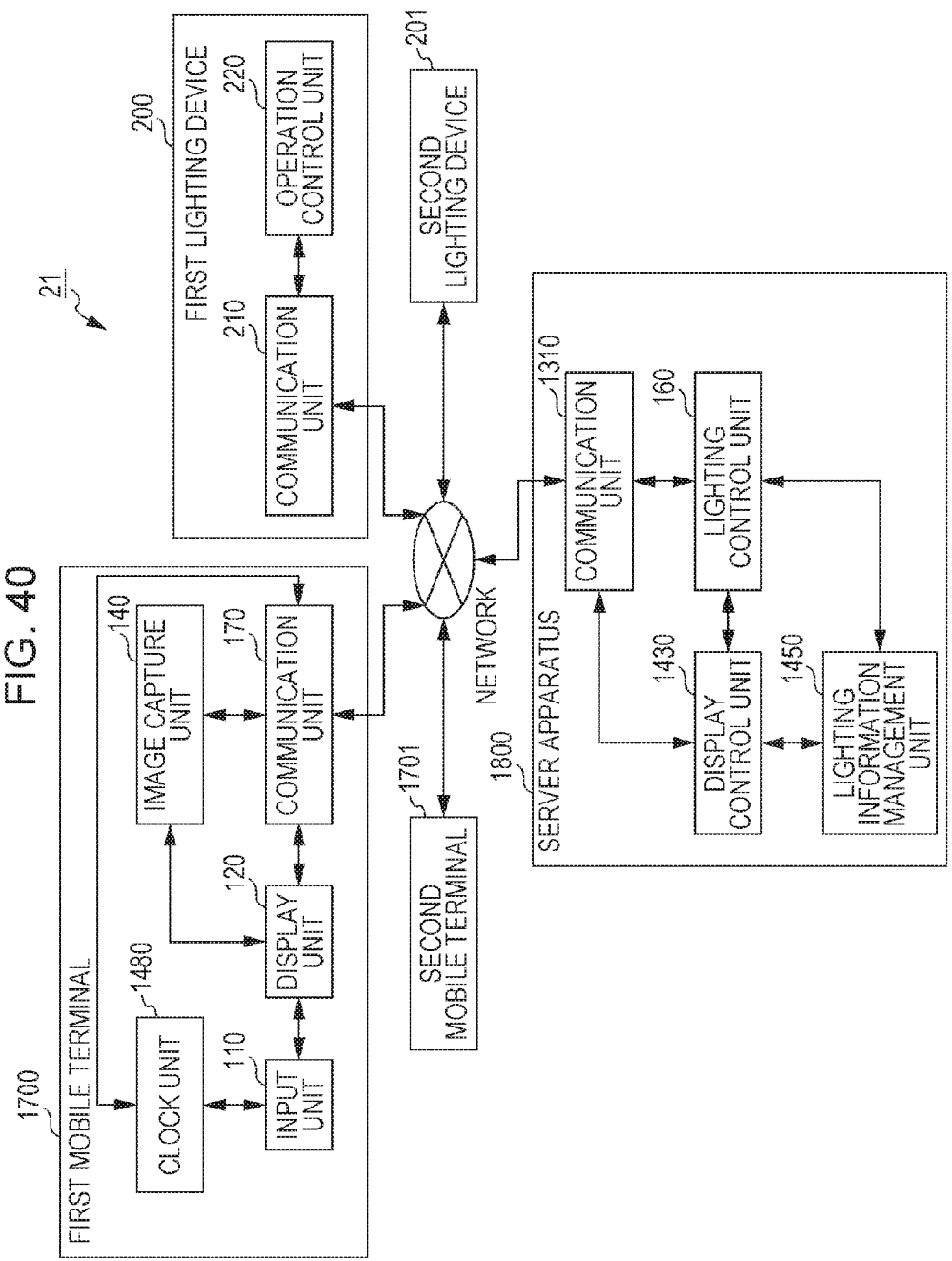
FIG. 40 is a block diagram illustrating an example of a lighting system according to the modification of the third and fourth embodiments.

FIG. 40 is a block diagram illustrating an example of a lighting system 21 according to the modification of the third and fourth embodiments. As illustrated in FIG. 40, the lighting system 21 includes a first mobile terminal 1700, a second mobile terminal 1701, the first lighting device 200, the second lighting device 201, and a server apparatus 1800.

The first mobile terminal 1700 is an example of the terminal that controls one or more lighting devices that illuminate a space. More specifically, the first mobile terminal 1700 controls the one or more lighting devices (the first lighting device 200 and the second lighting device 201 in the example illustrated in FIG. 40) through the server apparatus 1800.

As illustrated in FIG. 40, the first mobile terminal 1700 includes an input unit 110, a display unit 120, an imaging device 140, a communication unit 170 and a clock unit 1480.

Each processing unit performs processing on the basis of an instruction from the server apparatus 1800. For example, the display unit 120 displays a screen generated by a display control unit 1430 of the server apparatus 1800 and obtained through the communication unit 170. In addition, the imaging device 140 transmits a captured image to the server apparatus 1800 through the communication unit 170. The input unit 110 transmits an operation performed by the user to the server apparatus 1800 through the communication unit 170. In addition, the clock unit 1480 transmits obtained current time information to the server apparatus 1800 through the communication unit 170.

The second mobile terminal 1701 is, as with the first mobile terminal 1700, an example of the terminal that controls one or more lighting devices that illuminate a space. That is, the first mobile terminal 1700 and the second mobile terminal 1701 can each control the first lighting device 200 and the second lighting device 201. In other words, one or more mobile terminals can each control one or more lighting devices. Although not illustrated, the second mobile terminal 1701 includes, as with the first mobile terminal 1700, an input unit 110, a display unit 120, an imaging device 140, a communication unit 170, and a clock unit 1480.

The server apparatus 1800 is a server that controls the mobile terminals that control one or more lighting devices that illuminate a space. More specifically, the server apparatus 1800 controls the first mobile terminal 1700 and the second mobile terminal 1701.

As illustrated in FIG. 40, the server apparatus 1800 includes a communication unit 1310, the display control unit 1430, a lighting information management unit 1450, and a lighting control unit 160.

The communication unit 1310 transmits a control signal generated by the lighting control unit 160 to the one or more lighting devices connected through a network. In addition, the communication unit 1310 transmits information indicating a screen to be displayed on the display unit 120 generated by the display control unit 1430 to the first mobile terminal 1700 or the second mobile terminal 1701. In addition, the communication unit 1310 receives an operation, which is performed by the user, obtained through the input unit 110 and the display unit 120 from the first mobile terminal 1700 or the second mobile terminal 1701. In addition, the communication unit 1310 receives an image captured by the imaging device 140 from the first mobile terminal 1700 or the second mobile terminal 1701. In addition, the communication unit 1310 receives the current time information obtained by the clock unit 1480 from the first mobile terminal 1700 or the second mobile terminal 1701.

As described above, since the server apparatus 1800 controls the one or more mobile terminals and the one or more lighting devices, usability can be enhanced for the user. For example, the user can select a scene using any of the one or more mobile terminals even if the user has created scenes using any of the one or more lighting devices.

Here, the first mobile terminal 1700 and the second mobile terminal 1701 may each include the display control unit 1430 and the lighting control unit 160, and the server apparatus 1800 may include the lighting information management unit 1450, instead. That is, the server apparatus 1800 may collectively manage the scene information and operation target lighting information, and the first mobile terminal 1700 and the second mobile terminal 1701 may generate a control signal and transmit the control signal to the one or more lighting devices.

Other Modifications

Although the method for controlling a mobile terminal in the present disclosure has been described on the basis of the embodiments and the modifications, the present disclosure is not limited to the above-described embodiments and modifications.

For example, priority in display may be set on the basis of user information. A method for setting priority in display on the basis of user information will be described hereinafter with reference to FIGS. 41 and 42.

Figure 42:
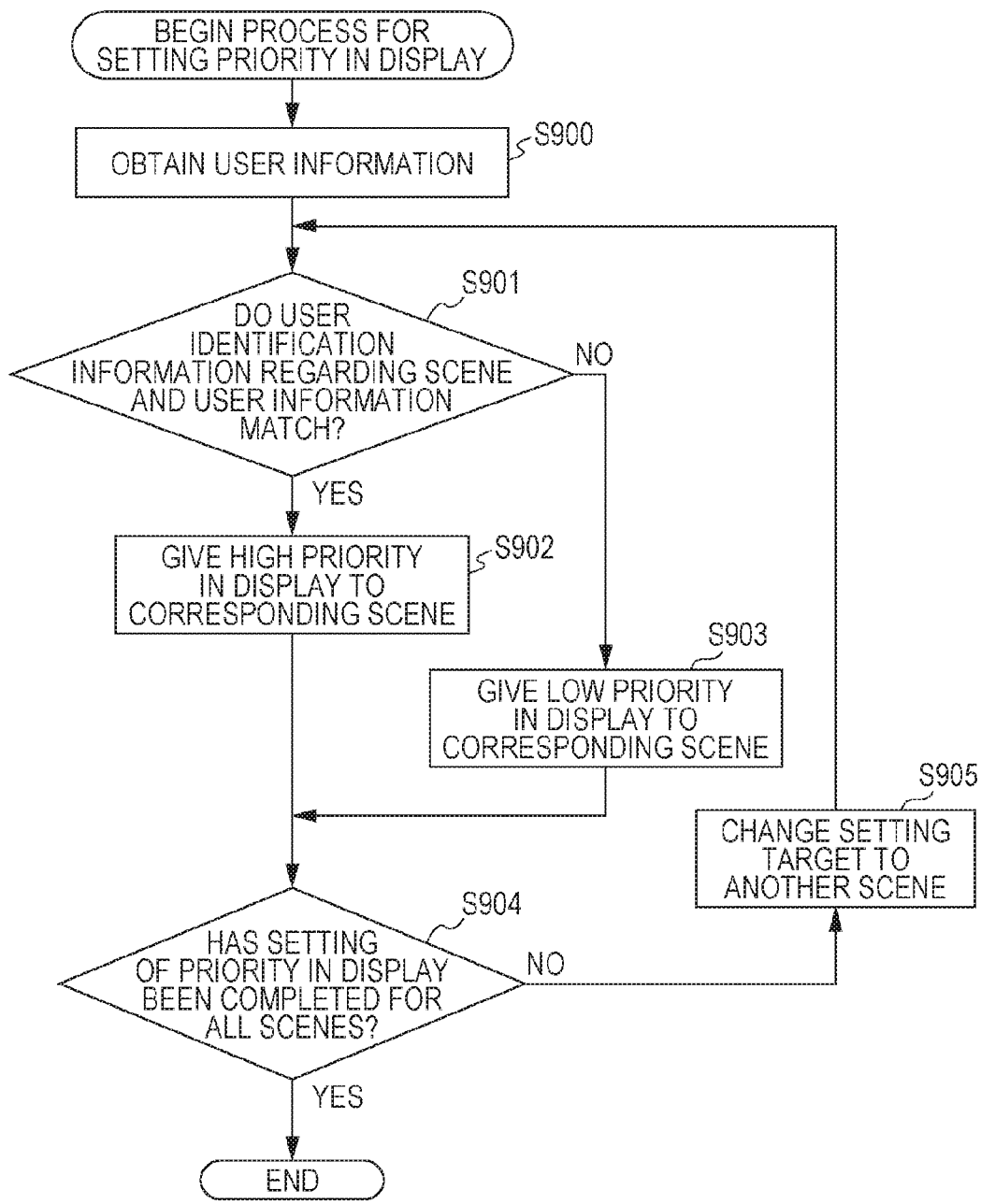
FIG. 42 is a flowchart illustrating an example of a method for setting priority in display according to the modification of the embodiments.

FIG. 41 is a diagram illustrating an example of scene information according to a modification of the embodiments. FIG. 42 is a flowchart illustrating an example of the method for setting priority in display according to the modification of the embodiments.

As illustrated in FIG. 41, user identification information is associated with each of one or more scenes. The user identification information is, for example, information indicating a user who has set a corresponding scene, that is, more specifically, a user who has created or edited the corresponding scene. Alternatively, the user identification information is, for example, information indicating a user who has selected the corresponding scene, that is, more specifically, a user who has last selected the corresponding scene or a user who has selected the corresponding scene a certain times or more.

A plurality of pieces of user identification information may be associated with each of the one or more scenes. For example, in the example illustrated in FIG. 41, only "User A" is associated with a scene "party", but a plurality of pieces of user identification information including "User A" and "User B" may be associated.

Next, the method for setting priority in display using the user identification information will be described.

As illustrated in FIG. 42, first, the display control unit obtains the user information (S900). The user information indicates, for example, a user who is using the mobile terminal. For example, the user information may be an identifier unique to the mobile terminal. Alternatively, the user may directly input the user information.

Next, the display control unit determines whether user identification information regarding one of the scenes included in the scene information and the obtained user information match (S901).

If the user identification information and the user information match (YES in S901), the display control unit gives high priority in display to the scene corresponding to the user identification information (S902). More specifically, the display control unit gives relatively high priority in display to the scene compared to when the user identification information and the user information do not match. On the other hand, if the user identification information and the user information do not match (NO in S901), the display control unit gives low priority in display to the scene corresponding to the scene information (S903). For example, the lighting information management unit temporarily manages the set priority in display by associating the set priority in display with a scene icon.

Next, the display control unit determines whether the setting of priority in display has been completed for all the scenes included in the scene information (S904). If the setting of priority in display has not been completed for all the scenes (NO in S904), the display control unit changes the setting target to another scene for which priority in display has not been set (S905), and then compares the user information (S901) and sets priority in display (S902 or S903).

If the setting of priority in display has been completed for all the scenes included in the scene information (YES in S904), the process for setting priority in display ends.

As described above, since the one or more scene icons are rearranged on the basis of the user information and displayed, a scene selection screen according to the user can be generated. For example, if a plurality of users have set a plurality of scenes, usability may be enhanced for one of the users by displaying scenes set by the user first. Therefore, the user can easily select a scene.

In addition, one or more scene icons may be selectively rearranged. For example, if scenes more than the maximum number of scenes that can be displayed in one screen have been registered, the number of scene icons displayed in one screen need not be a maximum value.

For example, although the six scene icons 310 corresponding to the "living room" and the two scene icons 310 not corresponding to the "living room" are displayed in the first embodiment as illustrated in FIG. 3A, the scene icons 310 to be displayed are not limited to these. For example, in FIG. 3A, only the six scene icons 310 corresponding to the "living room" may be displayed. At this time, if one of the scroll buttons 350 is selected, the scene icons 310 not corresponding to the "living room" may be displayed.

Thus, only scene icons corresponding to a scene with which the terminal location information and the scene location information match may be displayed. Scene icons corresponding to scenes with which the terminal location information and the scene location information do not match may be displayed after the screen is scrolled.

At this time, if the terminal location information and the scene location information are each information identifying the latitude, the longitude, and the floor and a distance between the locations indicated by the terminal location information and the scene location information is smaller than a certain threshold, it may be determined that the terminal location information and the scene location information match. Similarly, if the distance between the locations indicated by the terminal location information and the scene location information is larger than the certain threshold, it may be determined that the terminal location information and the scene location information do not match.

Similarly, if the absolute value of a difference between the current time information and the scene time information is smaller than a certain threshold, only corresponding scene icons may be displayed. If the absolute value of the difference between the current time information and the scene time information is larger than the certain threshold, the corresponding scene icons may be displayed after the screen is scrolled.

Although an example in which a plurality of scene icons are rearranged has been described in each of the embodiments, the number of scene icons to be rearranged is not limited to this. For example, only one scene icon may be rearranged.

For example, if the number of scene icons is one and the terminal location information and the scene location information match, the scene icon may be displayed. If the terminal location information and the scene location information do not match, the scene icon need not be displayed. At this time, if the terminal location information and the scene location information do not match, the scene icon may be displayed after the screen is scrolled.

In addition, although an example in which the scene icons are rearranged in a two-dimensional manner has been described in each of the embodiments, the scene icons may be rearranged in a three-dimensional manner.

In addition, although an example in which the scene icons are captured images or default images has been described in each of the embodiments, the type of scene icons is not limited to this. For example, the scene icons may be texts corresponding to the scene names.

In addition, although an example in which each button is a push button has been described in each of the embodiments, the type of buttons is not limited to this. For example, each button may be a GUI component such as a radio button, a check box, a drop-down list, or a list box.

In addition, in each of the embodiments, the time information may be arbitrarily set. In addition, not only information indicating the hour and the minute but also information indicating the month, the date, and the season (spring, summer, autumn, or winter) may be included.

In each of the embodiments, each component may be configured by dedicated hardware, or may be realized by executing a software program that suits each component. Each component may be realized by a program execution unit such as a CPU or a processor by reading and executing a software program recorded in a recording medium such as a hard disk or a semiconductor memory. Here, software that realizes the mobile terminal according to each of the embodiments is the following program.

That is, the program is a program for controlling a mobile terminal that includes a display unit and that controls one or more lighting devices that illuminate one or more spaces. The program causes a computer of the mobile terminal to perform a process including obtaining terminal location information indicating a location of the mobile terminal, rearranging, using a memory storing one or more scenes indicating one or more illumination states established by the one or more lighting devices and one or more pieces of scene location information indicating locations of the one or more scenes while associating the one or more scenes and the one or more pieces of scene location information with each other, one or more scene icons corresponding to the one or more scenes on the basis of the terminal location information and the one or more pieces of scene location information and displaying the rearranged scene icons on the display unit, and transmitting, if one of the one or more scene icons is selected, a control signal for controlling the one or more lighting devices to the one or more lighting devices, so that the one or more spaces are illuminated in an illumination state indicated by a scene corresponding to the selected scene icon.

Alternatively, the program is a program for controlling a mobile terminal that includes a display unit and that controls one or more lighting devices that illuminate one or more spaces. The program causes a computer of the mobile terminal to perform a process including obtaining current time information indicating a current time, rearranging, using a memory storing one or more scenes indicating one or more illumination states established by the one or more lighting devices and one or more pieces of scene time information indicating times of the one or more scenes while associating the one or more scenes and the one or more pieces of scene time information with each other, one or more scene icons corresponding to the one or more scenes on the basis of the current time information and the one or more pieces of scene time information and displaying the rearranged scene icons on the display unit, and transmitting, if one of the one or more scene icons is selected, a control signal for controlling the one or more lighting devices to the one or more lighting devices, so that the one or more spaces are illuminated in an illumination state indicated by a scene corresponding to the selected scene icon.

The present disclosure may be applied to a method for controlling a mobile terminal having a camera function and, for example, may be applied to a smartphone, a mobile phone, a tablet terminal a PDA, or the like.

What is claimed is:

1. A method for controlling a mobile terminal that controls one or more lighting devices that illuminate one or more spaces, the mobile terminal including a display and a memory, and the method causing a computer of the mobile terminal to execute:

obtaining current time information indicating a current time;

rearranging one or more scene icons, using the memory, the memory storing one or more scenes indicating one or more illumination states established by the one or more lighting devices and one or more pieces of scene time information indicating times of the one or more scenes while associating the one or more scenes and the one or more pieces of scene time information with each other, the one or more scene icons corresponding to the one or more scenes on the basis of the current time information and the one or more pieces of scene time information;

displaying the rearranged one or more scene icons on the display; and transmitting, when one of the one or more scene icons is selected by a user, a control signal for controlling the one or more lighting devices, to the one or more lighting devices, so that the one or more spaces are illuminated in an illumination state indicated by a scene corresponding to the selected scene icon.

2. The method according to claim 1, wherein, in the displaying the one or more scene icons, the one or more scene icons corresponding to the one or more pieces of scene time information are rearranged in a reverse chronological order and the rearranged one or more scene icons are displayed on the display.

3. The method according to claim 1, further comprising:

obtaining time information indicating a time at which one of the one or more scene icons is selected by the user; and storing the obtained time information in the memory as scene time information indicating the time of a selected scene, which is a scene corresponding to the selected scene icon, while associating the obtained time information with the selected scene.

4. The method according to claim 3, further comprising:

storing, each time one of the one or more scene icons is selected by the user, the obtained time information in the memory, wherein, in the storing the scene time information, an average time of a plurality of times indicated by a plurality of pieces of time information stored in the memory is stored in the memory as the scene time information.

5. The method according to claim 1, further comprising:

displaying a scene selection screen including the one or more scene icons and a scene setting button on the display;

displaying, when the scene setting button is selected by the user, a scene setting screen including a setting screen for setting a new scene indicating a new illumination state established by the one or more lighting devices and a setting complete button on the display;

transmitting, to the one or more lighting devices, a control signal for controlling the one or more lighting devices on the basis of setting information indicating the new illumination state set by an operation performed by the user in the setting screen;

storing the setting information at a time when the setting complete button is selected by the user, in the memory as setting information regarding the new scene;

obtaining time information indicating a time at which the scene setting button or the setting complete button has been selected by the user; and storing the obtained time information in the memory as new scene time information indicating a time of the new scene while associating the obtained time information with the new scene.

6. The method according to claim 1, wherein the mobile terminal further includes an imaging device, the method further comprising:

displaying a scene selection screen including the one or more scene icons and a scene setting button on the display;

displaying, when the scene setting button is selected by the user, a scene setting screen including a setting screen for setting a new scene indicating a new illumination state established by the one or more lighting devices and a setting complete button on the display;

transmitting, to the one or more lighting devices, a control signal for controlling the one or more lighting devices on the basis of setting information indicating the new illumination state set by an operation performed by the user in the setting screen;

activating the imaging device after the setting complete button is selected by the user;

storing the setting information at a time when the setting complete button is selected by the user, in the memory as setting information regarding the new scene, and, when the imaging device captures an image, storing the image in the memory as a scene icon of the new scene;

obtaining time information indicating a time at which the imaging device has captured the image;

storing the obtained time information in the memory as new scene time information indicating a time of the new scene while associating the obtained time information with the new scene; and displaying a new scene selection screen including the scene icon of the new scene on the display.

7. A non-transitory computer readable medium storing a program executed by a mobile terminal that controls one or more lighting devices that illuminate one or more spaces, the mobile terminal including a display and a memory, and the program causing a computer of the mobile terminal to perform a process comprising:

obtaining current time information indicating a current time;

rearranging one or more scene icons, using the memory, the memory storing one or more scenes indicating one or more illumination states established by the one or more lighting devices and one or more pieces of scene time information indicating times of the one or more scenes while associating the one or more scenes and the one or more pieces of scene time information with each other, the one or more scene icons corresponding to the one or more scenes on the basis of the current time information and the one or more pieces of scene time information;

displaying the rearranged one or more scene icons on the display; and transmitting, when one of the one or more scene icons is selected by a user, a control signal for controlling the one or more lighting devices to the one or more lighting devices, so that the one or more spaces are illuminated in an illumination state indicated by a scene corresponding to the selected scene icon.

* * * * *